United States Patent [19]

MacPherson

[11] Patent Number: 5,696,778

[45] Date of Patent: Dec. 9, 1997

[54] METHOD OF AND APPARATUS FOR GENERATING INTRACAVITY DOUBLE RAMAN SHIFTED LASER PULSES

[75] Inventor: David C. MacPherson, Conifer, Colo.

[73] Assignee: Ophir Corporation, Littleton, Colo.

[21] Appl. No.: 547,809

[22] Filed: Oct. 25, 1995

Related U.S. Application Data

[63] Continuation-in-part of Ser. No. 437,676, May 9, 1995, Pat. No. 5,583,877.

Related U.S. Application Data

[60] Provisional application No. 60/001,559, Jul. 27, 1995.

[51] Int. Cl.$^6$ ........................................... H01S 3/30
[52] U.S. Cl. ........................... 372/4; 372/20; 372/92; 372/69; 372/100; 372/107; 372/10; 372/97
[58] Field of Search ........................... 372/4, 20, 39, 372/69, 100, 92, 10, 107, 97

[56] References Cited

U.S. PATENT DOCUMENTS

| | | | |
|---|---|---|---|
| 4,151,486 | 4/1979 | Itzkan et al. | 372/4 |
| 4,191,170 | 3/1980 | Kurnit | 372/4 |
| 5,034,952 | 7/1991 | Mansfield et al. | 372/4 |
| 5,272,717 | 12/1993 | Stultz | 372/4 |
| 5,414,724 | 5/1995 | Krapchev | 372/4 |
| 5,583,877 | 12/1996 | MacPherson et al. | 372/4 |

OTHER PUBLICATIONS

Bilbe, R.M., et al., 1990, An Improved Raman Lidar System For the Remote Measurement of Natural gases Released Into The Atmosphere, Measurement Science Technology, 1, No. 6, pp. 495–499.

Hanson, F. et al., 1993, Gain Measurements and Average Power Capabilities of Cr3+:LiSrAlF6, Optics Letters, 18, No. 17, pp. 1423–1425.

MacPherson, D.C., et al., 1989, Stimulated Raman Scattering In the Visible With A Multipass Cell, IEEE Journal of Quantum Electronics, 25, No. 7, 1741–1746.

Perry, M.D., et al., Better Materials Trigger Cr:LiSAF Laser Development, Laser Focus World, Sep., pp. 85–92.

Scott, B.P., et al., 1990, Efficient Raman Energy Extraction in HD, Applied Optics, 20, No. 29, pp. 2217–2218.

Stalder, M., et al., 1991, Flashlamp Pumped Cr:LiSrAlF6, Applied Physics Letters, 58, (3) 21 Jan. 1991.

Swanson, R.C., et al., 1990, Quantum statistics of the Gain-Narrowed Raman Linewidth in H2, American Physical Society, Physical Review A, 42, No. 11, pp. 6774–6783.

Zhang, Q., et al., 1992, Electronically Tuned Diode–Laser–Pumped Cr:LiSrAlF6 Laser, Optics Letters, 17, No. 1, pp. 43–45.

*Primary Examiner*—Leon Scott, Jr.
*Attorney, Agent, or Firm*—C. E. Martine, Jr.

[57] ABSTRACT

Apparatus performs a method of generating one output laser pulses in a range of 2 to 5 microns using an intracavity feature. When a plurality of the output laser pulses are generated, a first output pulse may have any selected wavelength within the range and a second output pulse is temporally closely spaced relative to the first output pulse and may have a chosen wavelength differing from the selected wavelength. A pump laser cavity is provided with a tunable rod and an intracavity Raman device (in the pump cavity) to shift the wavelength of initial pump laser pulses. The intracavity Raman device generates radiation at first and second Stokes wavelengths, and the pulses at each wavelength are separated and are in separate paths for permitting separate operation thereon. The Raman device in the pump cavity increases the pump intensity inside the Raman cell and gives a much longer effective interaction length between the pump laser beam and the Raman medium. A first Stokes cavity for the first Raman shift overlaps the pump cavity such that the intensity in the first Stokes cavity is increased. A second Stokes cavity overlaps the pump cavity and is provided with one highly reflecting end mirror and one partially reflecting end mirror which serves as an output coupler for the output pulse which is in the wavelength range from 2 to 5 microns.

49 Claims, 46 Drawing Sheets

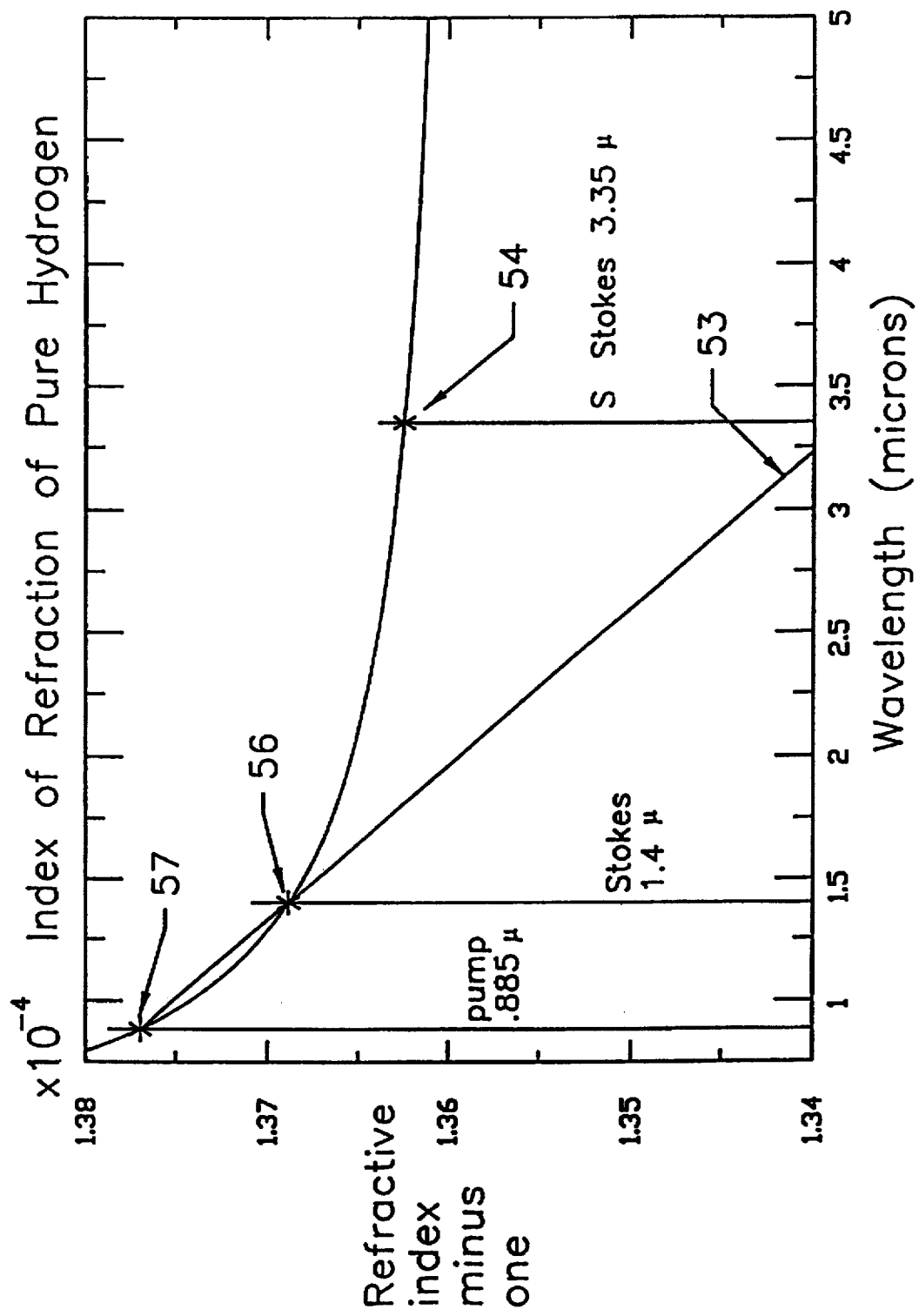

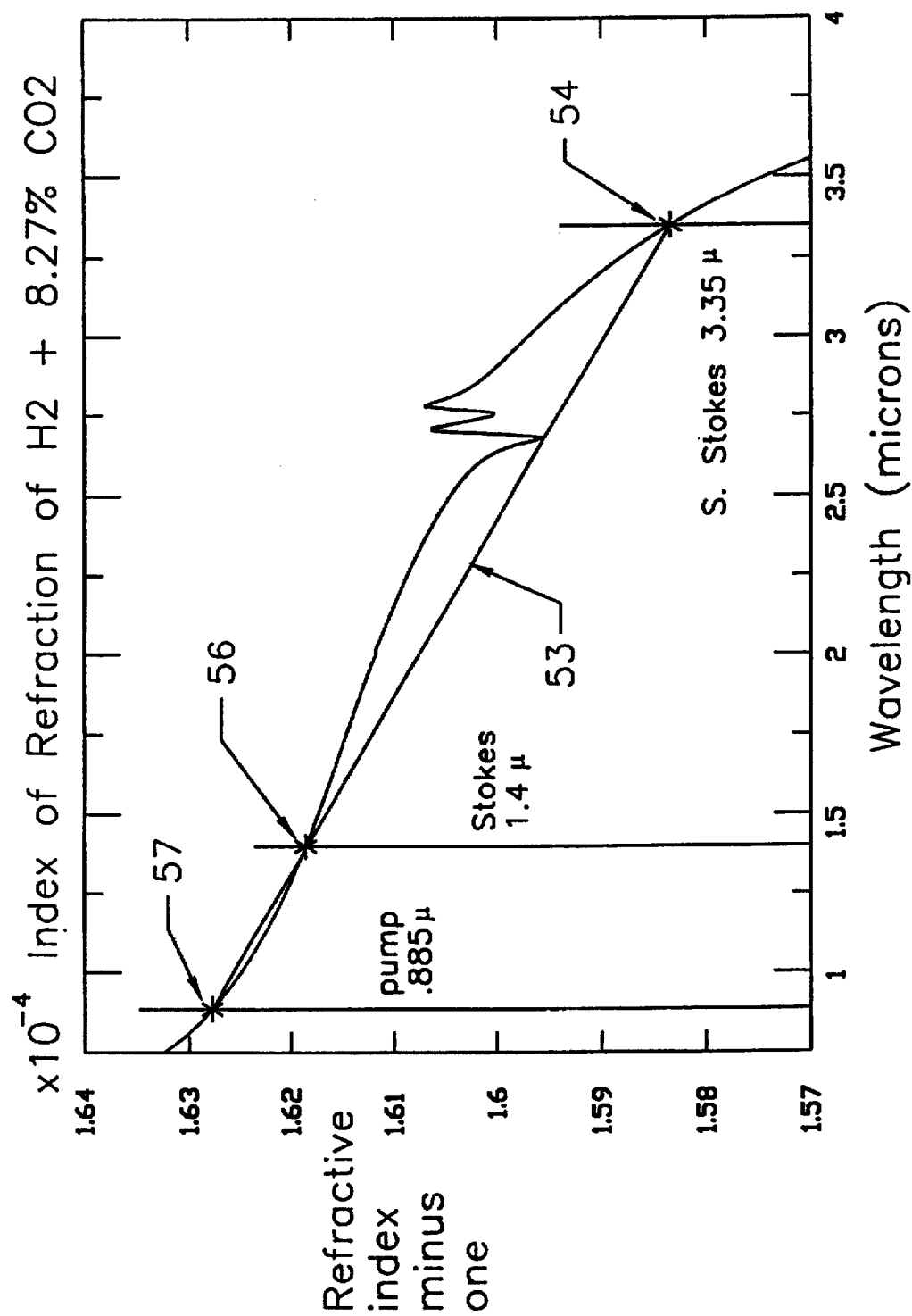

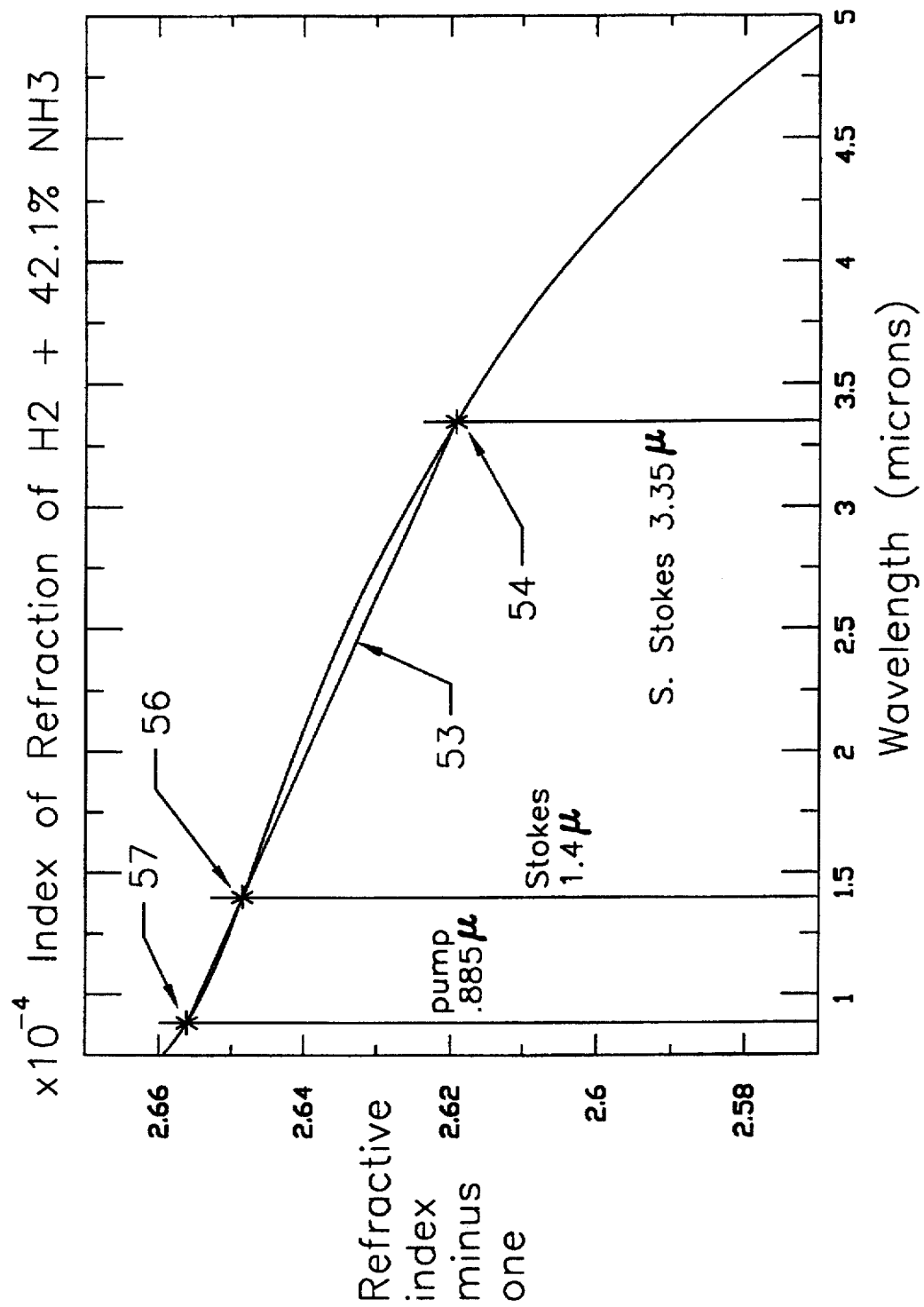

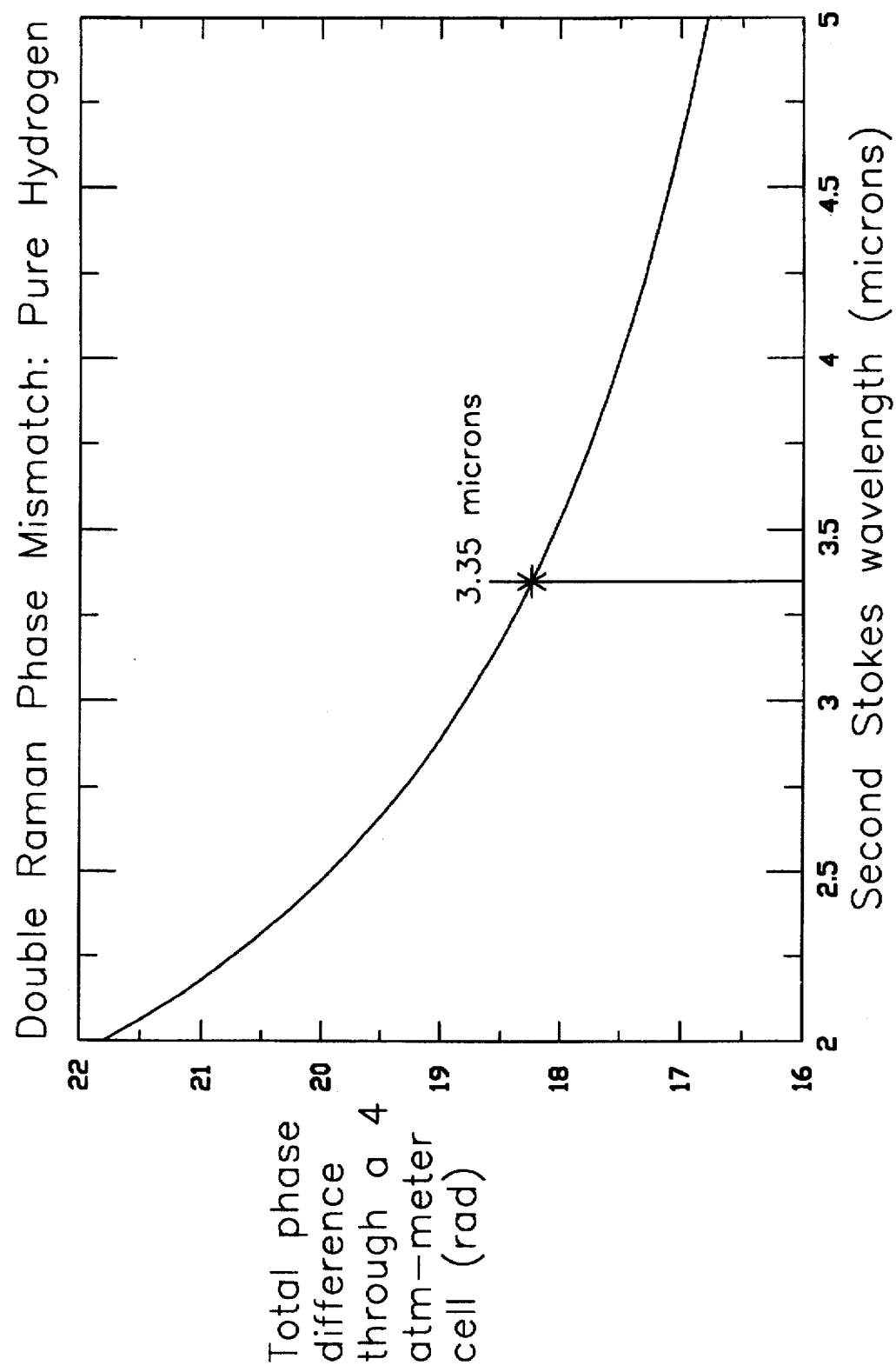

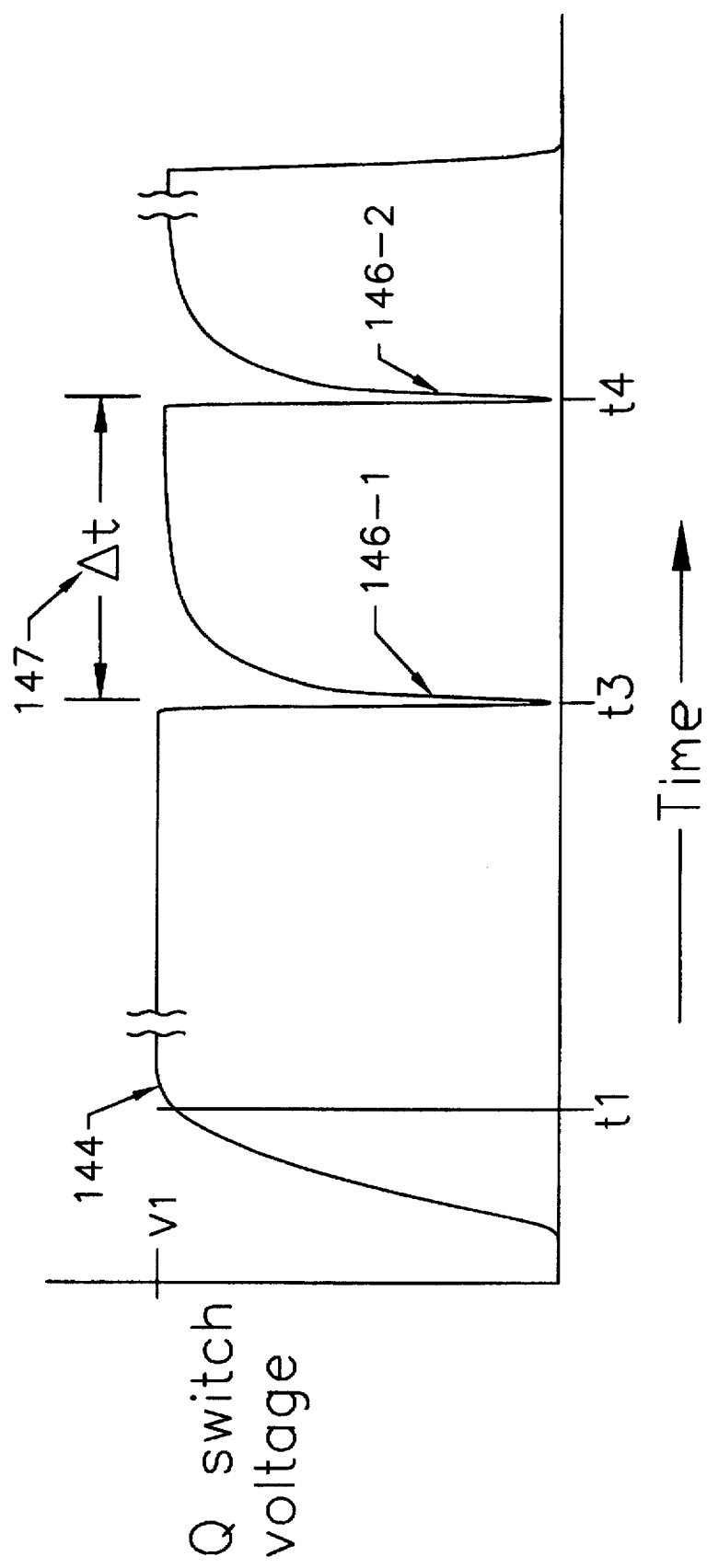

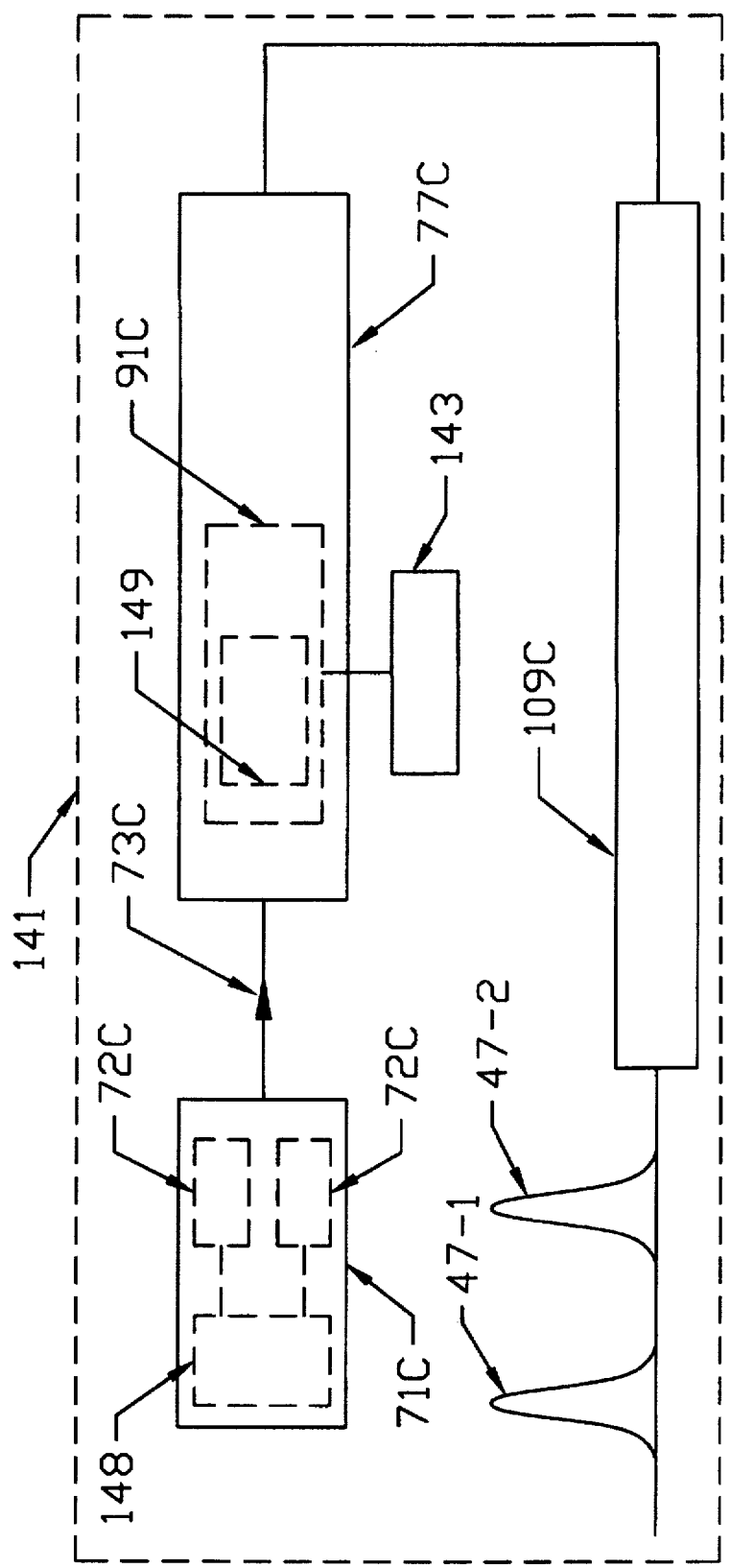

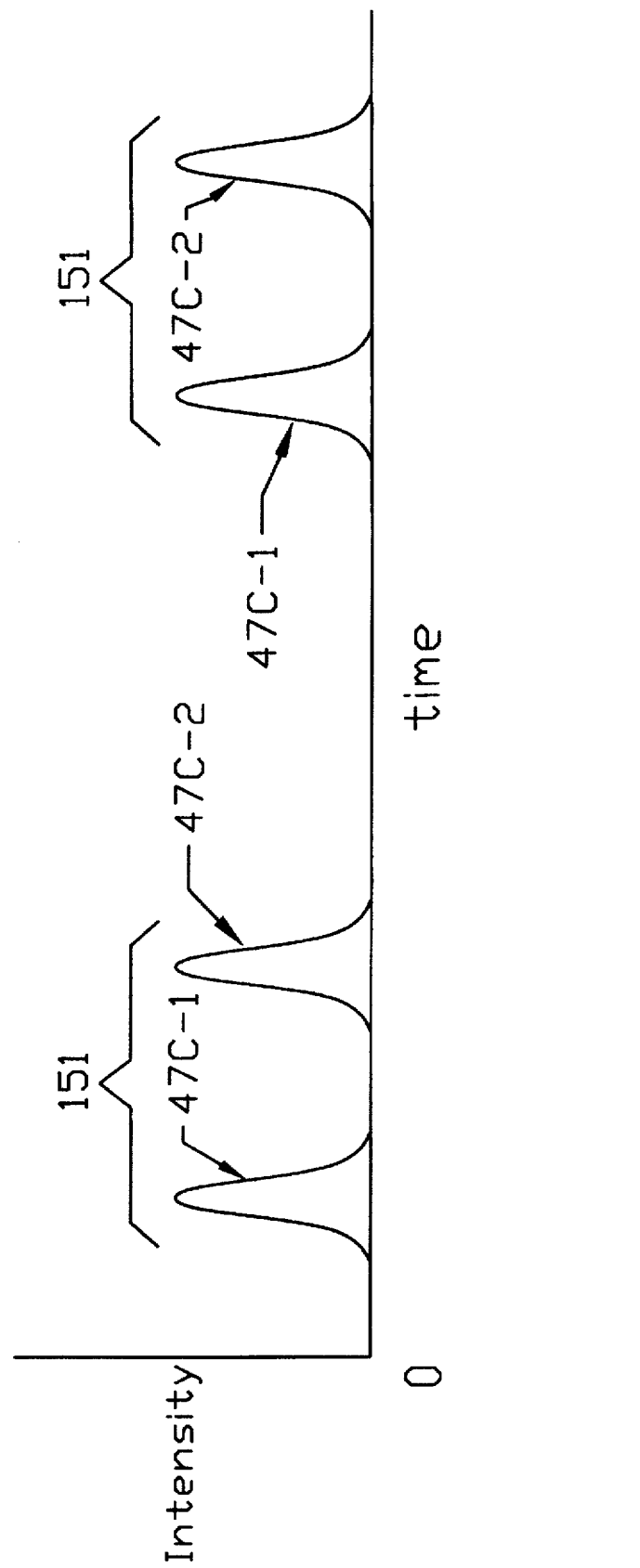

FIG. 20

STEP 156    PROVIDE CAVITY CAPABLE OF GENERATING PUMP PULSE HAVING ANY WAVELENGTH IN RANGE OF 750 - 1000 NM

STEP 157    TUNE CAVITY TO SELECT ANY WAVELENGTH IN RANGE OF 750 TO 1000 NM

STEP 158    Q-SWITCH CAVITY TO GENERATE INITIAL PULSE HAVING SELECTED WAVELENGTH

STEP 159    DOUBLE RAMAN SHIFT THE INITIAL PULSE TO GENERATE OUTPUT PULSE IN 2 - 6 MICRON RANGE

FIG. 21A

STEP 161 SELECT PARAMETERS OF RAMAN DEVICE TO ENERGETICALLY FORBID THIRD AND HIGHER STOKES

STEP 162 PROVIDE CAVITY CAPABLE OF GENERATING PUMP PULSE HAVING ANY WAVELENGTH IN RANGE ABOVE MINIMUM EF WAVELENGTH TO 1000 NM

STEP 163 TUNE CAVITY TO SELECT ANY WAVELENGTH IN THAT RANGE

STEP 164 Q-SWITCH CAVITY TO GENERATE INITIAL PULSE HAVING SELECTED WAVELENGTH IN THAT RANGE

STEP 166 DOUBLE RAMAN SHIFT THE INITIAL PULSE TO GENERATE OUTPUT PULSE IN 2.3 TO 6 MICRON RANGE

FIG. 21B

STEP 161A SELECT H2 AS MEDIUM 45

STEP 161B SELECT INITIAL PULSE 41 HAVING WAVELENGTH ABOVE MINIMUM EF WAVELENGTH

FIG. 22

| | |
|---|---|
| STEP 170 | SELECT MEDIUM 45 TO INCLUDE PHASE-MATCHING GAS |
| STEP 171 | PROVIDE CAVITY CAPABLE OF GENERATING PUMP PULSE HAVING ANY WAVELENGTH IN RANGE OF 750 - 1000 NM |
| STEP 172 | TUNE CAVITY TO SELECT ANY WAVELENGTH IN THAT RANGE |
| STEP 173 | Q-SWITCH CAVITY TO GENERATE INITIAL PULSE HAVING SELECTED WAVELENGTH IN THAT RANGE |
| STEP 174 | DOUBLE RAMAN SHIFT THE INITIAL PULSE TO GENERATE OUTPUT PULSE IN 2 - 6 MICRON RANGE |

FIG. 23

STEP 181 PROVIDE CAVITY CAPABLE OF GENERATING PUMP PULSE HAVING ANY WAVELENGTH IN RANGE ABOVE MINIMUM EF TO 1000 NM

STEP 182 OPERATE FLASH LAMP 98 TO PRODUCE PULSE 145

STEP 183 TUNE CAVITY TO SELECT ANY WAVELENGTH IN THAT RANGE

STEP 184 SELECT H2 AS MEDIUM 45

STEP 185 Q-SWITCH CAVITY AT TIME t3 TO GENERATE INITIAL PULSE 146-1 AND GENERATE INITIAL PULSE 41C-1 HAVING SELECTED WAVELENGTH IN THAT RANGE

STEP 186 DOUBLE RAMAN SHIFT THE INITIAL PULSE TO GENERATE FIRST OUTPUT PULSE 47-1 IN 2 - 6 MICRON RANGE

STEP 187 TUNE CAVITY TO SELECT NEW WAVELENGTH IN RANGE OF 750 - 1000 NM AND DIFFERENT FROM WAVELENGTH OF THE FIRST INITIAL PULSE 41C-1

STEP 188 Q-SWITCH CAVITY AT TIME t4 TO GENERATE SECOND PULSE 146-2 AND GENERATE SECOND INITIAL PULSE 41C-2 HAVING SUCH SECOND SELECTED WAVELENGTH

STEP 189 DOUBLE RAMAN SHIFT THE SECOND INITIAL PULSE 41-C TO GENERATE SECOND OUTPUT PULSE 47-2 IN 2 - 6 MICRON RANGE

FIG. 31

Step 401. Provide cavity 330 with flashlamp-pumped (or laser diode-pumped) tunable laser rod 201 (and optionally a Q switch 341).

Step 402. Provide tuning element in the form of Brewster dispersing prisms 231 and 235 in the cavity 330 for selecting the operating wavelength band.

Step 403. Use lens 221 and lens 222 in the cavity 330 for selecting the transverse lasing mode.

Step 404. Pass the laser pump beam 243 through the H2 medium in the Raman cell 336, and for high average power operation, circulate the H2 inside the Raman cell 336.

FIG. 32

Step 405. Position the focusing elements 221 and 222 in the pump cavity 330 so that a small pump beam waist 364 is located within the pump cavity 330 at the position 343.

Step 406. Place the Raman cell 336 in the portion of the pump cavity 330 containing the beam waist 364 (position 343).

Step 407. Form the additional respective Stokes and second Stokes laser cavities 331 and 332 for the Stokes and second Stokes beams 244 and 246, respectively, which overlap with the pump cavity 330 inside the Raman cell 336 and which have respective beam waists 366 and 367 near the location of the pump waist 343.

FIG. 33

Step 408. Provide the first Brewster dispersing prism 231 in the oscillator cavity 330 between the Raman cell 336 and the laser rod 201.

Step 409. Provide the end mirror 202 in the pump cavity 330 to act at the wavelengths of the pump beam 243, the Stokes beam 244 and the second Stokes beam 246.

FIG. 34

Step 410. Provide the additional Brewster prisms 232, 233 and 234, so the second prism 232 cancels angular dispersion of the first prism 231, and arrange the third prism 233 and the fourth prism 234 as a mirror image of the first prism 231 and the second prism 232 to place the Stokes beam 244 and the second Stokes beam 246 back on top of each other at the position 359.

Step 411. Select the focusing end mirror 207 for the Stokes cavity 331 and for the second Stokes cavity 332 to be highly reflective at both the wavelengths of the Stokes beam 244 and the second Stokes beam 246.

Step 412. Provide a 1.523 micron HeNe laser 368 for aligning the axis 349 of the Stokes cavity 331 with the axis 258 of the pump cavity 330, so that the HeNe beam is lined up on top of the pump laser beam 243 which leaks out of the cavity 330 through the mirror 206, and is directed into the Stokes cavity 331.

FIG. 35

Step 413. Arrange the pump beam axis 257 in the rod 201, and the pump beam axis 257 in the Raman cell 336, parallel to each other by placing the first dispersing prism 231 in the beam axis 257 containing the Raman cell 336, and the fifth prism 235 in the beam axis 257 containing the laser rod 201, so as to be placed identically in the respective two beam axes 257 and along a perpendicular line joining the two axes 257.

Step 414. Use the two 45 degree mirrors 204 and 205 to reflect the light in the two paths 257 to complete the formation of the folded pump cavity 330.

FIG. 36

Step 415. Provide the flat mirror 203, which is partially reflecting on one side and anti-reflection coated on the other side, and which has sufficient wedge to prevent etalon effects inside the coated mirror 203.

Step 416. In order to form the stable short pump subcavity 333, make the back mirror 202 of the pump cavity 330 slightly concave.

Step 417. Place a Pockels cell outside the short pump subcavity 333, with the partially reflecting mirror 203 of low enough reflectivity to prevent lasing in the cavity 333.

FIG. 37

Step 418. Select the location of the highly reflective Stokes cavity mirror 207 so that the Stokes cavity 331 is nearly the same length as the pump cavity 330.

Step 419. Select the radius of curvature of the mirror 207 to match the curvature of the respective first and second Stokes beams 244 and 246.

Step 420. Make the difference in optical path length between the first Stokes cavity 331 and the second Stokes cavity 332 very small even though the respective beams 244 and 246 take different paths through the prisms 231 through 234, by passing the Stokes and the second Stokes beams 244 and 246 respectively through differing amounts of high index material in the prisms 231 through 234.

FIG. 38

Step 421. Identify a secondary gas having an absorption band at a wavelength longer than that of the second Stokes beam 246 of interest.

Step 422. Determine the index of refraction of the gas at the wavelength of the pump beam 243 and of the second Stokes beam 246.

Step 423. Calculate the quantity of the secondary gas that must be added to the active gas in the Raman cell 336 so that the resulting index of refraction at the respective wavelengths of the pump beam 243, the Stokes beam 244 and the second Stokes beam 246 lies along a straight line when plotted versus wavelength.

Step 424. Add the calculated quantity of the secondary gas to the active gas in the Raman cell 336.

FIG. 39

Step 425. Mode match the output of the diode laser 350 to the pump cavity 243 and couple such output into the cavity 243 via an s-polarized reflection off the Brewster prism 235.

Step 426. Guide the seed beam 351 to double pass the Pockels cell so that such beam 351, in general, becomes elliptically polarized, so that the s-polarized component is lost after double passing the first and fifth Brewster prisms 231 and 235 respectively, and the p-polarized component makes one round trip in the pump cavity 330 before being partially rotated by the Pockels cell.

Step 427. Use the optical isolator 356 (FIG. 24) to prevent the high power pump laser beam 243 from feeding back into the diode laser 350.

Step 428. Use the optical fiber 357 to spatially filter the seed beam 351 and to couple the seed beam 351 from the diode laser 350 into the pump cavity 243.

FIG 40

Step 429. Use two separate seed diodes 350, with the wavelengths of the laser diodes 350 closely spaced.

Step 430. Combine the diode laser beams 351 at either a beam splitter or a fiber splice 354 before entering the pump cavity 243. Use light from one exit port of the beam splitter (or fiber splice 354) for seeding and light from the other exit port for wavelength measurement. On alternate laser pulses, turn off alternate ones of the laser diodes 350.

Step 431. Use a second approach by using one diode laser 350 and modulating its wavelength at one half the pulse rate frequency, to cause a wavelength shift for every other pulse.

METHOD OF AND APPARATUS FOR GENERATING INTRACAVITY DOUBLE RAMAN SHIFTED LASER PULSES

CROSS REFERENCE TO RELATED APPLICATIONS

This application is a continuation-in-part of patent application Ser. No. 08/437,676 filed May 9, 1995 for Method and Apparatus For Generating High Power Laser Pulses In The Two To Six Micron Wavelength Range, in the names of David C. MacPherson, Loren D. Nelson, and Martin J. O'Brien now U.S. Pat. No. 5,583,877; and is based on Provisional Application Ser. No. 60/001,559 filed Jul. 27, 1995 in the name of David C. MacPherson for Intracavity Double Raman Shifted Laser Operating In The Two To Five Micron Band.

STATEMENT OF US GOVERNMENT RIGHTS

The United States Government has certain rights in the present invention under Contract No. F29601-94-C-0065 with Ophir Corporation.

SPECIFICATION

BACKGROUND OF THE INVENTION

1. Field of the Invention

This invention relates to generating laser pulses, and more particularly to intracavity techniques for generating output laser pulses having any wavelength in a nominal range of two to five microns.

2. Discussion of the Prior Art

Considerable effort has been invested over the past twenty years in generating continuously tunable infrared (IR) laser emission using optical parametric oscillators (OPO's). In the beginning it was thought that OPO's would quickly evolve to provide wavelength coverage throughout the mid IR. However, many years later problems remain and, in particular, generation of powerful laser pulses in the important 3 micron to 6 micron band has seen only very limited success.

An OPO is pumped with a fixed laser wavelength, typically 532 or 1060 nm, and uses a variable frequency shift to obtain tunable laser emission at a longer wavelength. For example, there are teachings of tuning ranges of 1.29 to 1.44 microns, of tuning ranges of 1.83 to 1.91 microns, and such ranges of 3.5 & 4 to 5 microns.

Considering pump lasers, OPO's are pumped with a fixed wavelength pump laser and thus can use the very well-developed, high gain Nd:YAG medium or possibly a Tm:YAG or Ho:YAG laser. However, OPO's provide a tunable wavelength shift in a nonlinear shifting crystal. Major problems are encountered with nonlinear crystals for OPO's, for example, absorption, phase matching, and optical damage. In Applicant's experience, due to these problems there is no nonlinear crystal which can efficiently convert 1.06 micron pulses to the 3.4 micron to 6 micron band. For example, a shift from 1.064 microns to 3.2 microns and a rapid fall-off of transmission above 3.1 microns have been reported. In Applicant's experience, to reach the 3.4 to 6 micron band one must simultaneously use two sequential OPO's. Alternatively, one must start with a 2 micron Tm:YAG laser. However, currently available Tm:YAG lasers generate much lower average powers than the power available from Nd:YAG lasers. Finally, considering conversion efficiency, commercial OPO systems generate about 2 mJ pulses at 3 microns and less powerful pulses at longer wavelengths. Beyond 4 microns the available OPO systems produce much less than 1 mJ per pulse.

In Applicant's experience, prior laser systems have limited ability to generate output laser pulses that are rapidly tunable to any wavelength in the range of nominally 2 to 6 microns. Problems with OPO's include crystal damage at high powers, thermal lensing in the crystals, inherently large and complex optical chains, and the lack of suitable high-efficiency crystals for converting common lasers to the 3 micron region and longer wavelengths. Frequency doubling carbon dioxide and carbon monoxide laser energy to the mid-infrared limits the wavelengths available to those which are shiftable from known strong carbon dioxide or carbon monoxide lines. Thus infinite laser tunability is not possible by frequency doubling gas phase lasers. Lead salt lasers operate directly in the 2–6 band but have very low power (a few milliwatts) and require cryogenic cooling to operate.

SUMMARY OF THE PRESENT INVENTION

With these considerations in mind, there is still a need for a system which is capable of generating high power pulses in the 2 to 5 micron range, where the system does not have the limitations of the OPO's, for example. The present invention seeks to overcome these problems by improving on the use of a tunable solid state laser and two fixed frequency Raman shifts in hydrogen (H2) to generate pulses across the 2 to 5 micron wavelength band. The improvement takes advantage of using a tunable laser to generate wavelength tunable output pulses, such that Raman scattering in a H2 medium can be used for the shifting, and uses an intracavity feature to provide further advantages.

In greater detail, with the availability of a Cr:LiSAF laser tunable in the 750 to 1000 nm range to enable two Raman shifts in H2 medium to the 2 to 5 micron range, with no further shifts permitted, Applicant has found that an intracavity structure provided by a Raman cell located inside a tunable pump laser cavity (e.g., one having such Cr:LiSAF laser) increases the pump intensity inside the Raman cell and gives a much longer effective interaction length between a pump laser beam and the Raman medium. In addition, Applicant provides a first Stokes cavity for the first Raman shift. The first Stokes cavity overlaps the tunable laser pump cavity such that the intensity in the first Stokes cavity is increased. Further, a second Stokes cavity overlaps the pump cavity and is provided with one highly reflecting end mirror and one partially reflecting end mirror which serves as an output coupler.

Accordingly, the present invention contemplates improvements in providing methods of and apparatus for generating output laser pulses having any wavelength in a range of two to five microns. A feature of the present invention is improvements in the provision of an oscillator laser cavity controlled to generate an initial laser pulse within a tuning range of 750 to 1000 nm, and the use of a Raman device to double shift such initial laser pulse into such 2 to 5 micron range. The improvements take advantage of using the tunable laser to generate wavelength tunable output pulses, such that Raman scattering in a H2 medium can be used for the shifting, and use an intracavity feature to provide further advantages.

In another aspect of the present invention, with the availability of a Cr:LiSAF laser tunable in the 750 to 1000 nm range to enable two Raman shifts in H2 medium to the 2 to 5 micron range, and with no further Raman shifts permitted, an intracavity structure is provided by a Raman cell located inside a tunable pump laser cavity having such Cr:LiSAF laser to increase the pump intensity inside the Raman cell and give a much longer effective interaction length between a pump laser beam and the Raman medium.

A further aspect of the present invention provides a first Stokes cavity for the first Raman shift. The first Stokes cavity overlaps the tunable laser pump cavity such that the intensity in the first Stokes cavity is increased. A second Stokes cavity overlaps the pump cavity and is provided with one highly reflecting end mirror and one partially reflecting end mirror which serves as an output coupler.

Yet another aspect of the present invention is to improve the conversion efficiency of the intracavity approach in conjunction with the overlapping three cavity structure, by dividing the pump laser cavity into two subcavities. This two subcavity structure is achieved by placing the active pump laser medium (e.g., the Cr:LiSAF rod) in one subcavity and the Raman medium in the other subcavity, with a partially transmitting mirror between them. There is enough decoupling of the laser gain medium from the Raman medium to prevent the Raman shifting from shutting off the pump laser pulse.

A still further aspect of Applicants' invention is a combination of Cr:LiSAF as the tunable pump laser medium with the intracavity structure and Raman shifting, to provide a good match due to the Cr:LiSAF-produced long Q switched output pulses which are generally difficult to shift in a travelling wave Raman cell.

A related aspect of the intracavity structure of the present invention is a low loss mechanism for separating an initial pump beam from a first Stokes beam and from a second Stokes beam, where the low loss mechanism is a Brewster prism positioned between the Raman cell and the pump laser rod to disperse the three beams.

Another related aspect of the intracavity structure of the present invention provides three additional prisms in the first Stokes cavity and the second Stokes cavity to recombine the two Stokes beams so that the same end mirror can be used for reflecting both of the Stokes beams back to the Raman cell located at the overlap of the Stokes cavities with the pump cavity.

In yet a further aspect of the present invention the separated initial pump beam from the Raman cell is reflected off two movable mirrors which direct the initial pump beam from a first plane in which the Raman cell is located, to a second plane in which the pump rod is located, and a second Brewster prism receives the reflected initial pump beam in the second plane and directs it into the first subcavity to the rod. Without altering the path of the initial pump beam in the Raman cell or in the pump rod, movement of the mirrors permits tuning of the rod.

With these and other features in mind, the present invention relates in general to improving methods of and apparatus for generating an output laser pulse having any wavelength within a range of 2 to 5 microns. The improvement uses a tunable laser to generate wavelength tunable output pulses, such that Raman scattering in a H2 medium can be used for the shifting, and provides an intracavity feature to facilitate further advantages.

More specifically, in combination with a laser tunable in the 750 to 1000 nm range to enable two Raman shifts in H2 medium to the 2 to 5 micron range, the intracavity structure is provided by a Raman cell located inside a tunable pump laser to increase the pump intensity inside the Raman cell and give a much longer effective interaction length between a pump laser beam and the Raman medium. A first Stokes cavity for the first Raman shift overlaps the tunable laser pump cavity such that the intensity in the first Stokes cavity is increased. A second Stokes cavity overlaps the pump cavity and is provided with one highly reflecting end mirror and one partially reflecting end mirror which serves as an output coupler.

The present invention further relates to improvements in the conversion efficiency of the intracavity approach in conjunction with the overlapping three cavity structure, by dividing the pump laser cavity into two subcavities. This two subcavity structure is achieved by placing the active pump laser medium (e.g., the Cr:LiSAF rod) in one subcavity and the Raman medium in the other subcavity, with a partially transmitting mirror between them. The resultant decoupling of the laser gain medium from the Raman medium prevents the Raman shifting from shutting off the pump laser pulse.

In one embodiment of the present invention, a Raman device includes a cell containing a primary medium and one or more phase-matching gases therein. The primary medium and the one or more phase-matching gases have a bulk refractive index vs. wavelength characteristic wherein the values of bulk refractive index corresponding to the wavelengths of initial, first Stokes and second Stokes radiation are substantially co-linear. The primary medium is preferably H2 and one or more phase-matching gases may be selected from $CO_2$, $NO_2$, $NH_3$, and $NO$.

Cr:LiSAF may be used as the tunable pump laser medium with the intracavity structure and Raman shifting to provide a good match due to the Cr:LiSAF-produced long Q switched output pulses which are generally difficult to shift in a travelling wave Raman cell.

BRIEF DESCRIPTION OF THE DRAWINGS

FIG. 5 is a graph depicting the refractive index of H2 in a Raman cell as a function of wavelength, with positions or points marked to represent the refractive index corresponding to the wavelengths of a pump pulse, a first Stokes pulse, and a second Stokes pulse in generating a 3.35 micron second Stokes output laser pulse.

FIG. 6 is a graph depicting the bulk refractive index of an H2 Raman cell containing 8.27% carbon dioxide ($CO_2$) as a function of wavelength, with positions or points marked to represent the refractive index corresponding to the wavelengths of the pump pulse, the first Stokes pulse, and the second Stokes pulse in generating a 3.35 micron second Stokes output laser pulse.

FIG. 7 is a graph depicting the refractive index of an H2 Raman cell containing 42.1% ammonia ($NH_3$) as a function of wavelength, with points marked to represent the refractive index corresponding to the wavelengths of the pump pulse, the first Stokes pulse, and the second Stokes pulse used for generating a 3.35 micron second Stokes output laser pulse.

FIG. 8 is a graph depicting the phase mismatch as a function of wavelength for the H2 -filled Raman cell of FIG. 5.

FIG. 14a is a schematic diagram of another embodiment of apparatus which outputs a tunable, double Raman shifted laser pulse at any wavelength within a nominally 2 to 6 micron range according to the present invention.

FIGS. 17a through C are diagrams showing temporal sequences of Q-switching, flashlamp pulsing, output pulse timing and seed wavelength in generating multiple-output pulses nominally in a 2 to 6 micron range.

FIG. 18 is a schematic diagram of a generator for producing two closely spaced pulses in the 2 to 6 micron range.

FIG. 19 is a graph of pulse intensity vs. time showing two pairs of closely spaced pulses in the 2 to 6 micron range.

FIGS. 20,21A 21B, 22, and 23 are sequence diagrams illustrating the steps of the methods of the present invention performed by the apparatus shown in FIGS. 14a through 16, and FIG. 18.

FIGS. 30 through 40 describe various Steps in methods relating to the laser system provided with the intracavity feature.

PRIOR ART RAMAN SCATTERING

The present invention uses Raman scattering techniques. As a preface to the following description of the present invention, Raman scattering techniques are discussed in reference to FIG. 2. To conform to the practice in the literature on stimulated Raman scattering, the fundamental laser is referred to as the pump, or the pump laser, and the pump emission is referred to as the pump light. Each vibrational Raman shift in H2 reduces the frequency of the pump light by 4155 cm$^{-1}$. Output light resulting from one Raman shift is called the Stokes or the first Stokes, or the first Stokes pulse. Output light resulting from two Raman shifts is called the second Stokes or the second Stokes pulse. Light shifted up in frequency to shorted wavelengths is called anti-Stokes.

Figure 2:
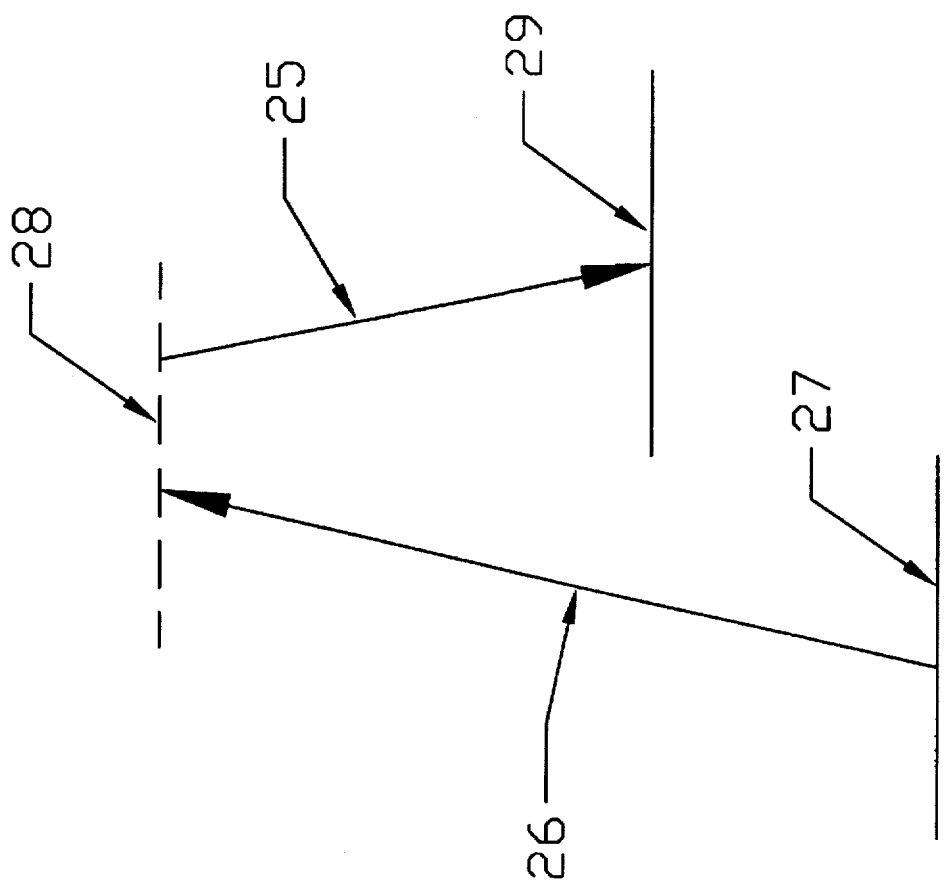
FIG. 2 is an e level diagram for generating first Stokes emission by Raman shifting in H2.

In more detail, FIG. 2 is an energy level diagram for generating single, or first, Stokes emission, or a first Stokes pulse 25 in H2 medium in a Raman laser (not shown). Pump light 26 is a pulse that drives the H2 molecules into a superposition of a ground state 27 and a small component of an excited virtual level or state 28. The dominant real level to which the pump light 26 couples when generating the virtual level 28 is the electronic state at 10.2 eV. A pump photon at 950 nm has an energy of 1.3 eV so it is far from resonance. The H2 molecule can spontaneously emit and drop from the virtual level 28 into a vibrational level or state 29 located 4155 cm$^{-1}$ above the ground state 27. Spontaneous emission along the pump light 26 stimulates more scattering, and if the interaction is strong enough, depletes most of the pump light 26. The result is the coherent first Stokes pulse 25 with a significant fraction of the pump photons converted to Stokes photons. Photon conversion efficiencies of 80 percent are not uncommon. This effect will occur if, for example, a high power laser pulse is focused near the middle of a Raman cell (not shown) filled with H2 at about 10 atmospheres.

Normally, the phase between the pump light 26 and the first Stokes pulse 25 is not important because the medium is free to select the proper phase to make the pump light 26 scatter and convert to the first Stokes pulse 25. As the first Stokes pulse 25 grows, the medium is driven into a coherent superposition of the ground state 27 and the vibrational state 29. The stimulated Raman process is a coherent interaction between the pump light 26 and the first Stokes pulse 25 and the three levels of the molecule.

As the coherent beating (normally referred to as "Q" for "quadrapole oscillation") between the ground state 27 and the vibrational state 29 grows, the process becomes stronger and eventually depletes the pump light 26. The Q is damped by collisions which randomize the phase of the H2 molecules and thus remove the H2 molecules from the collective coherent oscillation of the medium.

Figure 3:
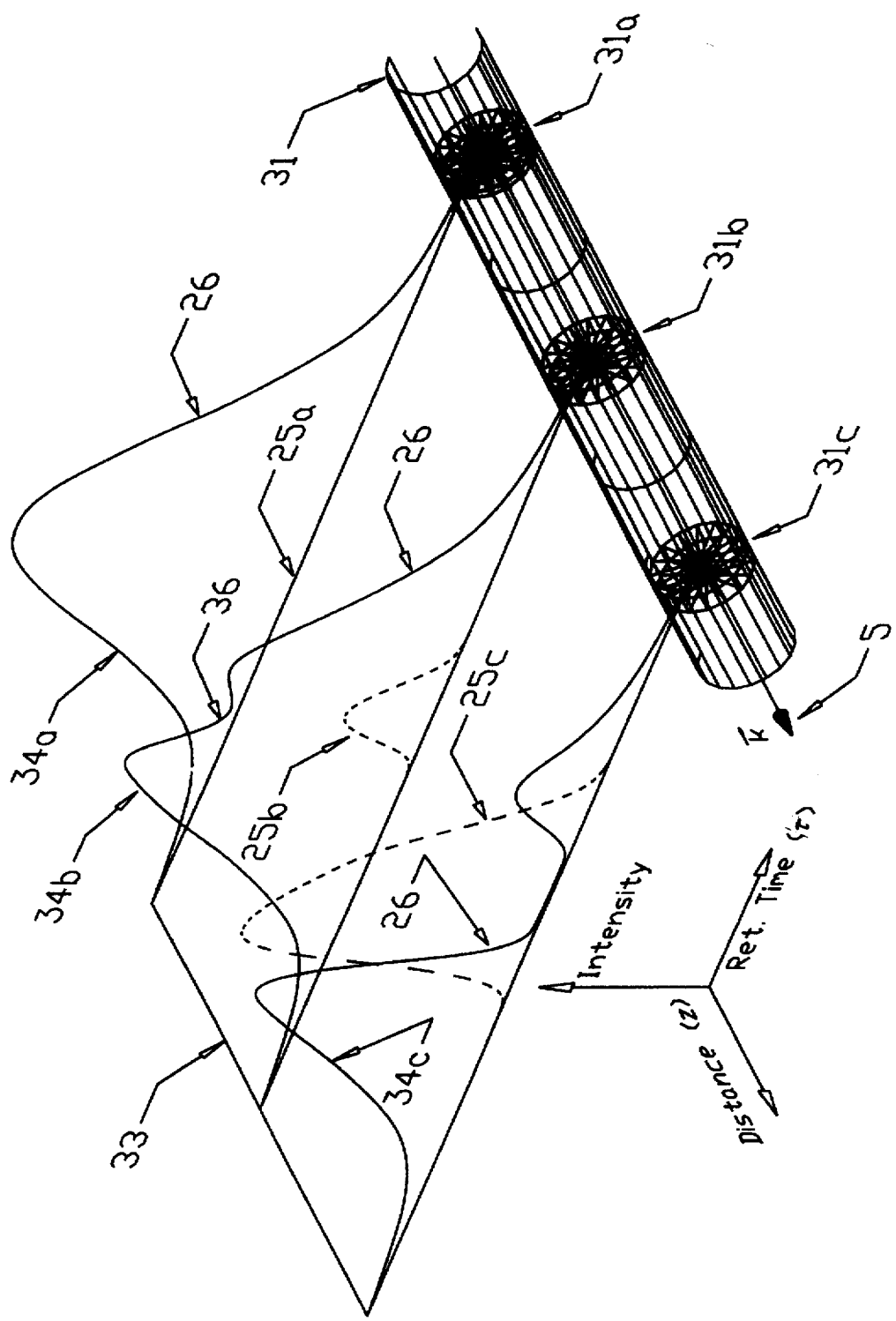
FIG. 3 a three dimensional depiction of a pump pulse as it is converted to a first Stokes pulse as such pump pulse passes through the Raman medium.

FIG. 3 shows a Raman cell 31 with Raman medium 31 schematically illustrated as a series of thin slices 32 (three slices 32a, 32b, and 32c of the medium are shown). The conversion of the pump light 26 to a first Stokes pulse 25 in successive ones of such thin slices 32 of the Raman medium is depicted by the curves in FIG. 3, which in three dimensions shows light intensity (vertical axis) vs. retarded time (right axis) vs. distance z through the cell (left axis) as the pump light 26 propagates through the slices 32. The solid lines in FIG. 3 represent the intensity of the pump light 26 (in terms of photons per second per area), which propagates in the direction of the z or distance axis. The retarded time (right axis) is defined as tau equals t, the normal time, minus the ratio of z over c, where z is the distance along the medium and c is the speed of light in the medium 32. The retarded time is used because corresponding locations along the light pulses have the same retarded time coordinated at any location in the medium 32. A line 33 represents retarded time equals zero. The temporal profile of the intensity of a pump pulse 34 as it passes through a slice 32a of the medium 31a near the entrance of the cell 31 is shown as a curve 34a. The curve 34a shows the pump pulse 34 having a full intensity profile, indicating that no significant conversion to first Stokes has taken place. After the pump pulse 34 has propagated along the cell 31 into a slice 32b, the pump pulse 34 is shown as a curve 34b. A portion of the pump pulse 34 has been converted into the first Stokes pulse 25, resulting in a lower intensity portion (or dip) 36 of the pump pulse 34b and the first Stokes pulse 25b having a corresponding increase in intensity represented by a dashed curve 25b. As the pump pulse 34c and the Stokes pulse 25 pass through the third thin slice 32c of the medium the Q builds up and more of the energy of the pump pulse 34 is converted to the first Stokes pulse 25c, until the end of the cell 31 is reached, at which nearly all of a portion of the pump pulse 34 has been converted and the first Stokes pulse 25 has grown to almost the intensity of the pump pulse 34 as shown by the dashed curve 25c.

As the pump light 26 and the first Stokes pulse 25 propagate through the cell 31, a Q is built up in the molecules within a particular slice 32. The collective oscillation of the molecules in the slice 32 is continually damped by collisions between the molecules. Molecules in the slice 32 are continually trying to reach the equilibrium condition where the build up of the Q caused by the pump light 26 is equal to the collisional damping of the polarization. However, because the intensities of the pump light 26 and the first Stokes pulse 25 are not constant, the equilibrium polarization keeps changing. The net result is that the polarization in a slice 32 at one time depends on the intensity of the first Stokes pulse 25 and the pump light 26 at a prior time. This gives rise to the conversion taking place preferentially towards the trailing part of the pump pulse 34. The shift of the Stokes pulse 25 to the trailing part of the pump pulse 34 results from the time for the medium to reach equilibrium.

In single shift Raman wavelength conversion, the phase of the Stokes pulse 25 in relation to the pump light 26 is not important and the Raman medium 31 is therefore not required to have compatible indices of refraction at the two wavelengths. Also, earlier Raman shifting work reported in the literature concentrated on maximizing the conversion efficiency of pump light 26 into first Stokes pulses 25, while minimizing transfer into second Stokes pulses (as described below in respect to FIG. 4) and higher Stokes pulses and anti-Stokes wavelengths (not shown).

DETAILED DESCRIPTION OF THE INVENTION

RAMAN SCATTERING IN THE PRESENT INVENTION

In the laser pulse generators of the present invention, an opposite approach is taken and, through methods and apparatus described below, in a laser pulse generator 40 maximization of energy transfer to a second Stokes pulse is sought (FIGS. 4 and 14a), while suppressing third and higher Stokes and anti-Stokes light (not shown). In greater detail, an initial laser pulse, or pump pulse, 41 is output by an oscillator laser cavity 42 to a Raman device 43 of the present invention. The initial pulse 41 may have a wavelength tunable in a 750 to 1000 nm nominal pump wavelength band 44. The Raman device 43 is provided with medium 45, such as H2, which Raman shifts the initial pulse 41 to form a first Stokes pulse 46, which has a wavelength tunable from 1.09 to 1.72 microns. The Raman device 43 and the wavelength of the initial laser pulse 41 are selected so that a second Stokes pulse 47 is generated and output from the Raman device 43. The second Stokes pulse 47 is nominally at any wavelength within an output range 48 (FIG. 14a) of 2 to 6 microns.

Second Stokes Generation and Four-Wave-Mixing

Figure 4A:
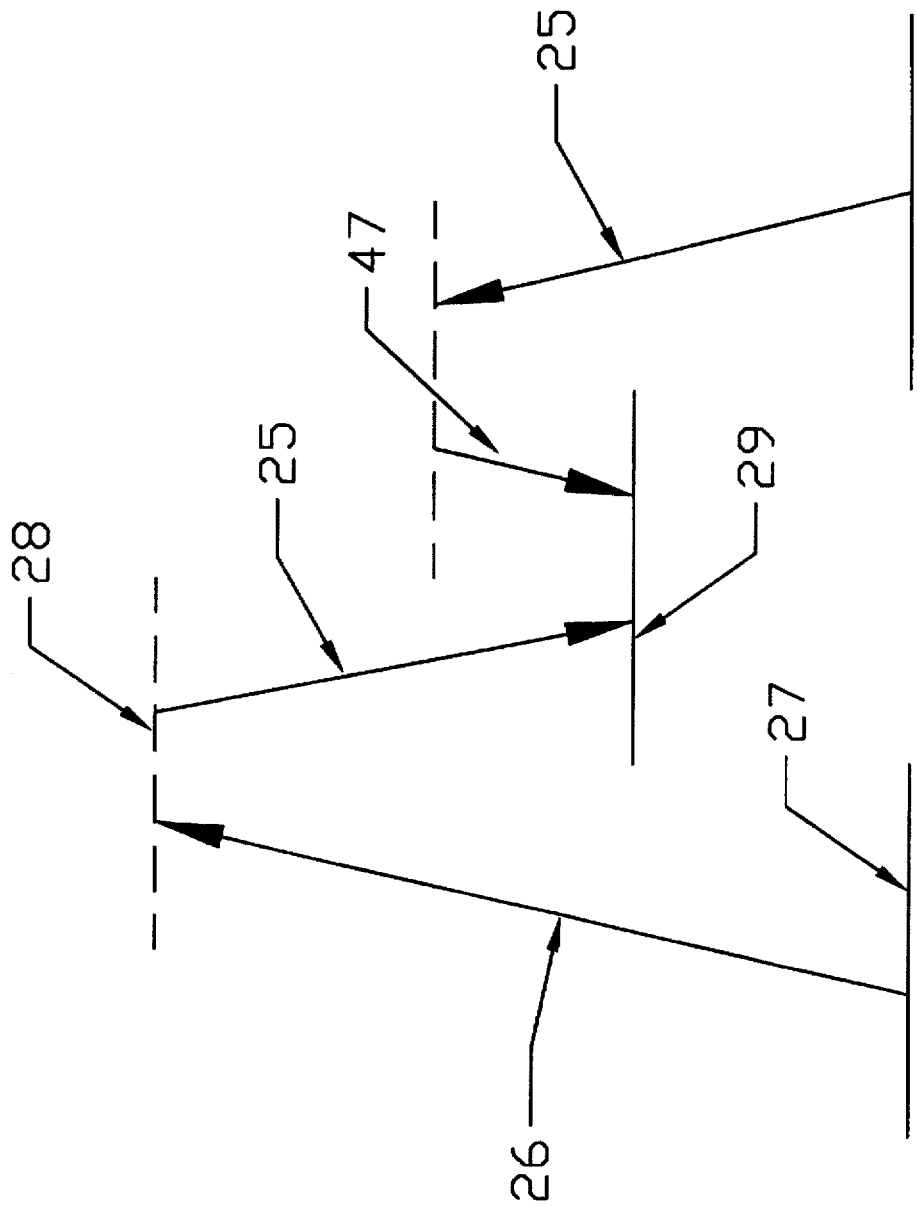
FIG. 4A is an energy level diagram for generating first and second Stokes pulses by four-wave-mixing Raman shifting in H2.

The energy level diagram for generation of the second Stokes pulse 47 is shown in FIG. 4. Second Stokes wavelength shifts can be generated by two sequential first Stokes shifting processes. If the process of generating second Stokes radiation is sequential, no relative phase matching between the pump pulse 41, the first Stokes pulse 46, and the second Stokes pulse 47 in the Raman medium 45 is required. However, without phase matching, the conversion efficiency to the chosen output wavelength is generally reduced and a higher power pump laser pulse 41 will be required.

Improved efficiency in the mid-IR range of output pulses 47 is achieved and lower power pump pulses 41 may be used in the present invention by maintaining specific phase matching conditions in the Raman medium 45 between the initial laser pulse 41, the first Stokes pulse 46, and second Stokes pulse 47. This more efficient generation of the desired second Stokes wavelength-shifted output pulse 47 is accomplished by a process referred to as "four-wave-mixing". This results in a much more complete conversion of the energy in the pump pulse 41 to the desired second Stokes pulse 47, and allows the process to begin at lower input powers of the pump pulse 41.

Figure 4B:
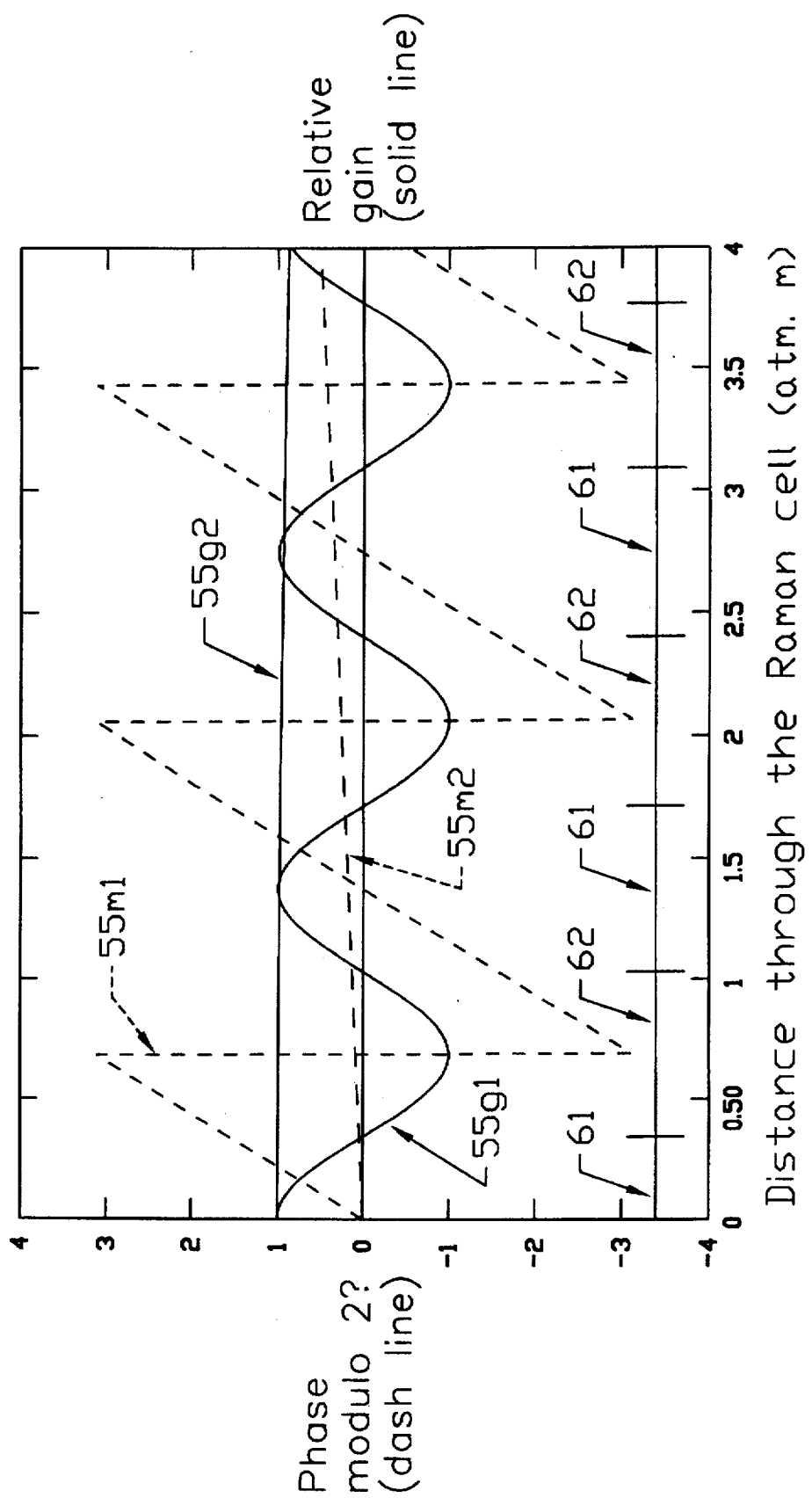
FIG. 4B is a schematic diagram of four-wave-mixing in Raman cells both with and without phase-matching gas in the medium, with phase plotted against the length of a Raman cell (left ordinate), and with the gain of the second Stokes pulse plotted against such length (right ordinate).

When the first Stokes scattering occurs, a Q (not shown) is set up in the medium 45. The Q has a definite phase. This Q beats with the first Stokes pulse 46 to drive the second Stokes pulse 47. Referring to FIG. 4B, differences in the index of refraction of the Raman medium 45 at the three wavelengths (of the pump pulse 41, the first Stokes pulse 46 and the second Stokes pulse 47) can cause the second Stokes pulse 47 to acquire a phase shift relative to the pump pulse 41 and the first Stokes pulse 46. If this happens, the second Stokes pulse 47 can be driven back into the first Stokes pulse 46, significantly decreasing the conversion efficiency to the second Stokes pulse 47.

Applicant has determined that four-wave-mixing is significantly more efficient than sequential first Stokes and second Stokes processes in generating the wavelength-shifted second Stokes output laser pulse 47. Therefore, second Stokes generation in a Raman cell 51 of the Raman device 43 will be most efficient if the proper phase relation between the three pulses (the initial pulse 41, the first Stokes pulse 46 and the second Stokes pulse 47) is maintained from one end 49 (FIG. 14a) of the cell 51 of the Raman device 43 to the other end 52 of the cell 51 to maximize the efficiency of the four-wave-mixing. FIG. 4B shows phase mismatch as a function of distance through the Raman cell 51 and its effect on the gain of the second Stokes pulse 47. A mismatch curve 55m1 shows the second Stokes phase mismatch caused by dispersion in the Raman medium 45, where the medium 45 does not include a "phase-matching" or "index-modifying" gas described below. As the phase mismatch grows, the second Stokes pulse 47 oscillates between growth and depletion as indicated by a first gain curve 55g1. At the end 49 of the cell 51 the second Stokes pulse 47 grows in phase, which is indicated by a gain of 1 in the gain curve 55g1. At a distance of 0.7 atm.-m the second Stokes pulse 47 has a acquired a full two pi phase (curve 55m1) and the second Stokes gain is again 1 (curve 55g1). This is not an efficient way to generate second Stokes pulses 47.

Curve 55m2 shows the phase mismatch for a nearly index-matched Raman medium 45 which includes such phase-matching or index-modifying gas described below. Curve 55g2, is the relative gain resulting from the phase mismatch. In practice there will be at least a small error when mixing an index-modifying gas to form the medium 45. For curves 55m2 and 55g2, this error is 0.5 radians in a 4 atm. meter cell 51, showing that index matching to 0.5 radians in the length of the medium 45 results in only a small decrease in the second Stokes gain. An example of the length of the cell 51 is twice the Rayleigh range.

Phase (or Index) Matching the Four-Wave-Mixing Process

The foregoing proper phase relationship is referred to as "phase matching". The phase matching requirements to achieve efficient generation of the second Stokes pulse 47 with the nominal 2 to 6 micron range 48 have been determined by computer modelling using H2 and small amounts of other phase-matching gases as the gases forming the medium 45. Such other gases modify the bulk index of refraction of the medium 45 to meet the phase matching requirements for efficiently driving the four-wave mixing wavelength conversion process. To facilitate the description of phase matching, FIGS. 5 through 8 and 11 depict how such index of refraction varies with wavelength for various Raman medium 45. Further, FIGS. 9, 10, 12 and 13 depict phase mismatch in terms of total phase difference through a four atm.-meter interaction length.

Figure 13:
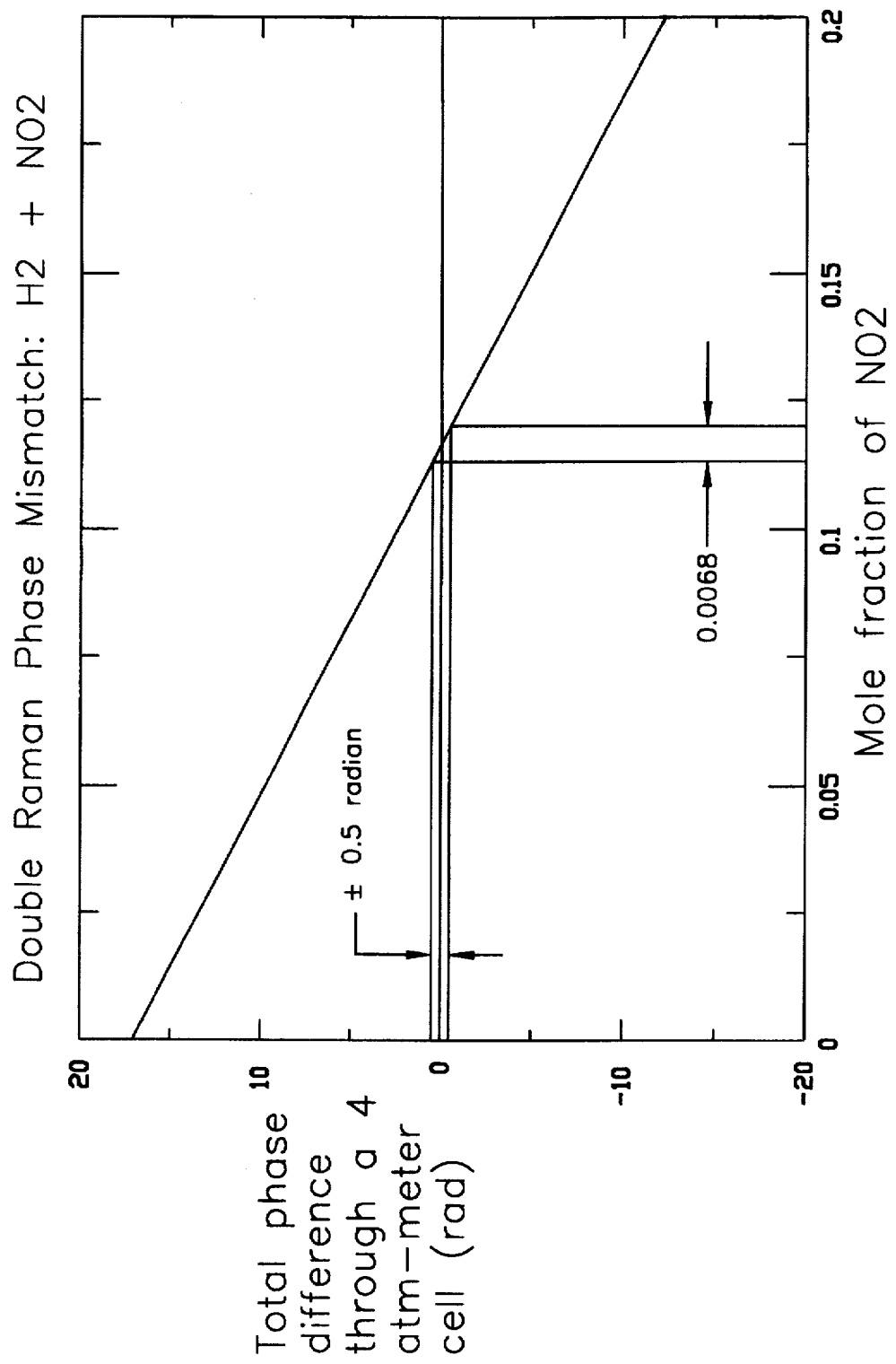
FIG. 13 is a graph depicting the phase mismatch as a function of NO2 content for the Raman cell of FIG.11.
Figure 14A:
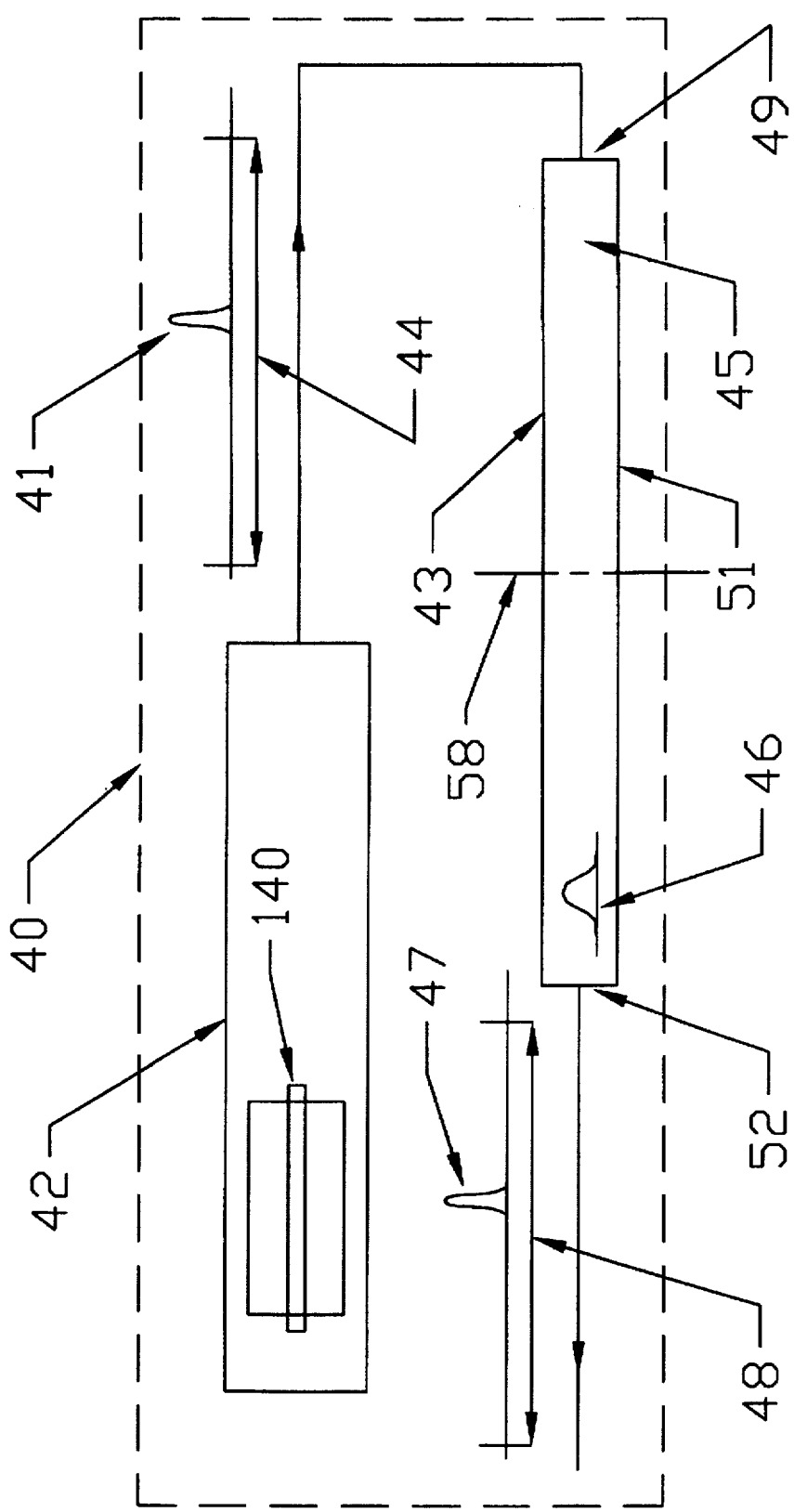
FIG. 14a is a schematic diagram of an embodiment of apparatus which outputs a double Raman shifted laser pulse at a fixed wavelength within a nominally 2 to 6 micron range according to the present invention.

Referring to FIG. 14a, the phase relation between such three pulses 41, 46 and 47 may be understood. Such phase difference shown by the curves in FIGS. 9, 10, 12 and 13 for double Raman conversion over a cell 51 having a length z is given by:

$$\Delta\phi = (k_p n_p + k_{ss} n_{ss} - 2 k_s n_s) \cdot z \qquad \text{Eq 1}$$

where k is the wavenumber in vacuum, n is the refractive index, and the subscripts p, s, and ss denote these quantities evaluated at the wavelengths of the pump pulse 41, the Stokes pulse 46, and second Stokes pulse 47, respectively. Conservation of energy requires that:

$$\frac{h}{2\pi} \cdot (w_p - w_{ss} - 2 w_s) = 0 \qquad \text{Eq 2}$$

where h is Planck's constant and w is the angular frequency evaluated at the wavelengths of the respective pulses 41, 46 and 47. If the refractive index of the Raman medium 45 varies linearly with wavelength, regardless of the slope or intercept, then Equation 1 will give a phase difference of zero under the restriction of Equation 2, indicating that the phases of the pulses 41, 46 and 47 are matched. Stated differently, the phase matching criteria (for efficiently driving the four-wave mixing process to generate the second Stokes pulse 47) is that the bulk refractive index values of the Raman medium 45 at the particular wavelength of each of the initial pulse 41, the first Stokes pulse 46, and the second Stokes pulse 47 should be co-linear, that is, they should fall on a common straight line, such as the line 53 (see FIG. 6) when plotted against wavelength. Such straight line relationship of such refractive index values vs. wavelength is now described in more detail with respect to FIGS. 5 through 13.

Refractive index Analysis

The graph of FIG. 5 shows the refractive index of H2 medium 45 plotted as a function of wavelength. Points on the graph represent the respective wavelengths of the pump pulse 41, the first Stokes pulse 46, and the Second Stokes pulse 47. In the example shown in FIG. 5, a point 54 represents the index of refraction of the second Stokes output pulse 47 having a wavelength of 3.35 microns. A point 56 represents the index of refraction of the first pulse 46 having a wavelength of 1.4 microns. A point 57 represents the index of refraction of the initial pulse 41 having a wavelength of 885 nm. The points 54, 56, and 57 are definitely not co-linear, in that they do not fall on the same straight line 53. Rather, there is a total phase difference of over 18 radians through 4 atm.-meters of gas (FIG. 8), whereas for phase matching it is desirable to keep the total phase mismatch to less than 1 radian. For this case, there are three regions 61 (FIG. 4B) in the cell 51 amplifying the second Stokes pulse 47 and three regions 62 depleting the second Stokes pulse 47. Analysis indicates that with H2 alone as the medium 45, the four-wave-mixing process is well phase matched over only about a 2 cm long path from one end 49 of the cell 51 to the other end 52.

In an embodiment of the present invention, as illustrated in FIGS. 6 through 9, for example, another gas having an absorption resonance band below the second Stokes wavelength is mixed with the H2 medium 45. In this manner, the bulk gas refractive index at the wavelength of the second Stokes pulse 47 is selectively changed to the desired straight line relationship illustrated by the straight line 53 which points 54, 56 and 57 intersect. With such straight line relationship, the four-wave-mixing process is phase matched along the entire length (4 atm.-meters) from the one end 49 of the cell to the other end 52 of the cell 51 and the resulting gain corresponds to curve 55g2 in FIG. 4B. Because the index of refraction of H2 is quite small compared to that of other gases, such mixing may be used to select the values of the bulk gas refractive index to achieve such straight line relationship. Evaluation of gases for possible use as such added index-modifier gases may be made by generating refractive index data using infrared transition data from the HITRAN database and employing the Kramers-Kronig relations. All calculations presented below use 4 atm.-meters of H2 which is appropriate for the Raman shifting cell 51 in the described embodiments. For example, such evaluation resulted in the selection of the following index-modifier gases for output laser pulses 47 at 2.0 microns, 3.35 microns, 4.5 microns, and 6.0 microns.

Phase Matching At 2.0 Microns

Mixture of CO2 and H2 As Medium 45

Mixing 37% of CO2 with H2 to form the medium 45 in the Raman cell 51 phase matches the four-wave-mixing process at 2 microns. The index curves for this specific wavelength have the feature of the above-referenced straight line relationship. The following analysis for 3.35 and 4.5 microns teaches the technique used to determine the required concentrations and the physics involved in the 2.0 micron example.

Phase Matching at 3.35 Microns

Mixture of CO2 and H2 As Medium 45

Mixing 8.27% of CO2 with H2 to form the medium 45 in the Raman cell 51 phase matches the four-wave-mixing process at 3.35 microns. The resulting bulk or combined index of refraction is shown in FIG. 6. To illustrate the benefit of phase matching in another manner, the data in FIG. 6 has been replotted in FIG. 9 to show the phase mismatch instead of the index of refraction. Referring also to FIG. 14a, phase mismatch of the medium 45 at the one end 49 of the cell 51 with the medium 45 at the other end 52 of the cell 51 can reverse the scattering direction. If the phase difference from a center 58 of the cell 51 to one of the ends 49 or 52 is less than about half a radian, then the gain will still be near its maximum.

Figure 9:
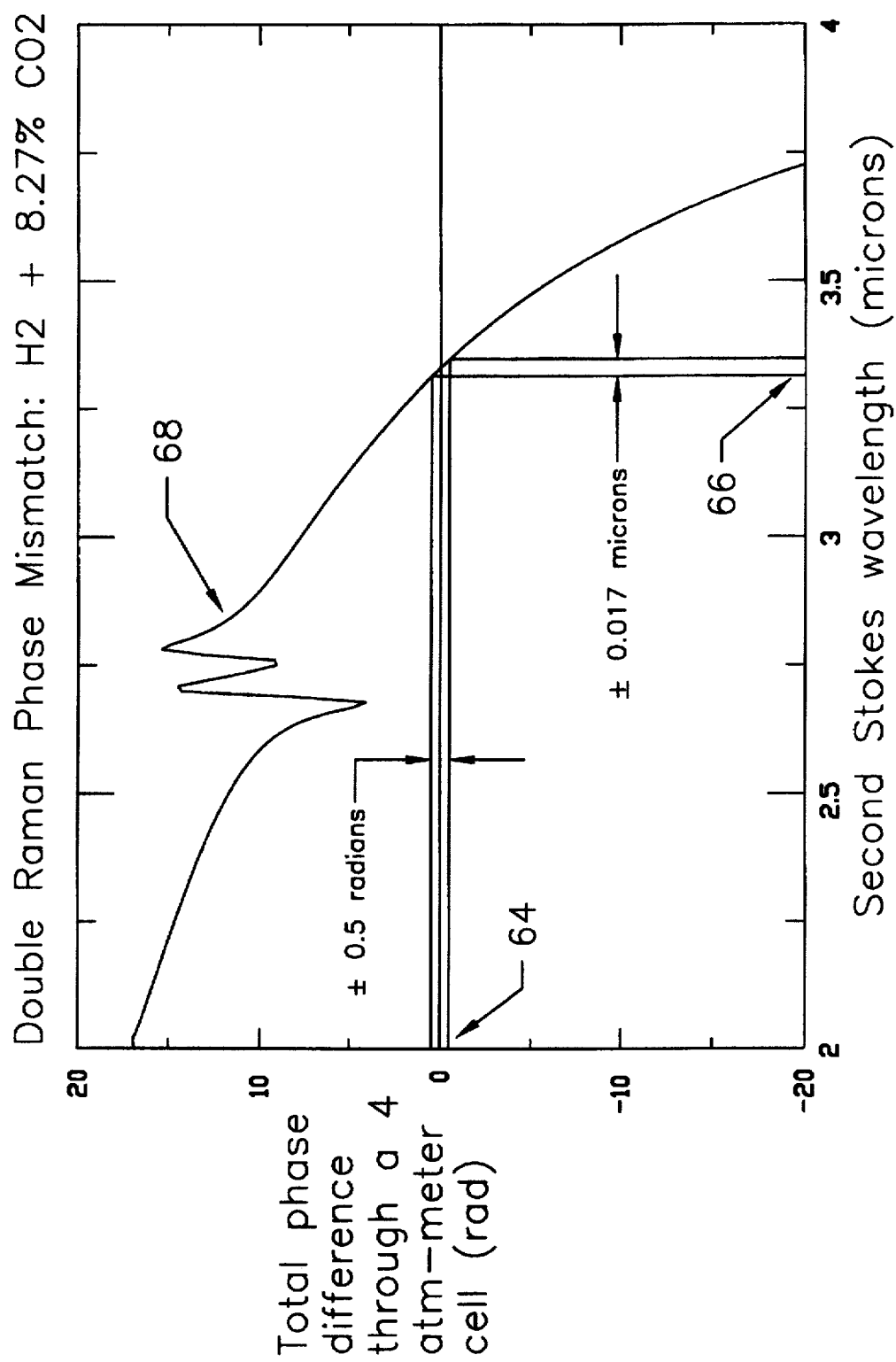
FIG. 9 is a graph depicting the phase mismatch as a function of wavelength for the CO2 and H2 Raman cell of FIG. 6.

The phase mismatch as a function of wavelength is shown in FIG. 9 using the mixture of 8.27% CO2 and H2 as the medium 45 in the cell 51. While a comparatively small amount of CO2 is necessary to correct the phase mismatch, such percent of CO2 only gives a narrow band of good performance. For example, an acceptable phase mismatch range 64 from zero total phase difference is within a phase mismatch of plus or minus 0.5 radians. With the phase mismatch curve in FIG. 9 for 8.27% CO2 n H2, as the medium 45, sufficient phase matching can be maintained over a nominal wavelength range 66 of 0.034 microns of the output laser pulse 47.

Mixture of NH3 and H2 As Medium 45

The addition of NH3 also phase matches the four-wave-mixing process at 3.35 microns as shown in FIG. 7. Although the large 42.1% concentration increases the collisional damping rate (thereby reducing the Raman gain), there are benefits to the use of NH3. For example, in FIG. 7 the bulk refractive index curve is smoother over wavelength as compared to the curve in FIG. 6. Thus the four-wave-mixing process with NH3 and H2 remains optimal over a wider wavelength phase-matched (or tuning) band or range 66 (e.g., 0.14 nm in FIG. 10) which extends away from the selected 3.35 micron center because the wavelength of the second Stokes pulse 47 may be tuned (as described below).

Figure 10:
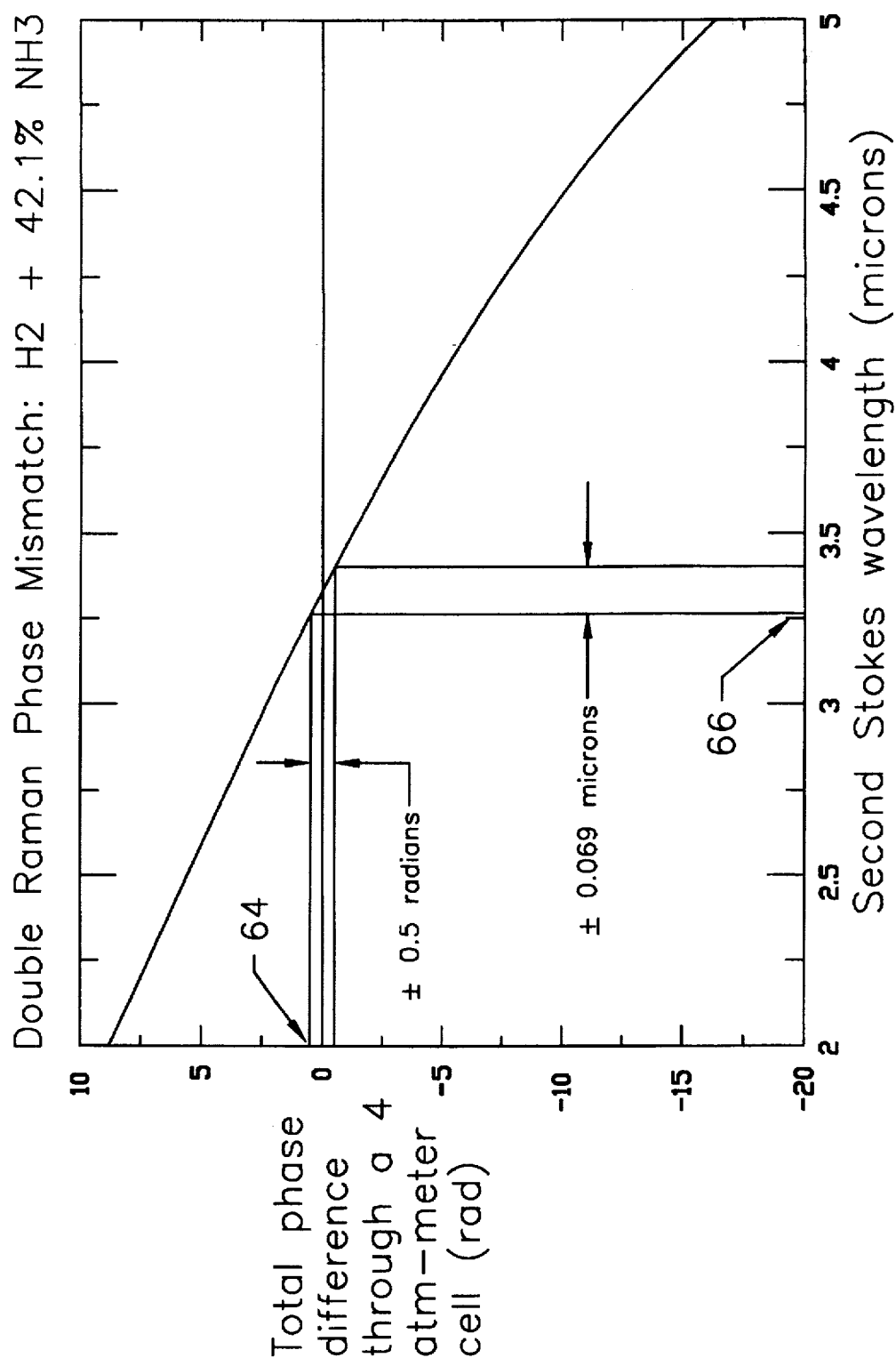
FIG. 10 is a graph depicting the phase mismatch as a function of wavelength for the NH3 and H2 Raman cell of FIG. 7.

The phase mismatch as a function of wavelength is shown in FIG. 10 for the cell 51 having 42.1% NH3 and 57.9% H2 as the medium 45. As shown in FIG. 10, the phase difference curve is flatter for NH3 than for CO2, which enables NH3 to provide phase matching over a larger band 66 of wavelength of the output pulse 47. In particular, when using NH3 as the phase matching gas, acceptable phase matching is maintained over the band 66 having a nominal 0.14 micron width, such that the wavelength of the output laser pulse 47 may be tuned because the refractive index is more strongly altered, which occurs near a transition like 68 (FIG.9), though in the more nonlinear fashion shown in FIG. 6, (i.e., the slope is greater at 3.3 microns in FIG. 9 (CO2) than in FIG. 10 (NH3). The transition which dominates the index of refraction curve is off the long wavelength edge of FIGS. 6,7 and 11 and not the weak transition 68.

Phase Matching at 4.5 Microns

Figure 11:
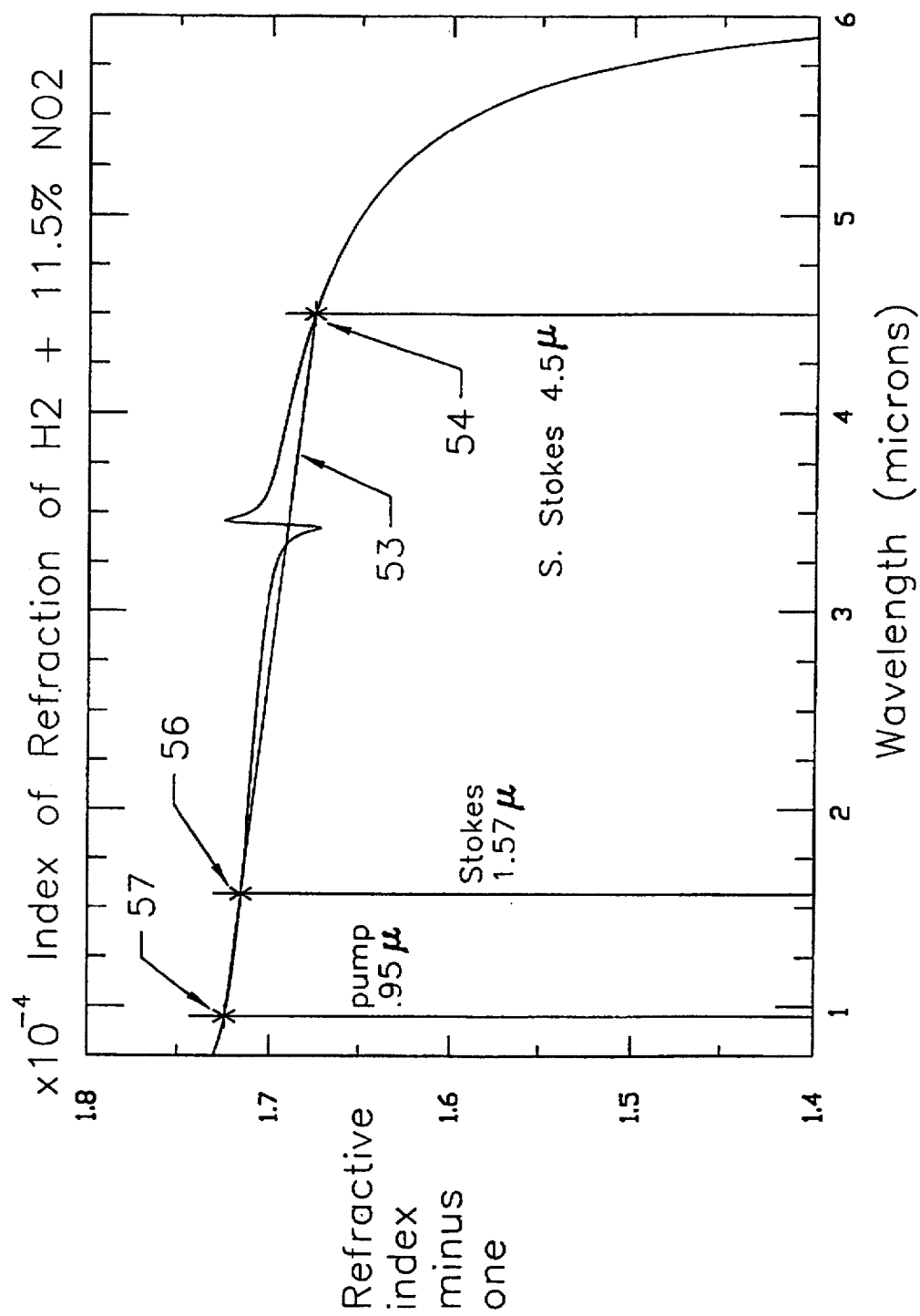
FIG. 11 is a graph depicting the refractive index of an H2 Raman cell containing 11.5% nitrogen dioxide (NO2) as a function of wavelength, with points marked to represent the refractive index corresponding to the wavelengths of the pump pulse, the first Stokes pulse, and the second Stokes pulse used for generating a 4.5 micron second Stokes output laser pulse.
Figure 12:
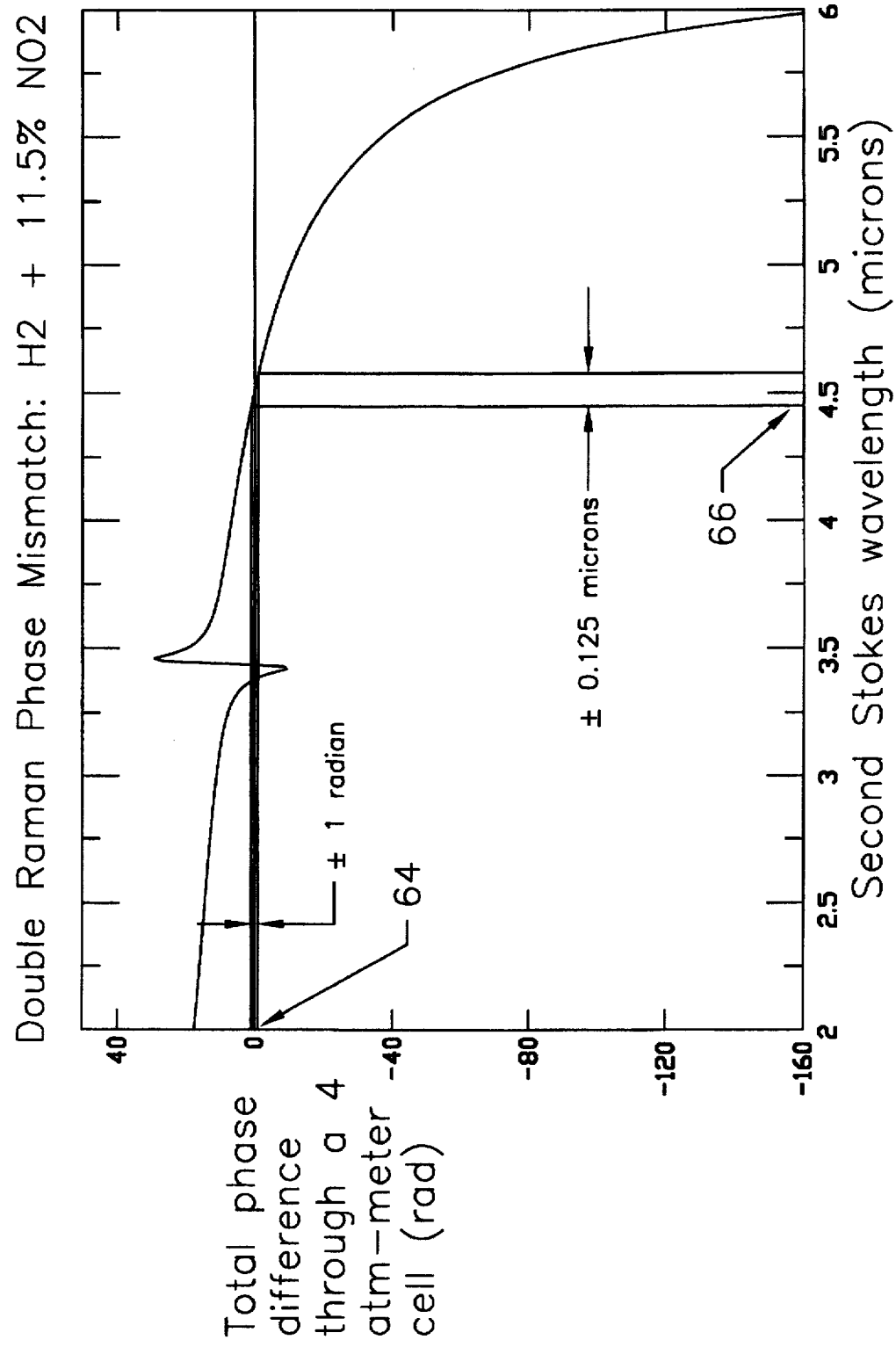
FIG. 12 is a graph depicting the phase mismatch as function of wavelength for the NO2 and H2 Raman cell of FIG. 11.

Using the method described above, two phase matching gases may be used as embodiments for generation of 4.5 micron second Stokes pulses 47. In particular, 11.5% of NO2 or 48.5% of NO provides phase matching. The lower concentration of NO2 is preferred to reduce collisional damping. The index of refraction of 11.5% NO2 in H2 is shown in FIG. 11, and the phase mismatch as a function of wavelength is shown in FIG. 12. The phase matched band 66 with the given NO2 concentration of 11.5% is about 0.2 microns. The phase mismatch as a function of NO2 concentration is shown in FIG. 13. The concentration must be controlled to a few tenths of a percent to achieve the acceptable phase matching.

Phase Matching At 6.0 Microns

Two possible gases can be used for phase matching to generate 6 micron second Stokes output pulses 47, e.g., either 37% NH3 or 1% NO2 can be used. With 1% NO2 the phase matching band is very small compared to NH3. The required concentration of NO2 increases rapidly as the output wavelength is shortened to the 11.5% value needed at 4.5 microns.

In the embodiments described, phase matching via the use of an index-modifier gas (or a plurality of such gases) is an important way of increasing efficiency of conversion of the input initial pulse 41 to the second Stokes pulse 47. To maintain maximum efficiency, the concentration of the gas in the medium should be adjusted if the wavelength of the output laser pulse 47 is tuned by more than about 0.1 microns.

Once the phase of the medium 45 has been picked, the relative phase between the pump light 41, the first Stokes pulse 46, and the second Stokes pulse 47 should be maintained for best gain. Due to collisional damping the medium 45 can respond to slow changes in the relative phase with little effect on the gain.

Other Gases For the Medium 45

Hydrogen deuteride has an intrinsic Raman shift of 3628 cm$^{-1}$, deuterium has an intrinsic Raman shift of 2991 cm$^{-1}$, and methane has an intrinsic Raman shift of 2916 cm$^{-1}$. These gases are useful in generating double-Raman shifts smaller than the intrinsic Raman shift of 4155 cm$^{-1}$ of H2. For example, a Raman device 43 filled with deuterium will double-Raman shift the Cr:LiSAF tuning band 44 of 750 nm to 1000 nm to infrared wavelengths of from 1.36 microns to 2.49 microns. These gases other than H2 may be selected and used according to the same principles as described above for H2. These gases have absorption bands at wavelengths just longer than the second Stokes wavelength.

Energetically Forbidding Third and Higher Stokes Radiation

Apart from phase matching, increases are achieved in the efficiency of conversion of the initial pulse 41 to the second Stokes pulse 47 by not allowing third and higher Stokes radiation to significantly occur. In particular, in many embodiments of the present invention the parameters of the Raman device 43 are selected so that third and higher Stokes orders are energetically forbidden. For example, if H2 is the medium 45 in the Raman cell 51, the fundamental Raman shift intrinsic to H2 is a wavenumber shift of 4155 cm$^{-1}$. If the initial laser pulse 41 is at 900 nm (or a wavenumber of 11,111.11 cm$^{-1}$), then the first Raman shift in hydrogen will be to (11,111.11 cm$^{-1}$−4155 cm$^{-1}$)=6956.11 cm$^{-1}$. This corresponds to 1.437 microns. The second Raman shift in H2 will be to (6956.11 cm$^{-1}$4155 cm$^{-1}$)=2801.11 cm$^{-1}$, corresponding to 3.570 microns, which is within the design output wavelength of the second Stokes pulse 47. If a third Raman shift were to occur, it would be to (2801.11 cm$^{-1}$–4155 cm$^{-1}$)=–1353.89 cm$^{-1}$. This is physically impossible since the negative wavenumber implies a negative photon energy in the third shift. In other words, the third Raman shift from 2801.11 cm$^{-1}$ cannot occur in H2 since the second Raman shifted photon has less energy than the intrinsic Raman shift in H2. The third Raman shift is said to be "energetically forbidden" under these conditions. This is a desirable and specifically sought condition in the Raman cell 51 which maximizes the photon transfer to the second Raman shift wavelength, while eliminating higher order Raman shifts to stop the energy cascade at the design wavelength.

With the 900 nm initial pulse 41 in mind, it may be understood that a third Raman shift is not allowed in the Raman device when the wavelength of the initial pulse 41 is longer than 802 nm because at this wavelength the second Stokes photon energy becomes less than that of the intrinsic Raman shift in hydrogen. In summary, with the above-described phase matching of only the three pulses 41, 46, and 47, the anti-Stokes shifted light is minimized by a lack of phase matching. The elimination of the competing third Stokes process via selection of the wavelength of the initial pulse 41 (to be above 802 nm), and the minimization of the anti-Stokes process, are a significant benefit because the photons then accumulate at the desired second Stokes wavelength, resulting in high conversion efficiency to the 2 to 6 micron output laser pulse 47. Such selected wavelength (e.g., 802 nm) has a value such that the intrinsic shift of the wavelength of the initial light pulse 41 to the third Stokes order results in a third Stokes wavelength of such length that the Raman device 43 diffracts the third stokes radiation away from an intense focus region before depleting significant energy from the second Stokes radiation 47.

Laser Pulse Generators 40 and 70

Laser pulse generators of the present invention are provided with a laser oscillator cavity, such as the cavity 42 of the generator 40 shown in FIG. 14A, and the Raman device 43. The generator 40 is designed to output the second Stokes output pulse 47 at a given wavelength in the output range 48. Another embodiment of the laser generator of the present invention, a laser pulse generator 70 (FIGS. 14b and 15a), is tunable to provide the second Stokes output pulse 47 having any wavelength in the output range 48 of 2 to 6 microns.

Figure 14B:
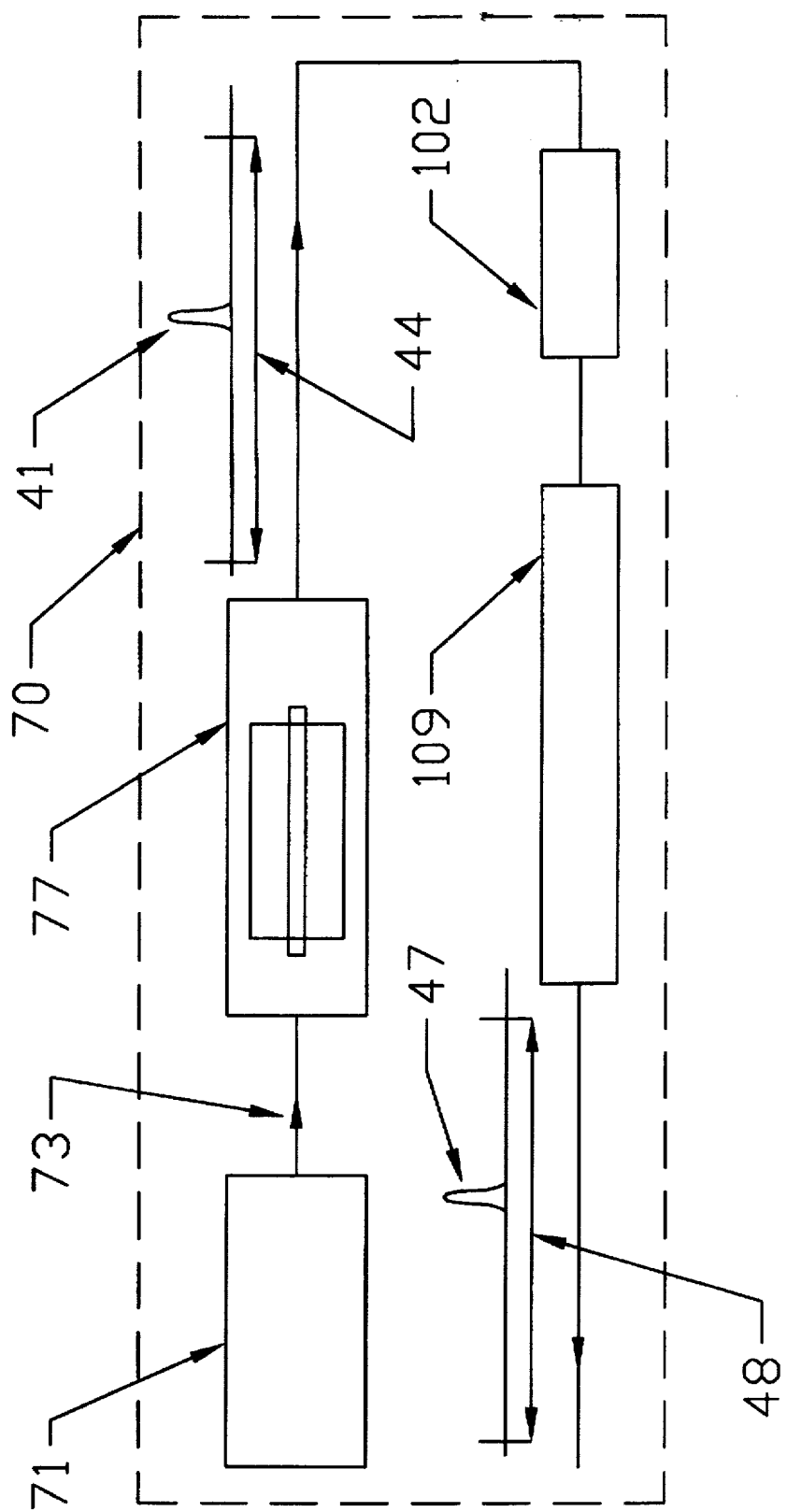
FIG. 14c is a schematic diagram of another embodiment of apparatus which outputs a tunable, double Raman shifted laser pulse at a fixed wavelength within a nominally 2 to 6 micron range according to the present invention, wherein due to efficiencies resulting from phase matching of pulses in a Raman device no amplification of such pulses is necessary.
Figure 14C:
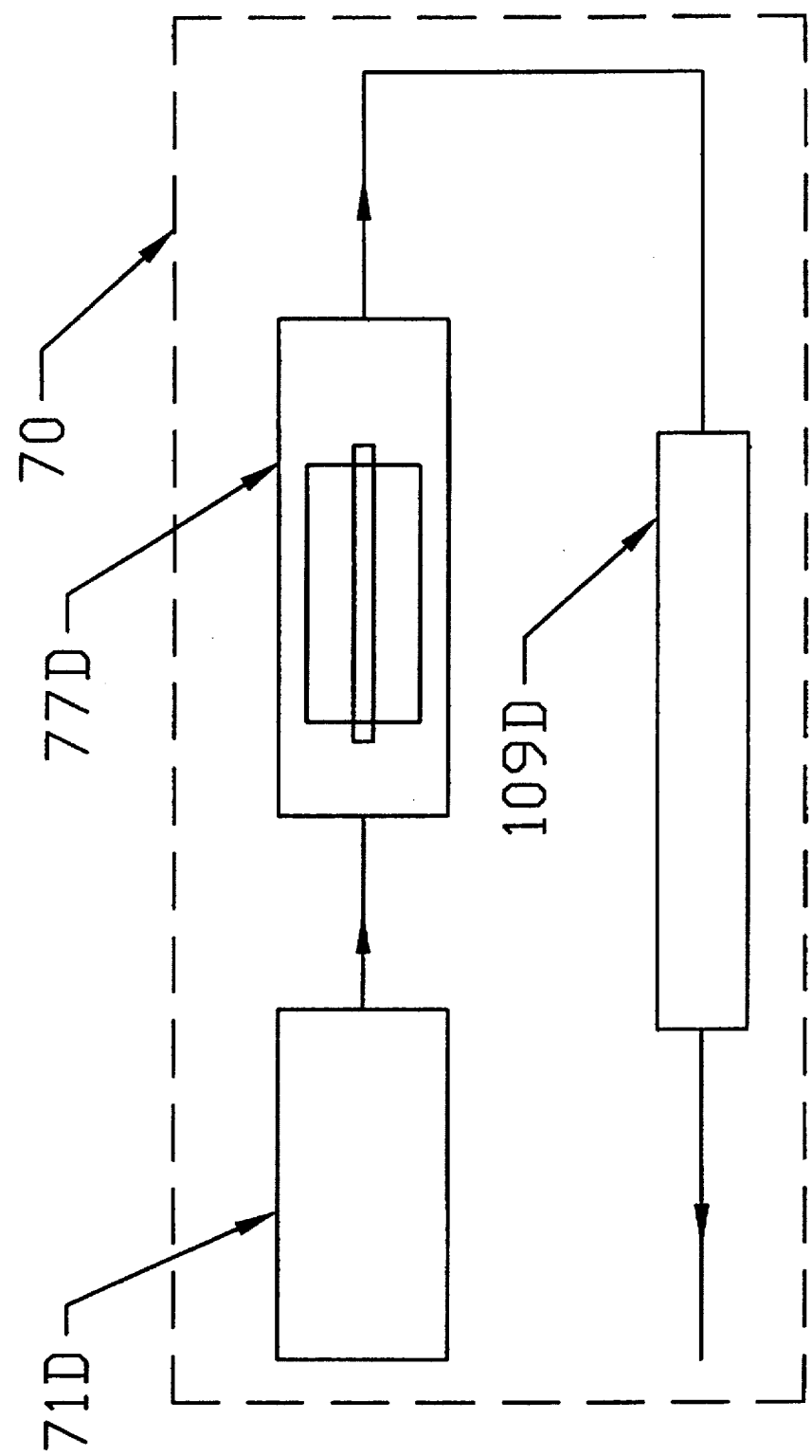
Figure 15A:
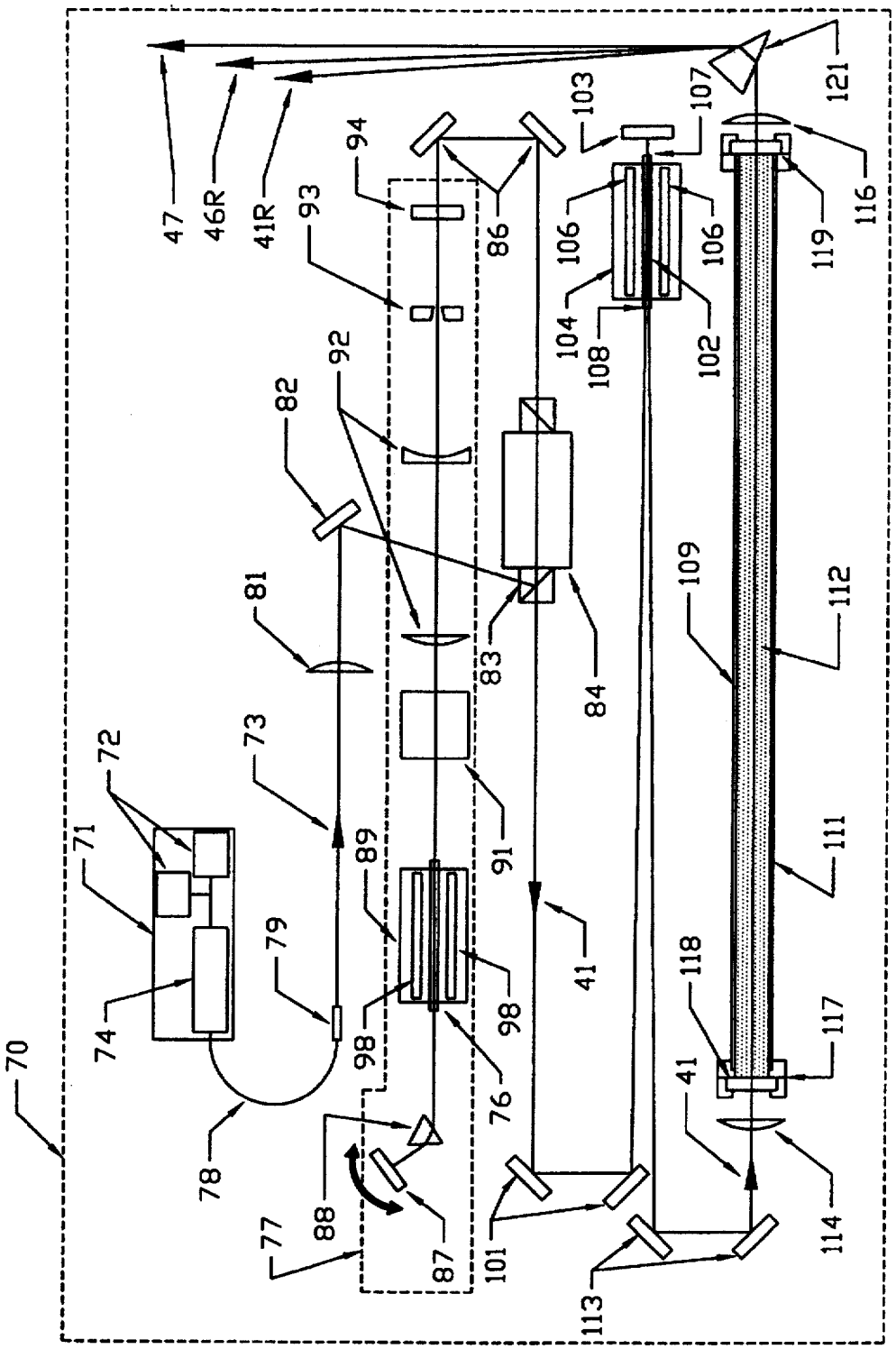
FIG. 15a is a more detailed schematic diagram of the embodiment shown in FIG. 14b, showing an injection seeder, an oscillator laser cavity and a Raman device for generating the output laser pulse at the tunable wavelength within the nominally 2 to 6 micron range according to the present invention.

Referring to FIGS. 14b and 15a, a preferred embodiment of the present invention is shown including apparatus for generating the output laser pulse 47 having any wavelength within the output range 48 of nominally 2 to 6 microns. A diode laser injection seeder 71 contains one or more single mode diode lasers 72 (FIG.15a) with a typical emission bandwidth of about 0.0004 nm and typical output power of a few milliwatts continuous wave. The wavelength of seeder light 73 emitted from the injection seeder 71 can be tuned over a range of nominally 750 nm to 1000 nm by selecting different internal single mode diode lasers 72. Also, tuning may be done via temperature tuning, current tuning, or extended cavity tuning one of the internal single mode diode lasers 72. The diode laser injection seeder 71 also contains a Faraday isolator 74 with about 30 db or more of isolation to help prevent damage to the diode lasers 72 by leakage feedback. The seeder light 73 from the injection seeder 71 is used to cause an oscillator laser rod 76 of an oscillator laser cavity 77 to selectively lase at cavity mode wavelengths adjacent to the wavelength of the seeder light 73.

The seeder light 73 is coupled into the oscillator laser cavity 77 through a single mode polarization-maintaining optical fiber 78. The fiber 78 is oriented so that the seeder light 73 is s-polarized. The optical fiber 78 is terminated in a graded index lens 79 which nearly collimates the seeder light 73. Lens 81 matches the mode of the seed diode laser output 73 to the mode of the oscillator laser cavity 77. The seeder light 73 is then coupled into the oscillator laser cavity 77 by reflection off a high reflectivity turning mirror 82, and into a side entry/exit port 83 of a second Faraday isolator 84 which rotates the polarization of the seeder light to p-polarization. Then via turning mirrors 86 the seeder light 73 is transmitted into the oscillator laser cavity 77. The cavity 77 is formed by a highly reflective tiltable end mirror 87, a Brewster angle dispersing prism 88, the oscillator rod 76, an oscillator flashlamp pumping chamber 89, a Pockels cell Q-switch 91, an oscillator cavity telescope 92, an oscillator cavity aperture 93, and a partially reflective output coupler end mirror 94. The Brewster angle dispersing prism 88 and the tiltable end mirror 87 limit the wavelengths which will oscillate within the oscillator laser cavity 77 to a bandpass of about 0.1 nm. Wavelengths away from this interval are dispersed out of the cavity 77. The Brewster angle dispersing prism 88 also provides loss for s-polarized light to facilitate Q-switching. This nominal 0.1 nm oscillator bandpass can be selected within the 750 nm to 1000 nm wavelength range 44 by tilting the high reflectivity end mirror 87. The nominal 0.1 nm oscillator bandpass limits the number of modes which will oscillate in the cavity 77 and makes injection seeding easier.

Figure 1:
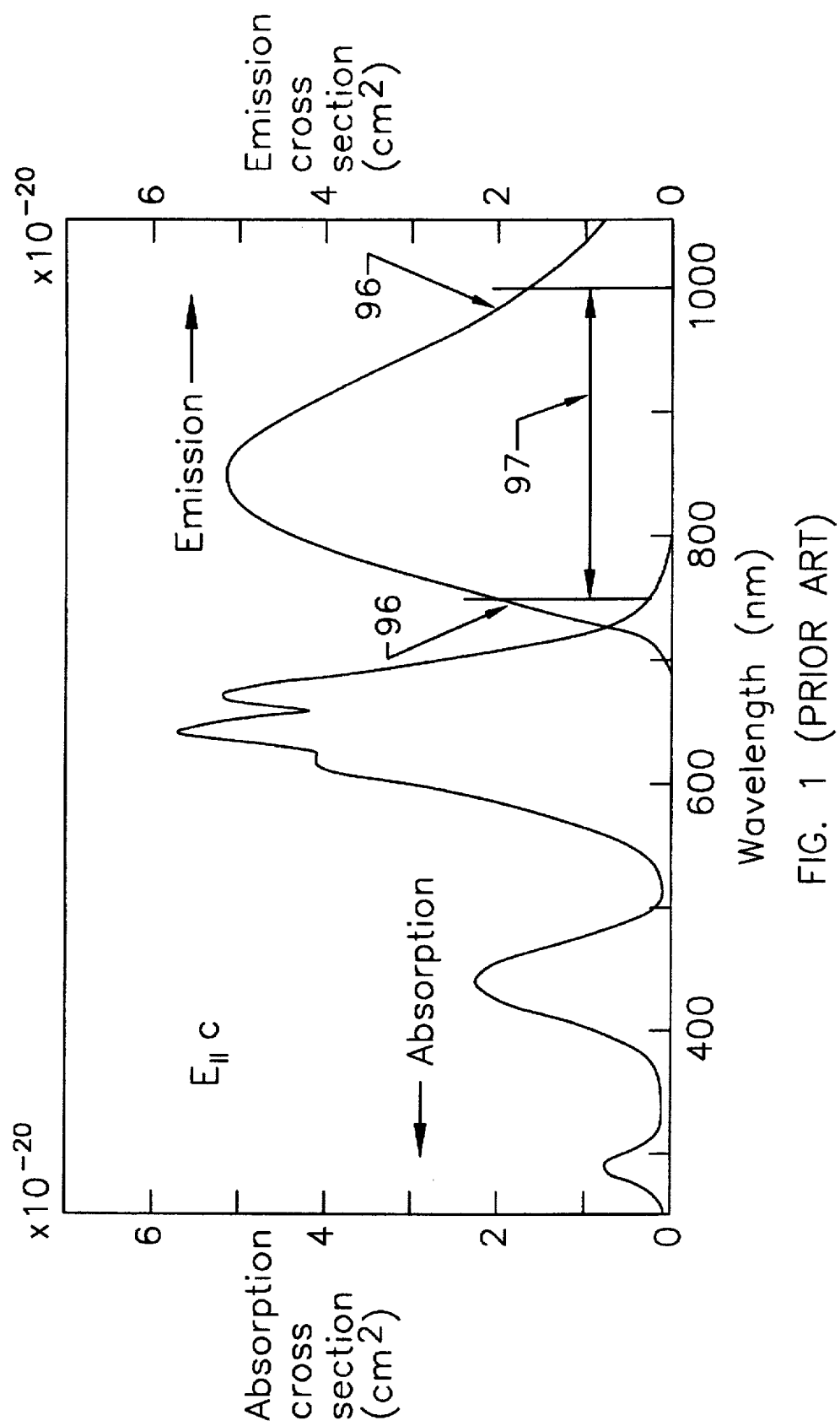
FIG. 1 is a graph of the absorption and emission cross sections for an oscillator rod fabricated from Cr:LiSAF, where the curves are for the polarization parallel to the c axis which is the polarization having the highest gain.

The power of the seeder light 73 inside the cavity 77 must dominate the spontaneous emission, which can be estimated using ½ photon per mode under the unseeded laser bandpass. For example, in the generator 70, sixteen microwatts of seeder light 73 inside the cavity 77 is effective to dominate the spontaneous emission by a factor of 100. Tuning the output wavelength of the oscillator light 41 therefore includes two steps: first, adjusting the diode laser injection seeder 71 to the selected wavelength, and then rotating the high reflectivity end mirror 87 so that the wavelength of the seeder light 73 (which has a bandwidth of nominally 0.0004 nm) is contained within the nominal 0.1 nm oscillation bandpass of the cavity 77. This limited 0.1 nm oscillator bandpass is most important when the chosen wavelength of the seeder light 73 is on the wings 96 (FIG. 1) of the emission band of the oscillator rod 76. To cover the entire 750 nm to 1000 nm band 44, different sets of end mirrors 87 and 94 with narrow band anti-reflection coatings should be used.

The oscillator flashlamp pumping chamber 89 has two flashlamps 98, one on either side of the rod 76. The discharge of the flashlamp 98 is nominally 150 microseconds in duration. A voltage near the ¼ wave voltage is applied to the Pockels cell Q-switch 91 just prior to firing the flashlamps 98. The voltage on the Pockels cell Q-switch 91 is shorted to zero to Q-switch out an initial laser pulse 41 having a nominally 90 ns duration. After the flashlamps 98 have fired, the high voltage supply (not shown) to the Pockels cell Q-switch 91 is turned off and the Pockels cell Q-switch 91 is shorted to ground until the next initial pulse 41 is requested.

The oscillator cavity telescope 92 expands the initial pulse 41 inside the oscillator cavity 77 to fill the oscillator rod 76 and acts to prevent optical damage to the oscillator rod 76. The oscillator cavity telescope 92 also provides focusing to generate a stable oscillator mode. The aperture 93 limits lasing to a single transverse mode.

In the embodiment shown in FIGS. 14b and a, the oscillator rod 76 is 5 mm in diameter and is made of Cr:LiSAF. When the oscillator laser rod 76 is made from Cr:LiSAF, the output coupler end mirror 94 has a nominal 60% reflectivity. The initial laser pulse 41 emitted from the oscillator laser cavity 77 has a Q-switched pulse energy of 50 to 75 mJ in the nominal 90 ns pulse duration, has a nominal bandwidth of 0.0004 nm, and is limited to longitudinal cavity modes adjacent to the wavelength of the seeder light 73. The initial laser pulse 41, which is the output of the oscillator laser cavity 77, is reflected off the turning mirrors 86, passed through the second Faraday isolator 84 (which contains two polarizers (not shown) and the side exit port 83) and is reflected by turning mirrors 101 before reaching an amplifier laser rod 102. The second Faraday isolator 84 acts as a one way light valve with a nominal isolation of 30 dB to prevent the powerful pulse from the amplifier laser rod 102 from leaking back to damage the optical fiber 78 or the diode laser injection seeder 71. The second Faraday isolator 84 combines with the first Faraday isolator 74 (contained internal to the diode laser injection seeder 71) to give a nominal 60 db isolation between the output of the oscillator cavity 77 (the initial pulse 41) and the seed diode laser 72.

The amplifier laser rod 102 is used to increase the power of the initial light pulse 41 to a peak value of at least 1 megawatt, which is the power at which the Raman device 43, for example, is responsive to shift the wavelength of the initial light pulse 41 to the second Stokes wavelength.

The amplified initial pulse 41 is then directed by a turning mirror 103 to make one or more passes through the amplifier laser rod 102. An amplifier flashlamp pumping chamber 104 is a duplicate of the oscillator flashlamp pumping chamber 89 and is also pumped by twin flashlamps 106 with a nominal 150 microsecond flashlamp discharge duration. The turning mirror 103 is a high reflector at the wavelength of the initial pulse 41 and is placed a few millimeters from an end 107 of the amplifier laser rod 102 to reduce beam clipping at an opposite end 108 of the amplifier laser rod 102. Although FIG. 15A illustrates two passes through the amplifier laser rod 102, any number of passes can be used, with two to four passes being typical.

In summary, the initial pulse 41 is amplified to a nominal 150 mJ pulse energy in a 90 ns pulse duration at a chosen wavelength (as selected by the diode laser injection seeder 71). The amplified initial laser pulse 41 has a nominal 0.0004 nm bandwidth and forms the input to a Raman device 109 of the laser pulse generator 70. The Raman device 109 includes a cell 111 which may be filled with H2 medium 112 and has a nominal length of 1 meter and a nominal fill pressure of 10 atmospheres. The Raman cell 111 is designed for response to input laser light, such as the initial laser pulse 41, having a minimum peak value of power (e.g.1 MW). In response to such minimum peak value, the cell 111 shifts the wavelength of the input pulse to the second Stokes wavelength. In the case of the 150 mJ initial laser pulse 41, the minimum peak value of power is exceeded, and in response to the medium 112 in the cell 111 shifts the wavelength of the initial laser pulse 41 to the second Stokes wavelength, within the range 48 of from 2 to 6 microns.

If the pressure of the medium 45 in the Raman cell 111 is increased above 10 atmospheres, the time needed to reach equilibrium decreases. This improves the conversion of the pump light, or initial pulse, 41 to the first Stokes pulse 46 for the early part of the pump pulse (shown as 34a, 34b, and 34c in FIG. 3), and decreases the conversion for the later part of the pulse 34. Since there is more energy in the early part of the depleted pump pulse 34 as shown in the curve 34c (FIG. 3), increasing the pressure gives some improvement in conversion efficiency. The Raman gain coefficient will not increase as the H2 pressure is increased above nominally 10 atmospheres because the effect of adding more scattering molecules is cancelled by the increased rate of collisions.

A further effect of increasing the pressure above 10 atmospheres is decreased efficiency of four-wave-mixing which generates the second Stokes pulse 47 and the anti-Stokes light. The decreased efficiency is a result of increased differences in the index of refraction between the pump light 41, the first Stokes pulse 46, the second Stokes pulse 47 and the anti-Stokes light wavelengths. The decreased four-wave-mixing efficiency has benefits because it reduces the loss to anti-Stokes, but is less desirable because it reduces conversion to second Stokes pulse 47. However, by adding a proper amount of phase matching gas to the medium 45, the second Stokes four-wave-mixing process efficiency is increased beyond that of the 10 atmospheres of pure H2 and the parasitic anti-Stokes four-wave-mixing competition will be below that of the 10 atmospheres pure H2 medium 45. The parasitic loss to anti-Stokes will thus be decreased for a higher pressure medium 45. The higher pressure also makes adding a second Stokes phase matching gas more important.

Referring to FIG. 15a, the initial amplified pump pulse 41 is reflected off turning mirrors 113 into the Raman cell 111 and is focused inside the Raman cell 111 by a focusing lens 114 effective at the wavelength of the initial pump pulse 41. The output of the Raman cell 111, which is the second Stokes pulse 47, is collimated again after leaving the cell 111 by another focusing lens 116 effective at the nominally 2 to 6 micron wavelength of the pulse 47. In particular, the initial pump pulse 41 is focused as close as possible to an input end 117 of the Raman cell 111 to prevent backward stimulated Raman scattering while still being focused far enough from an input Raman cell window 118 to prevent optical damage to the input window 118. The input Raman cell window 118 is anti-reflection coated and can, for example, be made of BK7 glass. An output Raman cell window 119 is also anti-reflection coated and has high transmission in the 2 to 6 micron range 48.

With the above-described phase matching, the output second Stokes pulse 47 from the Raman cell 111 is co-linear. The pulses from the Raman cell 111 include the second Stokes pulse 47, residual first Stokes output pulse 46R, and a residual pump pulse 41R. The pulses 41R, 46R and 47 have different wavelengths and thus are dispersed at different angles by a ZnSe Brewster dispersing prism 121. The final desired output of the Raman cell 111 in the nominally 2 to 6 micron wavelength range 48 is the second Stokes pulse 47.

Laser Pulse Generator 123

Figure 15B:
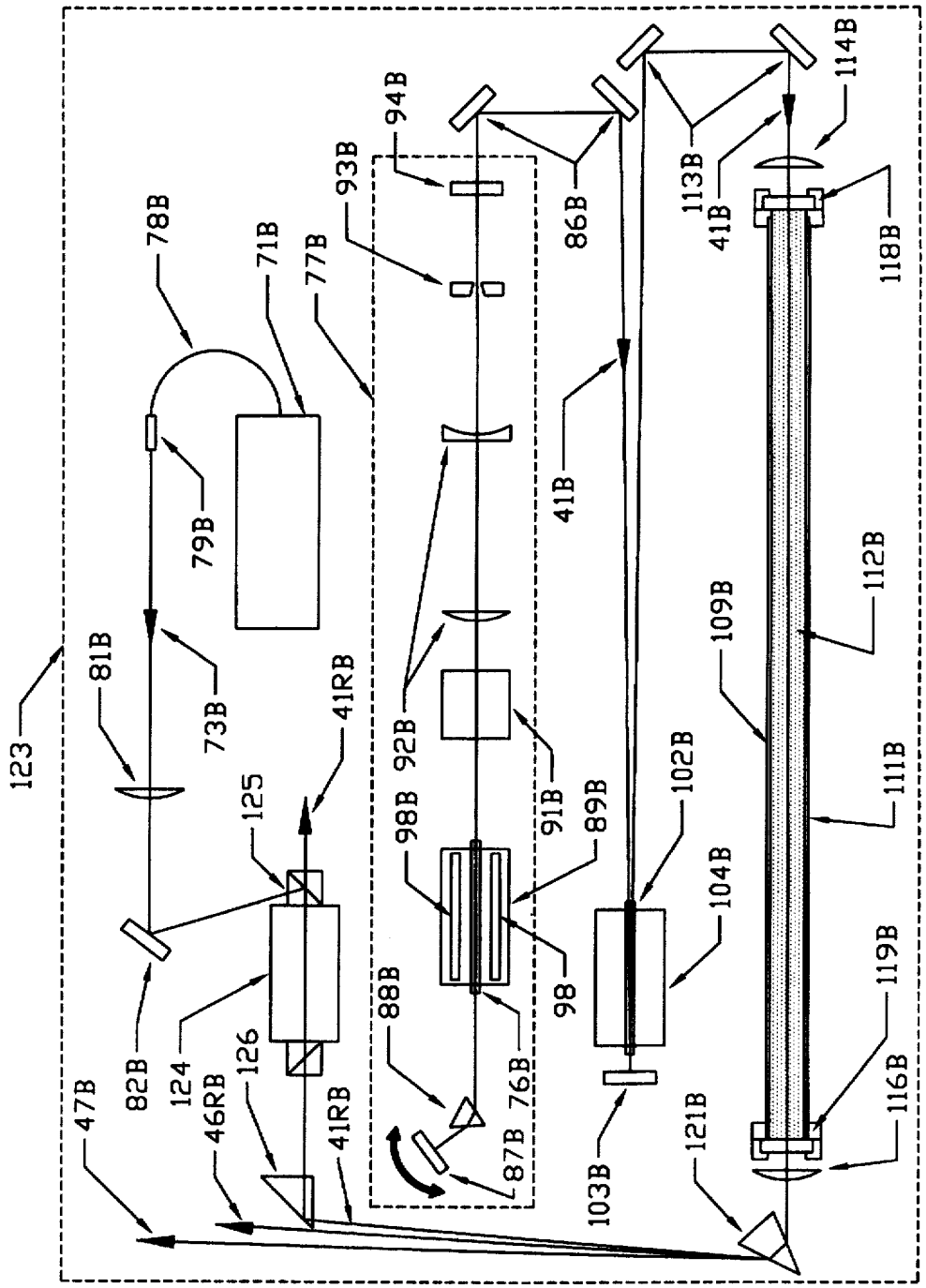
FIG. 15b is a detailed schematic diagram of a variation of the embodiment shown in FIG. 15A, differing in the location of a second Faraday isolator in the optical sequence of laser elements.

A somewhat different embodiment of a laser pulse generator of the present invention is shown in FIG. 15b. There, a laser pulse generator 123 is shown differing from the generator 70 of FIG. 15a essentially in the manner of coupling the diode laser injection seeder light 73 into the oscillator laser cavity 77. The elements of the generator 123 that are common to those of the generator 70 are identified in FIG. 15b with a "B" after the reference number used in FIG. 15a.

The generator 123 shown in FIG. 15b eliminates loss caused by the second Faraday isolator 84 (FIG. 15a) which is located between the oscillator cavity 77 and the Raman cell 111. In the generator 123 of FIG. 15b, a second Faraday isolator 124 couples injection seeder light 73B into a Raman device 109B and is not located in the path of the initial pump pulse 41 from the oscillator cavity 77. In greater detail, in FIG. 15b, the injection seeder light 73B is also mode matched to the oscillator cavity 77B by a lens 81B, and then injected into the second Faraday isolator 124 through a side entry/exit port 125 of the second Faraday isolator 124 to provide the seed light 73B at the proper wavelength via a Brewster prism 126. However, the injection point for the injection seeder light 73B in the generator 70 (FIG. 15a) is directly into the cavity 77 via the turning mirrors 86. This results in the Faraday oscillator 84 being the first element in the output path of the initial or pump light 41 from the cavity 77. Thus, after output of the pump light 41 from the cavity 77, the second Faraday isolator 84 is before the amplifier rod 102 and also before the Raman cell 111. On the other hand, the second Faraday isolator 124 is not in the path of the pump pulse 41B between the cavity 77B and the Raman device 109B nor is it before the Brewster prism 121B. Thus, in the generator 123 shown in FIG. 15b, the power of the oscillator output beam (which is the initial laser pulse or pump pulse 41B) is not reduced by the second Faraday isolator 124. This location of the second Faraday isolator 124 results in more input power to the amplifier rod 102B, more power of the amplified initial pulse 41B going to the Raman cell 111B, and more power of the Raman double shifted light (the second Stokes pulse 47B) which is the desired nominally 2 to 6 micron laser output of the generator 123.

In greater detail, the Faraday isolator injection point for the injection seeder light 73B in FIG. 15b lies only in the path of the residual pump pulse 41RB (via the Brewster prism 125), and not in the path of the residual first Stokes pulse 46RB, and not in the path of the second Stokes pulse 47 (the nominally 2 to 6 micron tunable output). This prevents the second Faraday isolator 124 from causing losses in the pump pulse 41B, while still mode matching the injection seeder light 73B to the oscillator cavity 77B and protecting the injection seeder 71B from being damaged by the powerful second Stokes output pulse 47B.

Oscillator Raman Device 109E

Figure 16:
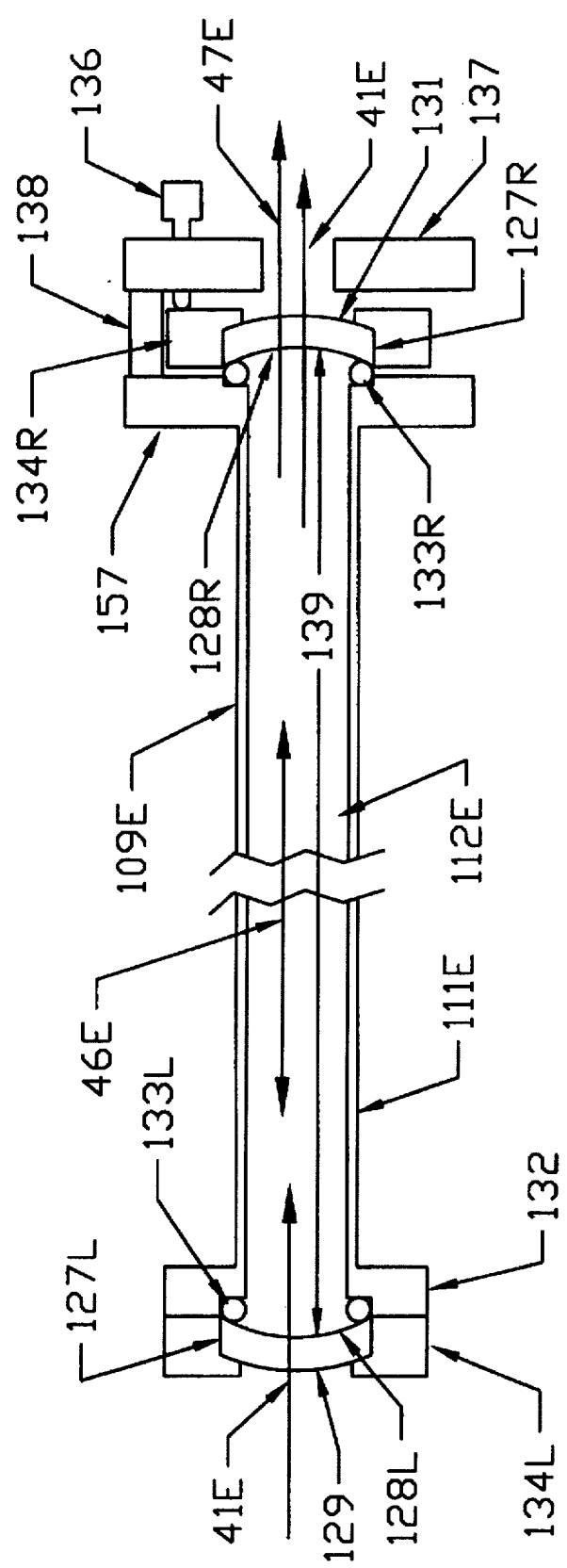
FIG. 16 is a detailed schematic diagram of a variation of the Raman device which captures the first Stokes light in a cavity.

In another embodiment of the present invention, the Raman device shown as 109 in FIG. 15a and 109B in FIG. 15b is modified and shown as a modified Raman device 109E in FIG. 16. The elements of the Raman device 109E that are common to those of the Raman device 109 are identified in FIG. 16 with an "E" after the reference number used in FIG. 15A. In this embodiment of the Raman device 109E the first Stokes light 46E resonates between two mirrors 127L and 127R which reflect the first Stokes pulse 46E and transmit both the pump pulse 41 and the second Stokes pulse 47. In this sense, the Raman device 109E is referred to as a resonator.

In greater detail, respective inner surfaces 128L and 128R of mirrors 127L and 127R are concave and coated to be better than 95% reflective at the wavelength of the first Stokes pulse 46. This coating transmits more than 95% at the wavelengths of both the pump pulse 41 and the second Stokes pulse 47. An outer surface 129 of the mirror 127L is convex and coated to be anti-reflective at the wavelength of the second Stokes pulse 47, while a convex surface 131 is coated to be anti-reflective at the wavelength of the pump pulse 41. The cell 111E has a flange 132 to accept an O-ring 133L. The mirror 127L is held against the O-ring 133L by a flange 134R. On the other end of the cell 111E a flange 135 also accepts an O-ring 133R for sealing against the mirror 127R. However, the mirror 127R is angularly adjustable so that the Raman cell 109E forms a stable resonator at the wavelength of the second Stokes pulse 47 by way of the surfaces 128L and 128R. A small amount of adjustment of the mirror 127R is provided by compressing the O-ring 133R using three screws 136 spaced at 120 degree intervals around a second flange 137 (only one of the screws 136 is shown). The flange 137 is held rigidly to the flange 135 by three spacers 138 (only one spacer is shown). The screws 136 adjust the mirror 127R by pushing against flange 134R. The alignment of the right mirror 127R to the left mirror 127L can be accomplished using a helium neon laser (not shown). Final alignment should be made with the Raman medium 112E in the cell 111E. The length 139 of the resonator 109E should be matched to the optical path length of the oscillator laser cavity 77 or 77B. The tolerance of this matching is nominally one fourth the coherence length of the pump pulse 41. This matching causes the phase fluctuations in the pump pulse 41 to match the phase fluctuations of the first Stokes pulse 46 on successive round trips of the first Stokes pulse 46 in the resonator 109E.

The Raman device 109E, with its resonator feature, results in better conversion of the pump pulse 41 to the second Stokes pulse 47 than the device 109 or 109B. This is because containing the first Stokes pulse 46 in the cavity between the mirrors 127L and 127R improves conversion of the pump light 41 to the first Stokes pulse 46 by effectively increasing the interaction length for the Raman scattering. In addition, the resonator formed by the inner surfaces 128L and 128R continually return the first Stokes pulse 46 to an interaction region between the mirrors 127L and 127R resulting in better conversion of the first Stokes pulse 46 to the second Stokes output 47.

Oscillator Rods of Laser Pulse Generators 40, 70, and 123

The laser pulse generators 40, 70, and 123 each have the respective oscillator laser cavities 42, 77 and 77B. Such cavities 42, 77, and 77B may be provided with one of many types of oscillator rods, such as the oscillator rod 76.

Cr:LiSAF Oscillator Rods 76, 76B & 140: When the generator 40, 70, or 123 is to be capable of generating the second Stokes output pulse 47 at any wavelength in the 2 to 6 micron range 48, Cr:LiSAF material is used to fabricate the oscillator rod, such as a rod 140 of the generator 40 or the rod 76 or the rod 76B. Oscillator rods 76, 76B or 140 made from Cr:LiSAF are available from Lightning Optical of Tampa Springs, Fla. in the 5 mm diameter size noted above and capable of generating the 50 to 75 mJ energy and 90 ms duration of the initial pump pulse 41 as described above. The absorption and emission cross section characteristics of Cr:LiSAF are shown in FIG. 1A and 1B, indicating that the material has a wide emission band and a strong absorption band which overlaps well with broadband flashlamp pumping or diode laser pumping at 670 nm. An additional feature of the Cr:LiSAF material is its long upper state lifetime of 67 microseconds compared with 3 microseconds for Ti:SAF.

In using Cr:LiSAF, care must be given to limiting thermal loading. For example, in applications using a flashlamp such as the flashlamp 98 or 106 (FIG. 15a), thermal loading is limited by limiting the average flashlamp pump power to about 1 kW. Pumping with a diode laser array, significantly reduces thermal loading. Also in the use of oscillator rods (such as the rod 76) made of Cr:LiSAF material, care is taken to avoid dissolving the rod in the coolant liquid (not shown). For example, dissolving can be avoided by maintaining the pH of coolant water between 6.2 and 7.8. Alternatively FC-75 material sold under the brand name FLUORINERT can be used as the coolant to prevent dissolving the oscillator rods 76, 132 and 140.

Cr:LiCAF and Alexandrite Oscillator Rods 76, 76B & 140: When a tunable oscillator rod 76, 76B, or 140 is desired and a narrower absorption cross section meets the particular requirements, the material for the oscillator rods 76, 76B or 140 may be Cr:LiCAF or Alexandrite. The long wavelength tuning limit for both of these materials is around 800 nm, which when used with the Raman devices 43 or 109 of the present invention, for example, provide a second Stokes pulse 47 having a wavelength of 2.4 microns. A double Raman shifted oscillator rod 76, 76B, or 140 based on these materials would cover most of the 2.0 micron to 2.5 micron atmospheric transmission window.

Ti:SAF Oscillator Rods 76, 76B, and 140: Another laser material which facilitates double Raman shifting with the Raman devices 43 or 109, for example, according to the present invention is flashlamp pumped Ti:SAF material. The tuning range of oscillator rods 76, 76B, and 140 made from this material is approximately 710 nm to 910 nm, which double Raman shifts in a Raman device 43 or 109 having H2 as the medium 45 to provide the second Stokes pulses 47 in a band of 1.73 microns to 3.73 microns. However, shorter storage times, e.g., three microseconds, are provided by Ti:SAF material. Thus, the pump pulse 41 in this case has a pulse duration comparable to the storage time of the Ti:SAF laser rod, as may be provided by the flashlamp 98.

Providing Pulses 47 At Any Wavelength In The Range 48

In selecting a particular laser pulse generator 40, 70, or 123 to generate any wavelength second Stokes output pulses 47 within the range 48, the desired wavelength and other characteristics (such as power) of the pulse 47 are generally known in advance. Therefore, using the principles of the present invention a laser pulse generator 40, 70 or 123 may be provided for generating such pulses 47 having those characteristics. Referring to FIG. 15A, it may be understood that the properties of certain elements of the generators are selected according to those characteristics of the second Stokes output pulse 47. The Brewster prisms 88 and 121, Q-switch 91, rods 76 and 102, isolator 84, windows 118 and 119, lenses 81, 114, and 116, and the telescope 92 generally operate across the whole 2 to 6 micron range 48. However, the operating band of the tiltable mirror 87 and the high reflecting mirrors 86, 101, 103, and 113 is generally not sufficiently broad to cover the 750 nm to 1000 nm tuning range required to cover the full 2 to 6 micron band second Stokes. These elements are selected according to the portion of the 2 to 6 micron range 48 in which the wavelength of the output pulse 47 is located. Also, in the case of the laser pulse generators 70 and 123 (shown in respective FIGS. 15A and 15B) which have the respective diode injection seeders 71 or 71B, a particular diode injection seeder is selected to have a tuning range covering the wavelength which is desired for the respective initial pump pulse 41 or 41B. Finally, as described above in respect to phase matching, the particular gases, including the index-modifying gas or gases, for the medium 45 in the Raman cells 51, 111 or 111B are selected according to the desired wavelength of the second Stokes pulse 47.

Coarse tuning (0.1 nm) of the oscillator cavity 77 is accomplished using the Brewster dispersing prism 88. Fine tuning (within 0.0004) nm is achieved by the described injection seeding via selection of the diode laser 72. The single mode polarization preserving fiber 78 couples the seeder light 73 from the diode lasers 72 into the oscillator cavity 77. This provides good spatial filtering of the seeder light 73 and removes the requirement of having the seeder and wavelength monitoring optics rigidly mounted to the main laser frame (not shown).

Apparatus For Generating Temporally Closely Spaced Output Laser Pulses 47 In the 2 to 6 Micron Wavelength Range 48

Referring first to FIG. 18, another embodiment of the present invention is a multi-pulse laser pulse generator 141 which is based on most of the features of the laser pulse generators 40 or 70, with additional control features for generating a plurality of the second Stokes pulses 47. The features of the generator 141 that are common to the generator 70 are identified in FIG. 18 using the same reference numbers plus the letter "C", and reference is made to FIG. 15A for additional common features. Such pulses 47 are in the form of relatively high power, temporally closely spaced, output laser pulses 47C-1 and 47C-2 (FIG. 19) which occur within the duration of a single flashlamp discharge. In the generator 141, a first of the closely spaced output pulses 47C-1 may have any wavelength lambda 1 within the range 48 of nominally 2 to 6 microns. The second pulse 47C-2, succeeding closely spaced relative to the first pulse 47C-1, may have a chosen wavelength lambda 2 differing from the wavelength lambda 1 of the first laser pulse 47C-1 but still within the 0.1 nm bandwidth of oscillator 77. Such a high power, multiple pulse, 2 to 6 micron laser generator 141 is useful in fabricating 2–6 differential absorption (DIAL) lidar systems (not shown).

Figure 17B:
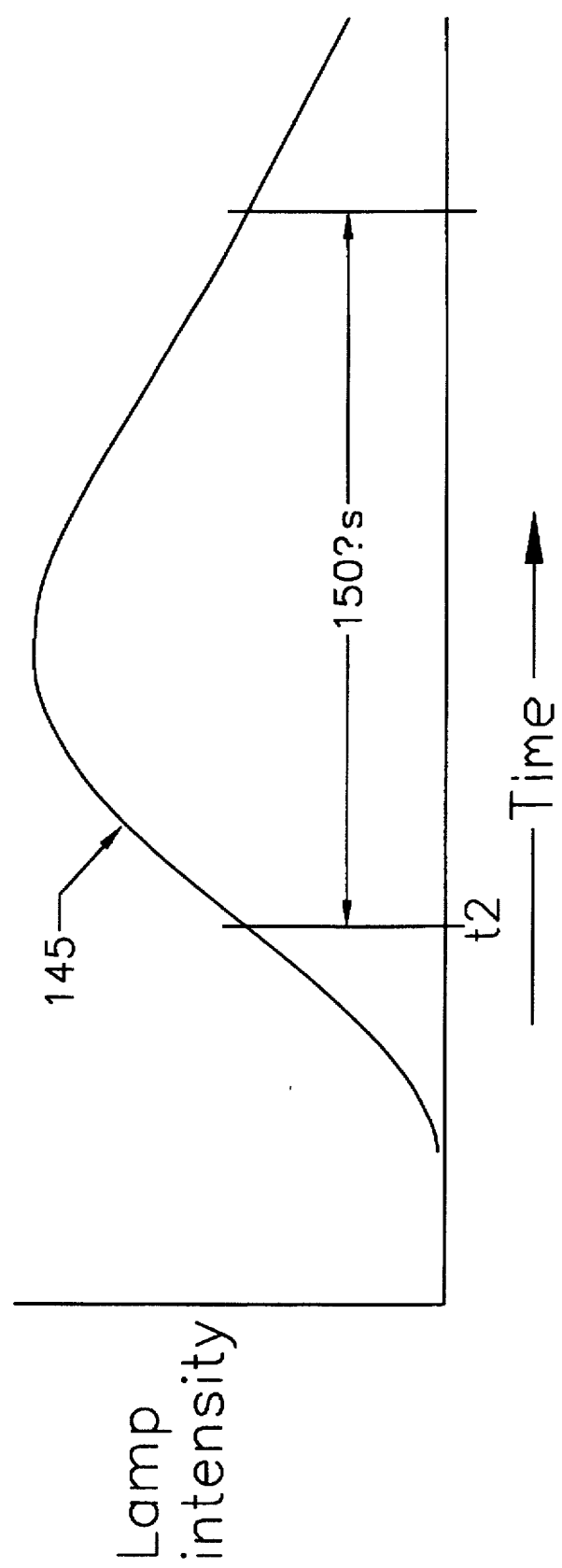
Figure 17C:
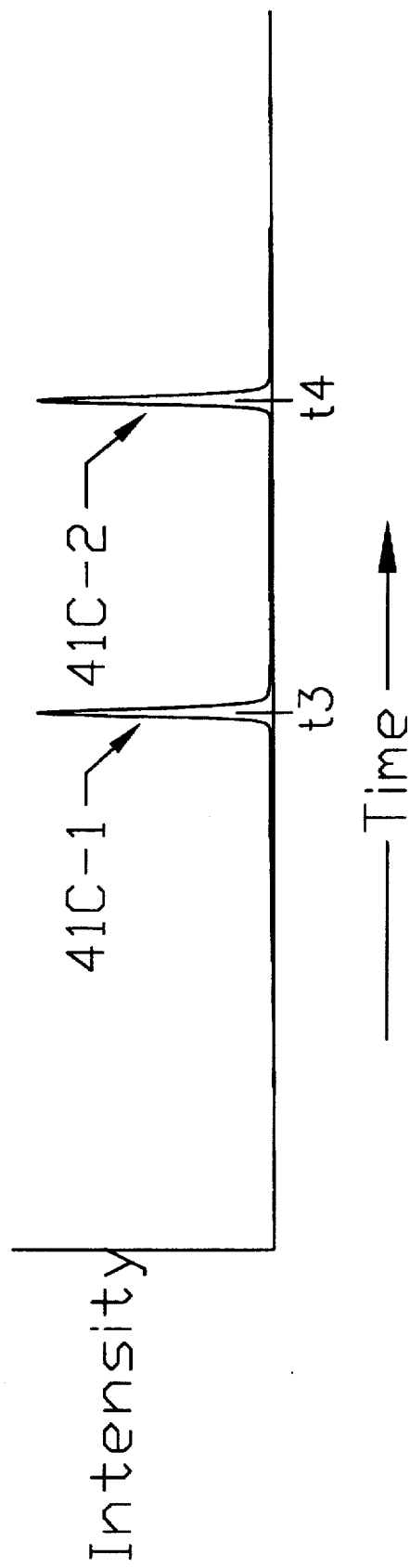

To provide an understanding of the multi-pulse generation provided by the generator 141, reference is made to FIGS. 17a through 17C, and FIGS. 18 and 19. FIG. 18 schematically shows the multi-pulse generator 141 based on the generator 70 (FIG. 14b) with such additional control features in the form of a controller or timer 143 for the Q-switch 91C (FIG. 15a). The operation of the controller 143 is described with respect to FIGS. 15a, 17a, and 18, where the voltage applied to the Q-switch 91C is shown as a function of time as a curve 144. As described above in respect to the oscillator flashlamp pumping chamber 89 (FIG. 15a), and as shown in FIG. 17b, a curve 145 (also referred to as a flash lamp pulse) shows the discharge (intensity) of the flashlamps 98 as being nominally 150 microseconds in duration. As shown in FIG. 17a, the controller 143 (FIG. 18) causes a voltage near the ¼ wave voltage V1 to be applied to the Pockels cell Q-switch 91C at a time t1 just prior to a time t2 (FIG. 17b) at which the flashlamps 98C (FIG. 15a) are fired. In particular, before firing the flashlamps 98, the high voltage V1 (FIG. 17a) is applied to the Pockels cell Q-switch 91C. The rise time of such high voltage can be nominally 20 ms. Then, at a time t3 the controller 143 (FIG. 18) causes the voltage V1 applied to the Pockels cell Q-switch 91 to be shorted to zero (or ground) to produce a first Q-switch pulse 146-1 (FIG. 17a) to Q-switch out a first initial laser pump pulse 41C-1 (FIG. 17c, corresponding to the pulse 41 of the generator 70). The voltage curve 144 then rises to the voltage V1 and remains there for a nominally 70 ms duration 147 (shown as delta t in FIG. 17a) which ends at a time t4. The initial pump pulse 41C-1 is shown in FIG. 17c as being generated at the time t3.

As shown in FIGS. 17a and 18, at the time t4 the controller 143 causes the voltage applied to the Q-switch 91C to be shorted to ground a second time within the 150 ms duration of the firing of the flashlamps 98C (rather than a just single pulse to ground as in the generator 70). The second shorting produces a second Q-switch pulse 146-2. The second Q-switch pulse 146-2 within the 150 ms duration of the firing of the flashlamps 98 Q-switches out a second initial laser pump pulse 41C-2 (FIG. 17C).

It may be understood that each of the first and second initial pulses 41C-1 and 41C-2 results in the generation of one of the second Stokes or output pulses 47, which are referred to with respect to the generator 141 as the respective first and second output, or second Stokes, pulses 47C-1 and 47C-2. The first Q-switch pulse 146-1, and the first initial pump pulse 41C-1 initiate the generation of the first 2-6 output pulse 47C-1 as described above in connection with the generation of the second Stokes pulse 47 (FIG. 14b).

The wavelength of the first output pulse 47C-1 is determined by the diode laser injection seeder 71C (FIG. 18). As described above in respect to FIG. 15a, the diode laser injection seeder 71C contains one or more of the single mode diode lasers 72C. The wavelength of the seeder light 73C emitted from the injection seeder 71C is selectable over a range of nominally 750 nm to 1000 nm by selecting the appropriate diode laser and/or by temperature and/or diode laser drive current tuning. Selector 148 (FIG. 18) first causes the seeder 71C to emit the seeder light 73C at first wavelength lambda 1 prior to and during the pulse 47C-1 at time t3, and secondly to switch the seeder light 73C to wavelength lambda 2 during the pulse 47C-2 at the time t4 (FIG. 17a). Switching such wavelength from lambda 1 to lambda 2 can either be accomplished by abruptly changing the drive current to one laser diode 72C in the interval between the times t3 and t4, or just after the time t3 by turning off one of the diode lasers 72C operating at lambda 1 and turning on another diode laser 72C at wavelength lambda 2 just prior to the time t4. Both wavelengths lambda 1 and lambda 2 must be in the operating bandwidth of the oscillator laser cavity 77 or 77B The output frequencies corresponding to the wavelengths lambda 1 and lambda 2 typically differ by nominally 1 $cm^{-1}$. Typical resonance absorption lines of interest have a width of 15 GHz or less, so this wavelength shift is sufficient to move off the absorption line.

The fall times of the Q-switch pulses 146-1 and 146-2 are about 100 ns, and the down time is about 1 microsecond to allow for the rise time of the Q-switched initial pulses 41C-1 and 41C-2. It may be understood then, that the two Q-switch pulses 146-1 and 146-2 are separated by the time interval 147 (delta t), which results in the same time interval 147 (delta t) between the first and second laser output pulses 47C-1 and 47C-2. Delta t is chosen to be nominally the storage time of the oscillator rod 76, 76B or 140. The 150 ms duration of the flashlamp pulse 144 is chosen to be roughly two or more times that of the duration 147 (delta t) between the Q-switch pulses 146-1 and 146-2. Thus for a rod 76, or 76B, or 140 made of Cr:LiSAF material, the duration of the pulse 144 of the flashlamp 98C is chosen to be nominally 150 microseconds.

After the flashlamp pulse 145 ends, a Q-switch high voltage power supply 149 (within the Q-switch 91C in FIG. 18) is shut off and the Pockels cell voltage (curve 144, FIG. 17a) is shorted to ground. The total time that the Q-switch voltage 144 is turned on is about 30 ms for each flashlamp pulse 145. Turning the Q-switch high voltage off between pulses 146-1 and 146-2 increases the lifetime of the Pockels cell Q-switch 91.

It may be understood then that during the time interval 147 (delta t), the wavelength of the seeder light 73C from the diode laser injection seeder 71C (FIG. 18) is changed, resulting in the two output pulses 47C-1 and 47C-2 being at different selected wavelengths, even though only nominally 67 microseconds apart and within the same flashlamp pulse 145.

The operation of the generator 141 in multiple Q-switching within a single flashlamp discharge may be extended to generate a plurality of pairs 151 of output pulses 47C-1 and 47C-2 (FIG. 19), wherein the wavelength of every one of such pulses is different, or alternate ones of the pulses 47C-1 and 47C-2 have a different wavelength.

Method of Generating The Output Laser Pulse 47 in the Two to Six Micron Wavelength Range 48

A method of the present invention generates the output laser pulse 47 having any wavelength within the nominal wavelength range 48 of 2 to 6 microns. Referring to FIG. 20, the method includes Step 156 of providing the oscillator laser cavity 42 (FIG. 14a) or 77 (FIG. 14b) capable of generating the initial pump pulse 41 having a wavelength of from 750 nm to 1000 nm. In Step 157, the oscillator laser cavity 42 or 77 is tuned to select the wavelength of the initial pump pulse 41 as any wavelength from 750 nm to 1000 nm. In Step 158, the oscillator laser cavity 42 or 77 is then Q switched to cause the oscillator rod 76 or 132 to generate the initial pump pulse 41. The wavelength of the initial pump pulse 41 is double Raman shifted in Step 159 into the range 48 of from nominally 2 to 6 microns to form the output laser pulse 47 having any given wavelength within the range 48. The shifting is performed by the Raman devices 43 or 109, for example, having the H2 medium 45 (or other Raman gas). The Raman devices 43 or 109 operate in response to the initial laser pulse 41 to generate the first Stokes pulse 46 and the second Stokes pulse 47.

Method of Generating The Output Laser Pulse 47 in the Two to Six Micron Wavelength Range 48, With Energetically Forbidding Higher Stokes Pulses In this method of the present invention, increases are achieved in the efficiency of conversion of the initial pulse 41 to the second Stokes pulse 47 by not allowing third and higher Stokes radiation to significantly occur. In particular, referring to FIG. 21, in Step 161 the parameters of the Raman device 43 are selected so that third and higher Stokes orders are energetically forbidden. As described above, such parameter selection includes Step 161A of selecting the H2 medium 45 in the Raman device 43 or 109. The fundamental Raman shift intrinsic to H2 is a wavenumber shift of 4155 $cm^{-1}$. The Step 161 also includes a Step 161B of selecting the initial laser pump pulse 41 to have any wavelength in the range 44 at or above a minimum wavelength for energetically forbidding the third and higher Stokes orders (referred to as the "minimum EF wavelength"). The minimum EF wavelength is, e.g., 802 nm using the H2 medium 45, and, for example, a wavelength of 900 nm may be used (or a wavenumber of 11,111.11 $cm^{-1}$). In this example, the first Raman shift in H2 will be to (11,111.11 $cm^{-1}$–4155 $cm^{-1}$) =6956.11 $cm^{-1}$) and the second Raman shift in H2 will be to (6956.11 $cm^{-1}$–4155 $cm^{-1}$)=2801.11 $cm^{-1}$ (corresponding to 3.570 microns) which is within the design output wavelength of the second Stokes pulse 47. If a third Raman shift were to occur, it would be to (2801.11 $cm^{-1}$–4155 $cm^{-1}$) =–135389 $cm^{-1}$, which is physically impossible, and cannot occur (is "energetically forbidden") in H2 since the second Raman shifted photon has less energy than the intrinsic Raman shift in H2. The further method of the present invention shown in FIG. 21 generates the output laser pulse 47 having any wavelength within a nominal wavelength range of 2.4 to 6 microns, which range is a subset of the range 48. This method includes a Step 162 of providing the oscillator laser cavity 42 (FIG. 14a) or 77 (FIG. 14b) capable of generating the initial pump pulse 41 having a wavelength of from the minimum EF wavelength (e.g., 802 nm) to 1000 nm, which is referred to as the "EF range". In Step 163, the oscillator laser cavity 42 or 77 is tuned to a wavelength in the EF range, e.g., of 802 nm to 1000 nm, such wavelength being the exemplary 900 nm, to select the wavelength of the initial pump pulse 41 as any wavelength from the minimum EF wavelength (802 nm) to 1000 nm (e.g., in this example, 900 nm). In step 164, the oscillator laser cavity 42 or 77 is Q switched to cause the oscillator rod 76, for example, to generate the 900 nm initial pump pulse 41. The wavelength (900 nm in this example) of the initial pump pulse 41 is double Raman shifted in Step 166. The first Raman shift in this example is to $(11,111.11 \text{ cm}^{-1}–4155 \text{ cm}^{-1})=6956.11 \text{ cm}^{-1}$ and the second Raman shift in this example is to $(6956.11 \text{ cm}^{-1}–4155 \text{ cm}^{-1})=2801.11 \text{ cm}^{-1}$ (corresponding to 3.570 microns), which is in the range 48 of from nominally 2 to 6 microns to form the output laser pulse 47. In this method shown in FIG. 21, the elimination of the competing third Stokes process via selection of the wavelength of the initial pulse 41 (to be above the minimum EF wavelength of 802 nm) is a significant benefit because the photons then accumulate at the desired second Stokes wavelength, resulting in high conversion efficiency to the 2.4 to 6 micron output laser pulse 47 (corresponding to 3.570 microns in this example).

Method of Generating The Output Laser Pulse 47 in the Two to Six Micron Wavelength Range 48, With Phase Matching Second Stokes Generation and Four-Wave-Mixing A further method of the present invention shown in FIG. 22 is used for generation of the second Stokes pulse 47 wherein the process of generation second Stokes radiation is not sequential, such that relative phase matching between the pump pulse 41, the first Stokes pulse 46, and the second Stokes pulse 47 in the Raman medium 45 is required. The method achieves improved efficiency in the mid-IR range of output pulses 47, and lower power pump pulses 41 may be used by maintaining the above-described specific phase matching conditions in the Raman medium 45 between the initial laser pulse 41, the first Stokes pulse 46, and second Stokes pulse 47. This results in a much more complete conversion of the energy in the pump pulse 41 to the desired second Stokes pulse 47, and allows the process to begin at lower input powers of the pump light 41.

This method to achieve the above-described proper phase relationship, or phase matching, includes a Step 170 of selecting the medium 45 in the Raman cell, such as the cell 109, as H2 and small amounts of other phase-matching gases. In an embodiment of the method of the present invention, as illustrated in FIGS. 6 and 9, for example, the other phase-matching gases have an absorption resonance band below the second Stokes wavelength. In this manner, the bulk gas refractive index at the wavelength of the second Stokes pulse 47 is selectively changed to the desired straight line relationship. With such straight line relationship, the four-wave-mixing process is phase matched along the entire length x from the one end 49 (FIG. 14a) of the cell 51 to the other end 52 of the cell 51. The selection of the index-modifying gases for output laser pulses 47 may be made using the above-described modelling.

Referring to FIG. 22, this method of the present invention generates the output laser pulse 47 having any wavelength within a nominal wavelength range of 2 to 6 microns while maintaining the above-described specific phase matching conditions in the Raman medium 45 between the initial laser pulse 41, the first Stokes pulse 46, and the second Stokes pulse 47. As shown in FIG. 22, this method further includes a Step 171 of providing the oscillator laser cavity 42 (FIG. 14a) or 77 (FIG. 14b) capable of generating the initial pump pulse 41 having a wavelength of from 750 nm to 1000 nm. In Step 172, the oscillator laser cavity 42 or 77 is tuned to a wavelength in the range 44 from 750 nm to 1000 nm to select the wavelength of the initial pump pulse 41 as any wavelength from 750 nm to 1000 nm.

Having selected in Step 170 the medium 45 as H2 and one or more of the phase-modifying gases described above according to the particular wavelength desired for the initial pump pulse 41, an example of this embodiment of the method of the present invention may be as illustrated in FIGS. 6 and 9 where the other phase-modifying gas(es) have an absorption resonance band below the second Stokes wavelength. In this manner, the bulk gas refractive index at the wavelength of the second Stokes pulse 47 is selectively changed to the desired straight line relationship. With such straight line relationship, the four-wave-mixing process is phase matched along the entire length x from the one end 49 of the cell 51 to the other end 52 of the cell 51. Stated differently, in the Step 170, the phase matching criteria for efficiently driving the four-wave-mixing process to generate the second Stokes pulse 47 is met by having the bulk refractive index values of the Raman medium 45 at the particular wavelength of each of the initial pulse 41, the first Stokes pulse 46, and the second Stokes pulse 47 be co-linear, that is, they fall on a common straight line, such as the line 53 (see FIG. 6) when plotted against wavelength.

Then, in Step 173, the oscillator laser cavity 42 or 77 is Q-switched to cause the oscillator rod 76, for example, to generate the initial pump pulse 41. The wavelength of the initial pump pulse 41 is double Raman shifted in Step 174 in a process in the Raman medium 45 in which the above-described specific phase matching conditions are maintained between the initial laser pulse 41, the first Stokes pulse 46, and second Stokes pulse 47.

Method of Generating A Plurality of Laser Pulses 47C-1 and 47C-2 in the 2 to 6 Micron Wavelength Range 48

Referring to FIGS. 18, 19 and 23, another embodiment of the method of the present invention generates the multiple laser pulses 47C-1 and 47C-2 which occur within the duration of a single discharge of the flashlamp 98, for example. The first of the closely spaced output pulses 47C-1 may have any wavelength within the range 48 nominally 2 to 6 microns. The second pulse 47C-2, succeeding closely spaced relative to the first pulse 47C-1, may have a chosen wavelength differing from the wavelength of the first laser pulse 47C-1. This method may be understood by reference to the above description of FIGS. 17a through 17c, FIGS. 18 and 19, and FIG. 23. This method includes Step 181 of providing the oscillator laser cavity 42 (FIG. 14a) or 77 (FIG. 14b) capable of generating the initial pump pulse 41 having a wavelength of from 750 nm to 1000 nm. In Step 182, the flashlamps 98, for example, are operated at the time t2 (FIG. 16) to produce the pulse 145 for the 150 ms duration, for example. As shown in FIG. 17b, the flashlamp pulse 145 may be nominally 150 microseconds in duration. In Step 183, the oscillator laser cavity 42 or 77 is tuned to a wavelength in the range 44 from 750 nm to 1000 nm to select the wavelength of the initial pump pulse 41 as any wavelength from 750 nm to 1000 nm. In Step 184, H2 is selected as the medium 45 in the Raman device 43 or 109. Then, in Step 185, the oscillator laser cavity 42 or 77 is Q switched to cause the oscillator rod 76 or 132 to generate the 750 to 1000 nm initial pump pulse 41C. In particular, the controller 143 causes the voltage applied to the Q-switch 91 to vary according to the curve 144, and causes a voltage near the ¼ wave voltage V1 to be applied to the Pockels cell Q-switch 91 at the time t1 just prior to the time t2 (FIG. 17b) at which the flashlamps 98 (FIG. 15a) are operated. Then, at the time t3 the controller 143 causes the voltage V1 applied to the Pockels cell Q-switch 91 to be shorted to zero (or ground) to produce the first Q-switch pulse 146-1 (FIG. 17a) to Q-switch out the first initial laser pump pulse 41C-1 (FIG. 17c, corresponding to the pulse 41 of the generator 70). The voltage curve 144 then rises to the voltage V1 and remains there for a nominally 90 ns duration 147 (shown as delta t in FIG. 17a) which ends at the time t4.

The wavelength of the initial pump pulse 41C is double Raman shifted in Step 186 to generate the second Stokes pulse 47C-1 having a wavelength in the range of from 2 to 6 microns. Then, in Step 187, the oscillator laser cavity 42 or 77 is again tuned, this time to a wavelength just different from the previously selected wavelength of the first initial pump pulse 41C-1 to generate the second initial pump pulse 41C-2. In Step 188, at the time t4, the oscillator laser cavity 42 or 77 is again Q-switched to cause the oscillator rod 76, for example, to generate the second initial pump pulse 41C-2 (FIG. 17c). In particular, as shown in FIGS. 17a and 18, at the time t4 the controller 143 causes the voltage applied to the Q-switch 91 to be shorted to ground a second time within the 150 ms duration of the firing of the flashlamps 98. The second shorting produces the second Q-switch pulse 146-2. The second Q-switch pulse 146-2 within the 150 ms duration of the operation of the flashlamps 98 Q-switches out the second initial laser pump pulse 41C-2 (FIG. 17c).

The wavelength of the second initial pump pulse 41C-2 is double Raman shifted in Step 189 to generate the second Stokes pulse 47C-2 having a wavelength in the range of from 2 to 6 microns, and just different from that of the pulse 47C-1.

As to Steps 183 and 187, the wavelengths of the first output pulse 47C-1 and the second output pulse 47C-2 are determined by the diode laser injection seeder 71C (FIG. 18). The wavelength of the seeder light 73C emitted from the injection seeder 71C is tunable over a range of nominally 750 nm to 1000 nm by the wavelength selector 148 (FIG. 18) which selects an appropriate one of the internal single mode diode lasers 72C according to the wavelength of the seeder light 73C emitted therefrom. The selector 148 operates to cause the seeder 71 or 71C to emit at wavelength lambda 1 prior to and during the time t3 of the first Q-switch pulse 146-1. The selector 148 causes the output wavelength of the seeder light 73 generated by the seeder 71 or 71C to shift to wavelength lambda 2 prior to time t4.

This multi-pulse method is particularly useful for differential absorption lidar (DIAL) where remote gas molecules are probed at two closely spaced wavelengths (e.g., at the wavelengths of the first pulse 47C-1, and at the wavelength of the second pulse 47C-2) to determine their concentration versus range. In greater detail, the duration of the flashlamp pulse 145 is shown in FIG. 17b as 150 microseconds FWHM, which as noted above, compares with a storage time of 67 microseconds of a Cr:LiSAF rod 76C. During the flash lamp pulse 145, the Q-switch 91C is operated twice with approximately 70 microseconds delay between the pulses 146-1 and 146-2. The first pulse 146-1 is generated on the absorption line of interest and the second pulse 146-2 is off resonance for making differential absorption measurements.

Based on the above description of the methods shown in FIGS. 21A, 21B and 22, it may be understood that such methods may be used in the method of FIG. 23 to achieve the advantages of the methods of FIGS. 21A, 21B and 22, in generating the plural pairs of pulses 151 or the two pulses 47C-1 and 47C-2.

Laser Pulse Generator Having Intracavity Feature

Figure 24:
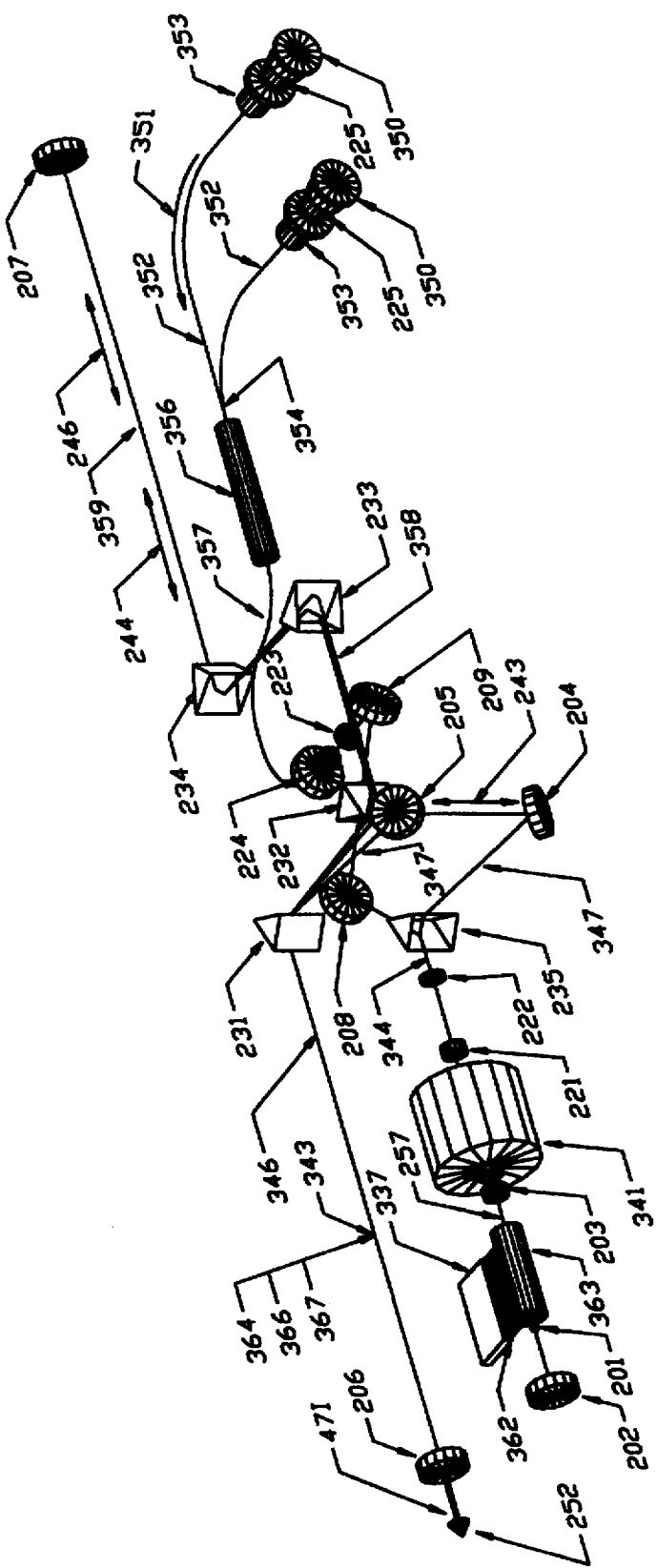
FIGS. 24 through 29 depict the components of the laser system provided with the intracavity feature.
Figure 25:
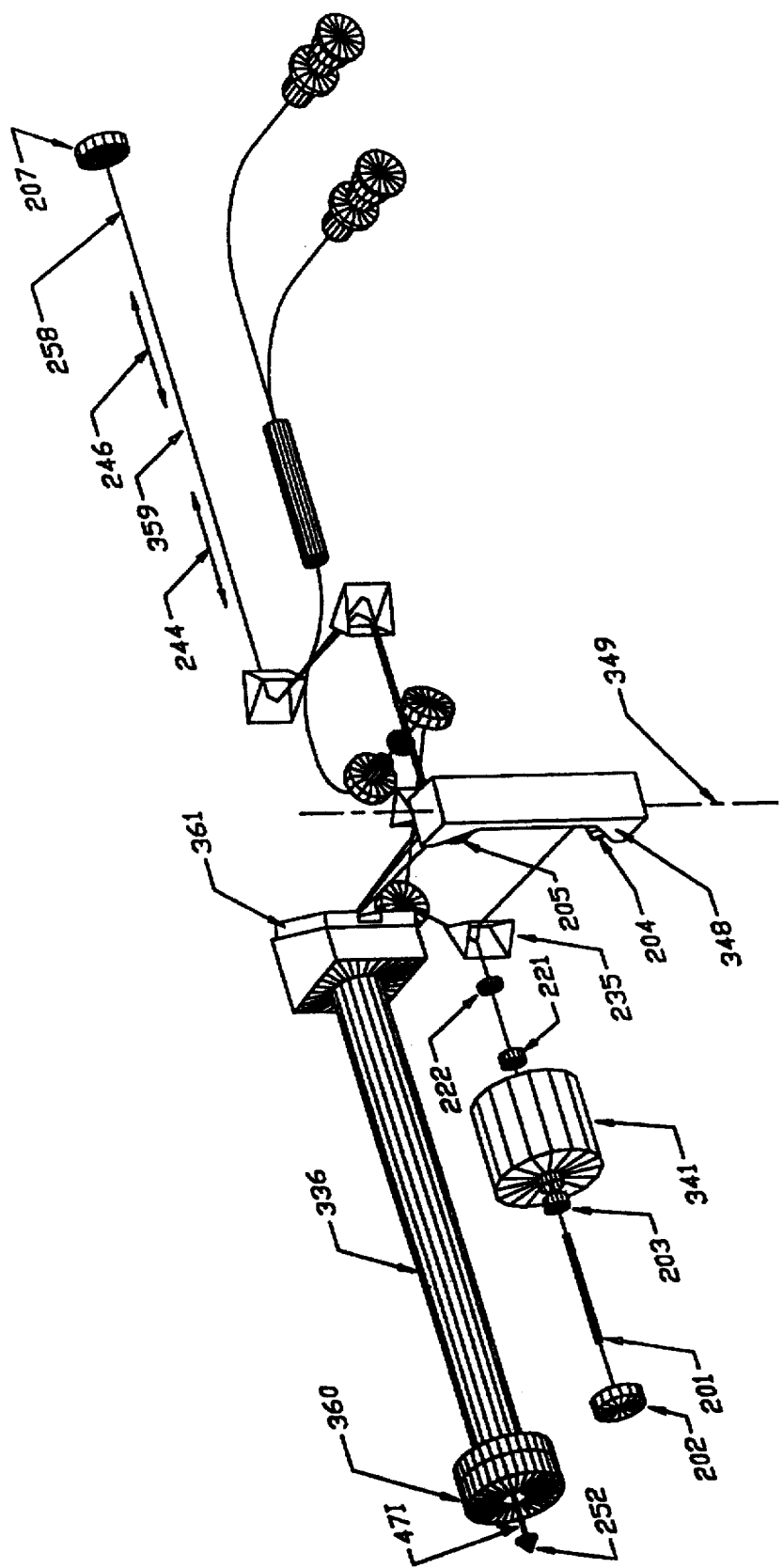

Further embodiments of the laser pulse generator of the present invention are provided with an intracavity feature described with respect to FIGS. 24 through 41, wherein a laser pulse generator 200 generates the second Stokes pulse or beam 47, which in connection with FIGS. 24 through 41 is designated 47I to show the beam outside of the generator (FIGS. 25 and 29) and is designated 246 to show the beam in the generator (FIGS. 24 and 25). The beam 47I (or 246) is in the two to five micron wavelength band. The beam 47I (or 246) may include continuously tunable laser pulses as described below.

The laser pulse generator 200 uses a tunable laser rod 201 and intracavity stimulated Raman shifting to generate the 2–5 micron beam 246. In those of FIGS. 24 through 29 in which the structure of the generator 200 is depicted, various mirrors are designated 202 through 211, lenses are labelled 221 through 225, and prisms are labelled 231 through 235. The laser light generated directly by the tunable laser rod 201 is referred to as the pump light or beam 243. Laser light which results from one Raman shift of the pump beam 243 is referred to as the first Stokes light or beam 244. As noted, laser light which results from two Raman shifts of the pump beam 243 is referred to as the second Stokes light or beam 246, which may be in the form of pulses depicted by arrow 252 in FIG. 24.

The three beams 243, 244 and 246 each have a very distinct wave-length. The primary laser components of the generator 200 are shown in FIGS. 24–25, and FIGS. 26 through 29 show the respective optical paths 257, 258, and 259 of each of the three beams 243, 244 and 246.

Figure 28:
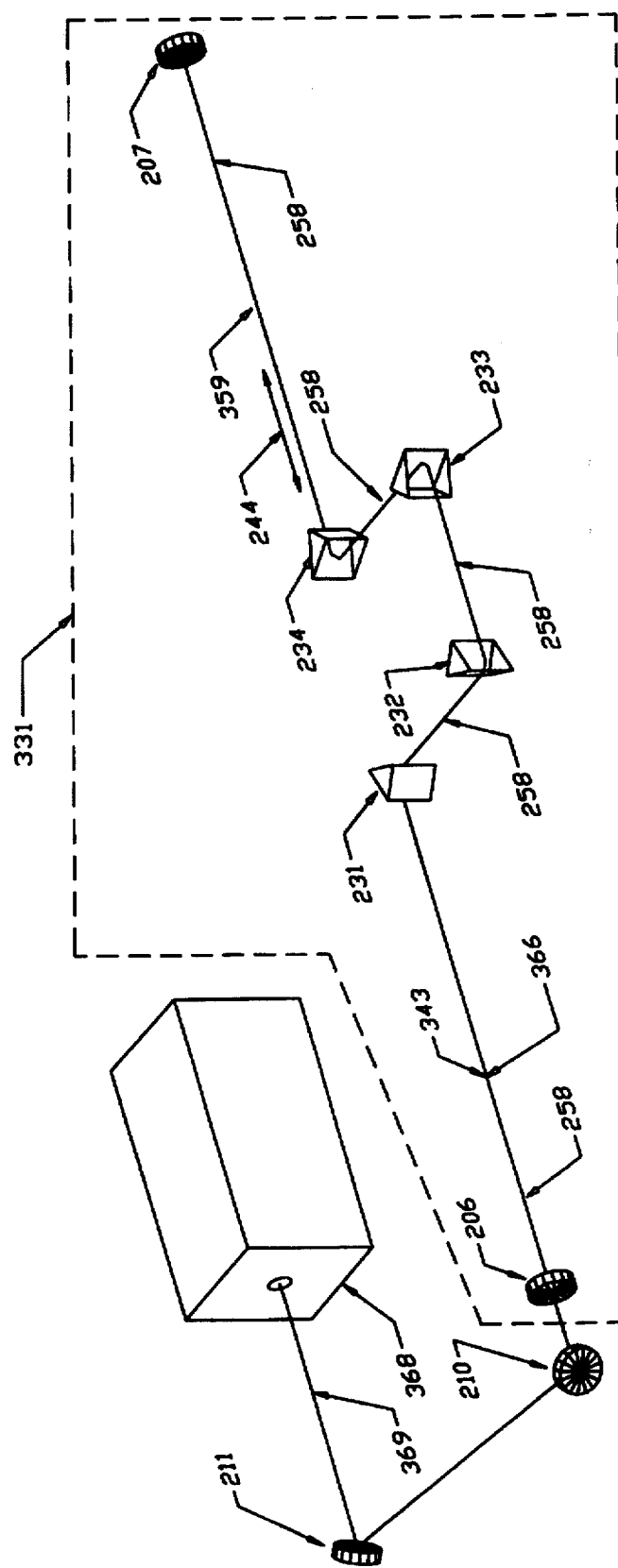
Figure 29:
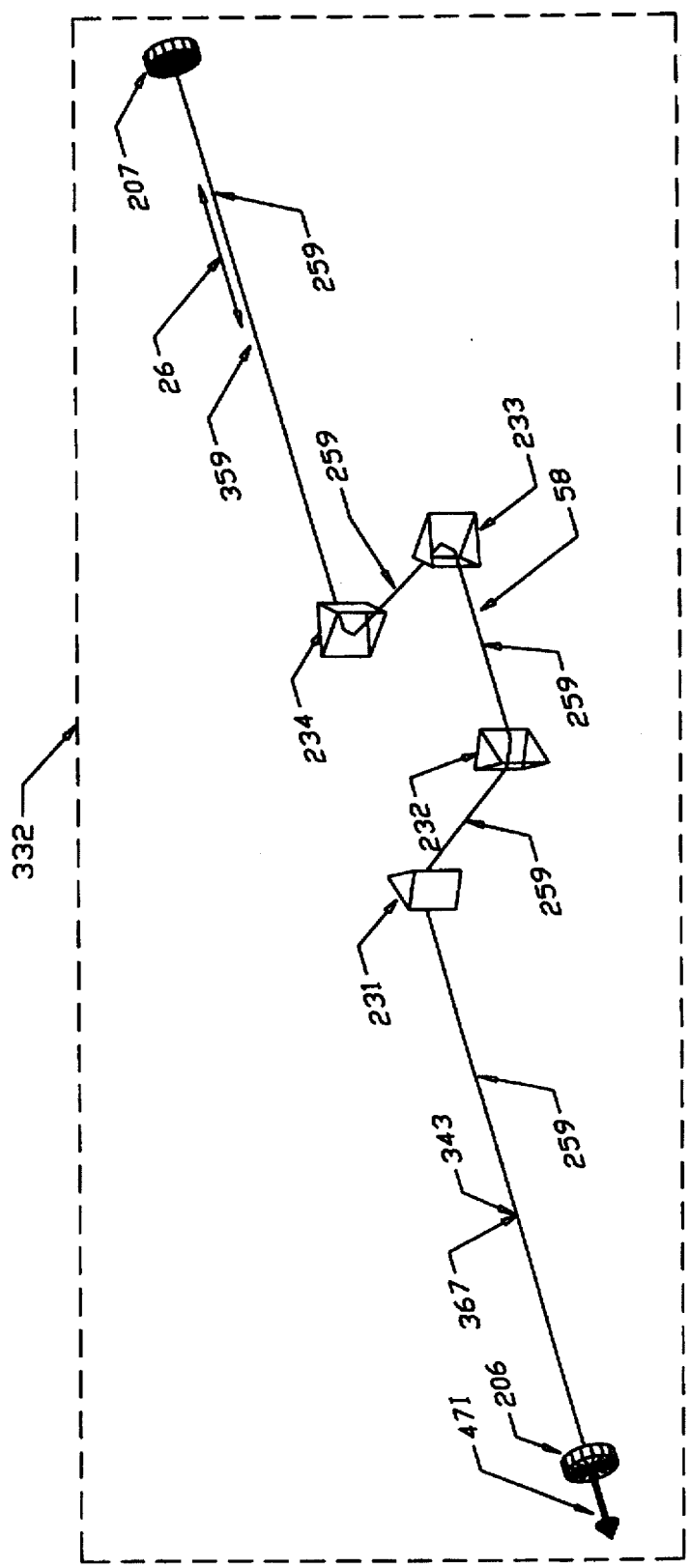

Cavities in which the respective beams 243, 244 and 246 oscillate are referred to as the pump cavity 330 (FIG. 26), the Stokes (or first Stokes) cavity 331 (FIG. 28), and the second Stokes cavity 332 (FIG. 29). The pump cavity 330 is divided into two subcavities, one 333 shown in FIG. 27 and one 334 shown in FIG. 26. The subcavity 333 contains the laser rod 201. The first Stokes cavity 331 and the second Stokes cavity 332 use the same end mirrors 206 and 207, but the two cavities 331 and 332 deviate from each other slightly as they traverse the set of prisms 231 through 234. In one aspect of the intracavity feature, the pump cavity 330 and both of the Stokes cavities 331 and 332 overlap inside a Raman cell 336 (FIG. 25), which may have the features of the above-described Raman cells (e.g., the Raman cell 111). In another aspect, the Raman cell 336 is within the pump cavity 330.

Figure 26:
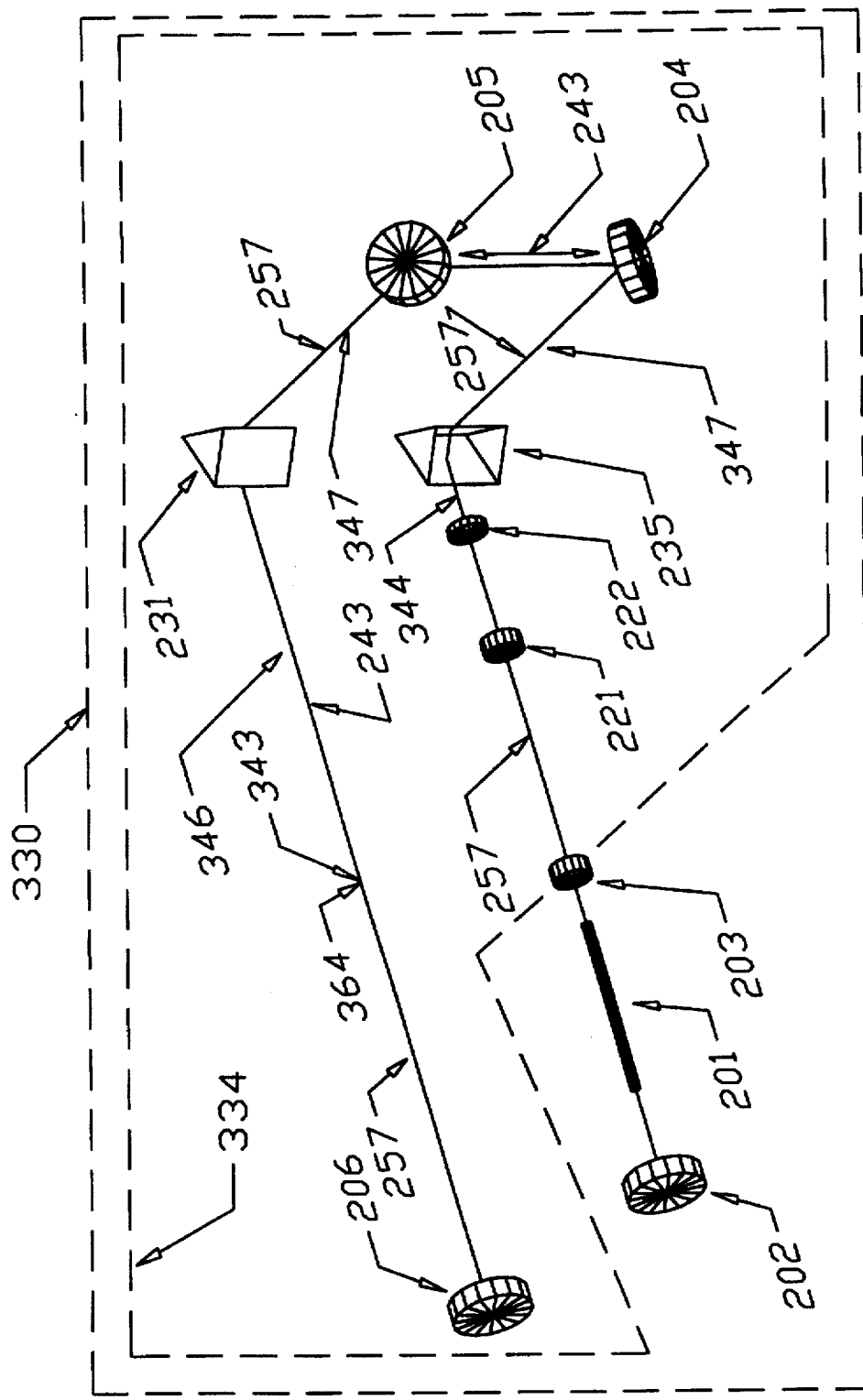
Figure 27:
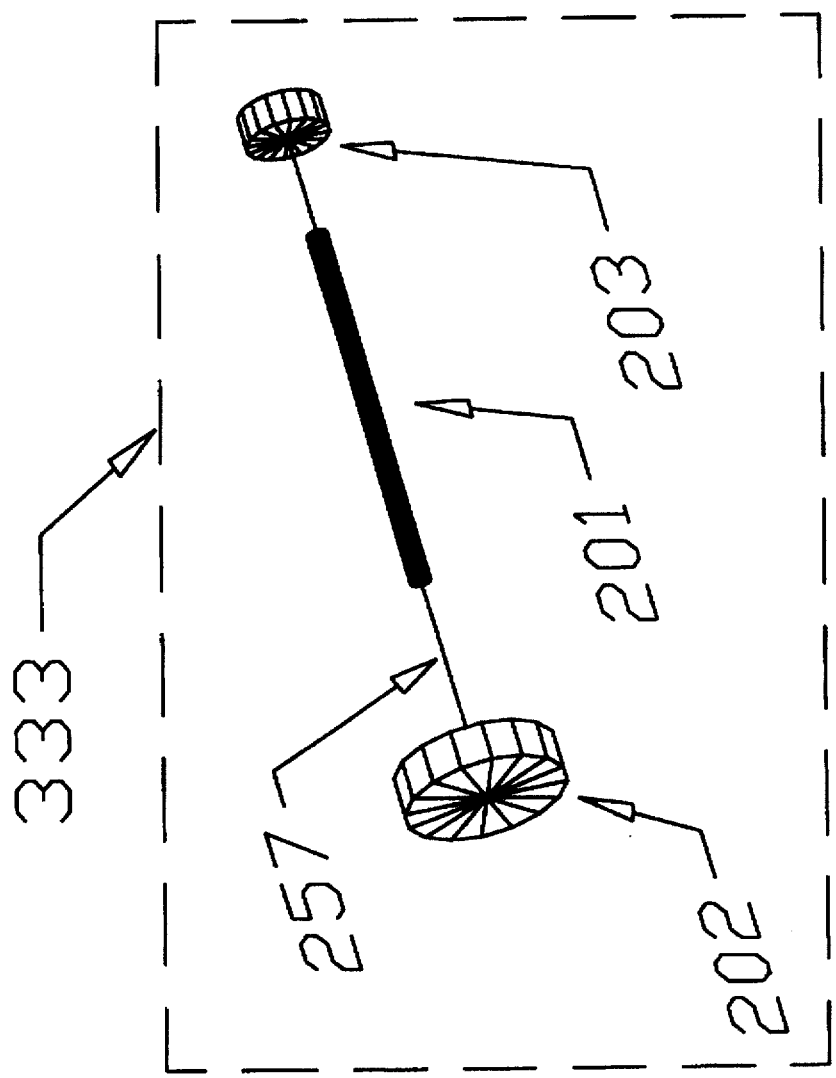

The pump cavity 330 may be traced in FIGS. 26 and 27. The mirror 202 is a high reflector at the wavelength of the pump beam 243. The reflective surface of the mirror 202 is concave and, with the flat mirror 203, forms the pump subcavity 333, which is a stable resonator and contains the laser rod 201. The mirror 203 is a partial reflector on the side facing the laser rod 201 and anti-reflective reflective coated on the second surface. The reflectivity of the mirror 202 is sufficiently low so that the pump subcavity 333 remains below lasing threshold. For diode laser pumped Cr:LiSAF, such reflectivity is about 85%. The mirror 203 has sufficient wedge to prevent etalon effects inside the mirror 203.

The purpose of the pump subcavity 333 is twofold. First, the cavity 333 significantly lowers the lasing threshold. With diode laser pumping, e.g., by lasers 337 (FIG. 24), it is difficult to reach lasing threshold with large cavity losses. By including the mirror 203, the remainder of the pump cavity 330 (the second pump subcavity 334 shown in FIG. 26) may have significant loss and still have the composite pump cavity 330 reach lasing threshold. Second, the mirror 203 prevents the rapid turn on of the Raman scattering process from shutting off the energy extraction in laser rod 201. Once the Raman scattering threshold is reached, the Raman scattering process acts like a large loss in the cavity 334. By including the mirror 203, a significant amount of energy may be extracted from the rod 201 even after Raman threshold is reached. The selection of the reflectivity of the mirror 203 takes into account the desired operating wavelength and wavelength-dependent gain of the rod 201.

Figure 30:
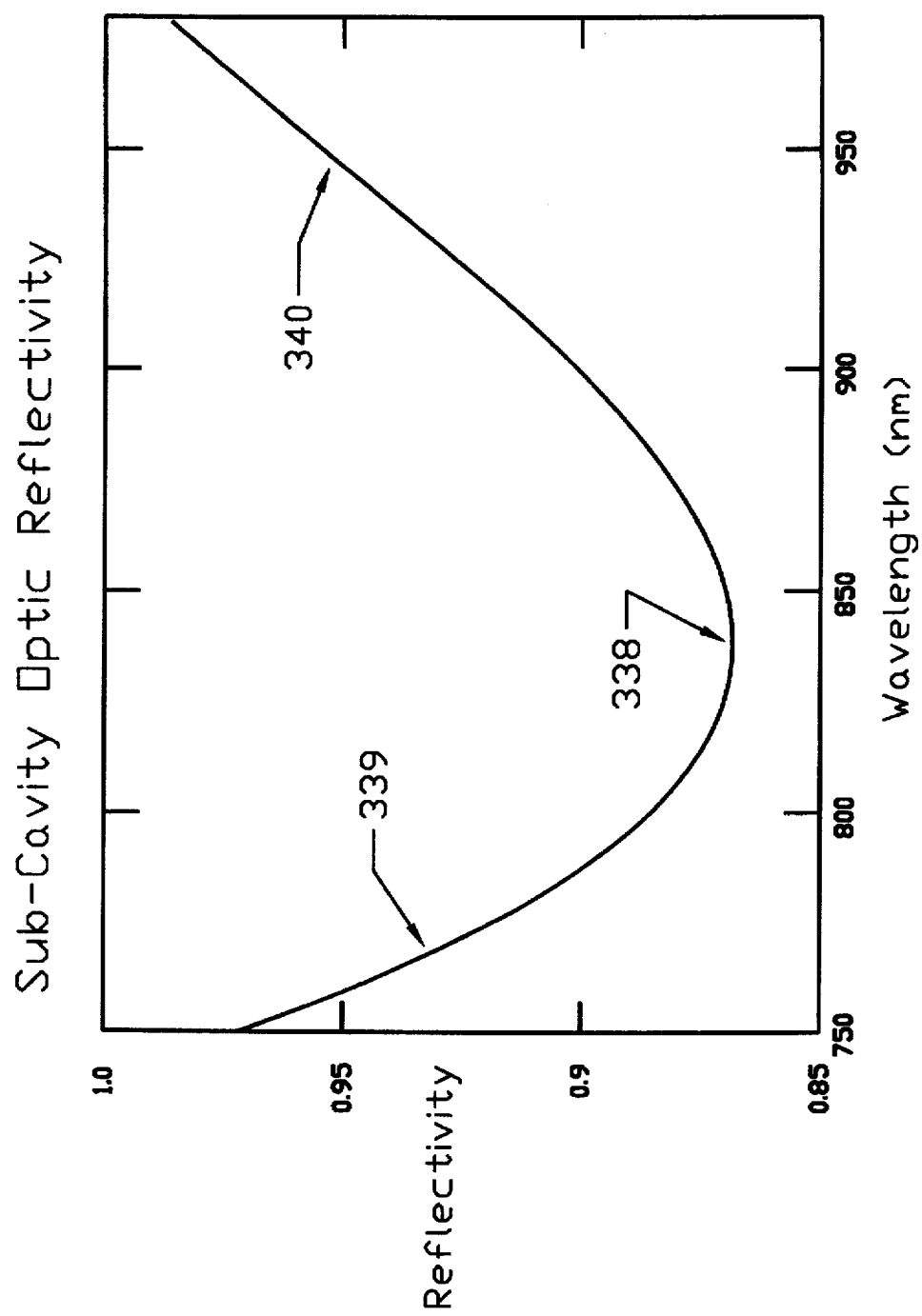

The reflectivity of the mirror 203 is as high as possible at the operating wavelength without having the pump subcavity 333 (FIG. 27) be above lasing threshold at the peak 338 of the gain curve (FIG. 30). FIG. 30 depicts an example of the reflectivity of the mirror 203 as a function of wavelength for diode pumped Cr:LiSAF used as the material for the rod 201. To have the maximum tuning range, the reflectivity of the mirror 203 is smaller at the peak 338 of the gain curve and larger at the wings 339 and 340.

The second pump subcavity 334 (FIG. 26) is formed by the mirror 203 and the mirror 206. A Q switch 341 is in the subcavity 334 (see FIG. 24, note, the Q switch 341 is omitted from FIG. 26 to show path 257). The Q switch 341 causes sufficient loss in the entire pump cavity 330 to prevent lasing until the voltage on the Q switch 341 is turned off. To be most effective, a quarter wave voltage is applied to the Q switch 341 to hold off lasing. When ZnSe prisms (e.g., 231 and 232) are used, a quarter wave voltage provides about 94% cavity loss.

The pump cavity 330 (FIG. 3) also contains the pair of the lenses 221 and 222 to form a focus near the center of the Raman cell 336 at position 343 (FIGS. 24 and 26). (For clarity of illustration, the Raman cell 336 is not shown in FIGS. 24 and 26). The lens 221 is negative while the lens 222 is positive, and the focal lengths are selected to obtain the desired beam parameters in the Raman cell 336.

By shorting the voltage on the Q switch 341 to zero for a duration of approximately four microseconds, the high power pump laser pulses 243 are generated. The energy of these pulses 243 oscillates in the pump cavity 330. The pulse rate frequency of the Q switch 341 is less than or equal to one over the energy storage time of the laser rod 201.

As shown in FIGS. 24, and 26, the prism 231 is placed directly above the prism 235 so that a segment 344 (FIG. 26) of the pump beam path 257 between the lens 222 and the prism 235 is parallel to a segment 346 (FIG. 26) that is between the mirror 206 and the prism 231. The prisms 231 and 235 are oriented to deflect the pump beam 243 horizontally in parallel paths 347 to the mirrors 204 and 205. The mirrors 204 and 205 are mounted on a mirror holder 348 (FIG. 25) to form a corner reflector. The laser rod 201 is tuned by rotating the holder 348 about an axis 349 (FIG. 25).

Referring to FIGS. 24 and 26, the end mirror 206 is concave on the reflective surface facing the Raman cell 336 (FIG. 25). The mirror 206 is highly reflective at the wavelength of the pump beam 243 and the first Stokes beam 244 and a partial reflector (e.g., 20% reflectivity) at the wavelength of the second Stokes beam 246 to permit the output beam 471 (FIG. 24) to exit the second Stokes cavity 332. The radius of curvature of the mirror 206 is about half the length of the Raman cell 336, which is 31 cm long in this example. The outer surface of the mirror 206 is convex to collimate the second Stokes beam 246 to form the output beam 471 (FIG. 24). Since the output beam 471 must pass through the mirror 206, the above-described reflectivity results in substantial transmissivity at the second Stokes wavelength of the beam 471.

When fine wavelength control is required, the pump laser cavity 330 is injection seeded using one or more of the diode lasers 350 (FIG. 24). Emission or seed light 351 from the laser diodes 350 is collimated using lenses 225 and is coupled into single mode fibers 352 using microscope objectives 353. The fibers 352 are combined at a fiber splice 354 and fed into a Faraday isolator 356 which prevents the high power Q switched pump laser pulse 243 from damaging the diode lasers 350. The injection seed light 351 is coupled from the isolator 356 to the pump cavity 243 using a fiber 357, a graded index (GRIN) lens 224, a mode matching lens 223, and steering mirrors 209 and 208. The GRIN lens 224 is oriented to provide an s-polarized mode of the seed beam 351 at the prism 235 in the pump cavity 330. Approximately 50% of the seed beam 351 is reflected from the prism 235. The seed beam 351 is then collimated by the lens 222 and the lens 221 (FIG. 26).

The s-polarized seed beam 351 is converted to the circular polarized mode by the Q switch 341. The p-polarized component of the seed beam 351 is then coupled through the mirror 203 into the pump subcavity 333 (FIG.27, formed by the mirrors 203 and 202).

The second Stokes cavity 333 is designed so that a small feedback from the second pump subcavity 334 (formed by the mirrors 203 and 206) brings the laser rod 201 above threshold. For this case, the polarization rotation of the Q switch 341 is substantial (on the order of ⅔ pi) when the round trip gain in the cavity 333 exceeds the loss. This rotation couples a significant fraction of the seed beam 351 into the p-polarization mode, which seeds the pump beam 243.

The Raman cell 336 (FIG. 25) uses the mirror 206 and the prism 231 as sealed windows. Optionally, a lens can be used for one of the cell 336 windows instead of the prism 231. However, this requires a special lens with a good anti-reflection coating at all three wavelengths (that of each of the beams 243, 244 and 246). One advantage of using a lens before the prism 231 is that the beam footprint on the prisms 232, 233 and 234 is smaller. The Raman cell 336 is filled with the Raman medium, or active gas, such as hydrogen (H2). In the Raman cell 336 between the mirror 206 and the prism 231, the pump beam 243, the Stokes beam 244 and the second Stokes beam 246 overlap (see position 343 in FIG.26).

As shown in FIG. 24, as these beams 243, 244 and 246 move to the right, they are separated by the Brewster dispersing prism 231. The prism 232 is positioned such that the pump beam 243 passes by it (to the mirror 205), whereas the two Stokes beams 244 and 246 pass through the prism 232 and are diffracted. The prisms 233 and 234 recombine the two Stokes beams 244 and 246 from their separated condition at position 358, so that when combined they are coaxial at position 359. The mirror 207 is a high reflector at both the wavelength of the first Stokes beam 244 and that of the second Stokes beam 246. The front surface of the mirror 207 is concave to focus both Stokes beams 244 and 246 back to the position 343 in the Raman cell 336. This arrangement of first Stokes cavity 331 and second Stokes cavity 332 does not need adjustment as the operating wavelength is tuned.

The Raman cell 336 has an end cap 360 (FIG. 25) which holds the mirror 206 and provides for a small amount of pointing adjustment of the mirror 206. The other end of the cell 336 has a holder 361 for the prism 231.

The laser rod 201 can be pumped with either a flash lamp or a series (array) of high power diode lasers 337. When pumping with diode laser arrays, lenses 362 focus the output onto the rod 201. Multiple bars of the high power diode lasers 337 can be used, however, for clarity of illustration only one set is shown in FIG. 24. The laser rod 201 is cooled by flowing cooling fluid though the tube 363.

When it is desired to provide high average second Stokes power (1–5 W) of the second Stokes beam 246, diode laser pumping is used along with a laser rod material such as Cr:LiSAF, which can be readily pumped with diode laser arrays at 670 nm. Cr:LiSAF also has a large tuning range which results in generation of the second Stokes beam 246 in the 2–5 micron band. In high average power operation, the Raman medium is circulated by a fan (not shown) in the Raman cell 336 to prevent the heating of the Raman medium from degrading the laser beam quality.

The laser rod 201 may alternatively be made from Ti:SAF, which covers about the same tuning range as Cr:LiSAF. A short duration (10 microsec) flashlamp pumped Ti:SAF rod 201 may be used in long pulse mode without the Q switch 341. Because of the high pump power in the cavity 330 or 331 and the many round trip gains experienced by the Stokes beams 244 and 246, the stimulated Raman threshold can be reached in the long pulse mode with Ti:SAF. If long pulse Ti:SAF is used the reflectivity of the mirror 203 can be adjusted to minimize relaxation oscillations. These oscillations are caused by the dynamics of laser energy build up in the pump subcavity 334 followed by Raman depletion of the pump beam 243. The Stokes energy is then coupled out of the pump cavity 330 and the pump energy grows back to the threshold level. If the reflectivity of the mirror 203 is just sufficient to bring the pump subcavity 333 above threshold, then the oscillation will be minimal. This laser configuration can produce a second Stokes beam 246 having a power of more than 100 mJ at a 10 Hz pulse rate frequency.

Operating Features

The features of operation of the laser pulse generator 200 of the present intracavity invention are described below along with exemplary Steps used in the operation.

Generation of Pump Beam 243

A tunable flashlamp or diode laser pumped solid state laser is operated in the 750 nm to 1 micron wavelength band, combined with double Raman shifting in H2 Raman medium to reach the 2–5 micron wavelength band. This is done in steps 401–404.

Step 401. The pump (or oscillator) cavity 330 includes the flashlamp-pumped (or laser diode-pumped) tunable laser rod 201 (and optionally the Q switch 341) for generating the high intensity laser pump beam 243 inside the pump cavity 330.

Step 402. A tuning element in the form of Brewster dispersing prisms 231 and 235 is provided in the oscillator cavity 330 for selecting the operating wavelength band.

Step 403. Additional elements (such as lens 221 and 222 in the pump cavity 330) are used for selecting the transverse lasing mode.

Step 404. The laser pump beam 243 is passed through the H2 medium in the Raman cell 336. For high average power operation, the H2 is circulated inside the Raman cell 336.

Overlapping Beams 243, 244 and 246

The laser system has the high Q pump laser cavity 330, the high Q Stokes laser cavity 331 and the low Q second Stokes laser cavity 332, which all overlap inside the Raman cell 336. This arrangement allows efficient Raman shifting of the low pump beam energies generated by diode laser pumping the laser rod 201 or the low peak powers generated by non-Q switched flash lamp pumped laser rods 201. This is done in Steps 405–407.

Step 405. Position the focusing elements 221 and 222 (FIGS. 24 & 26) in the pump cavity 330 so that a small pump beam waist 364 is located within the pump cavity 330 at the position 343.

Step 406. Place the Raman cell 336 (FIG. 25) in the portion of the pump cavity 330 containing the pump beam waist 364 (position 343). Step 407. Form the additional respective Stokes and second Stokes laser cavities 331 and 332 for the Stokes and second Stokes beams 244 and 246, respectively, which overlap with the pump cavity 330 inside the Raman cell 336 and which have respective beam waists 366 and 367 (FIG. 24) near the position 343 of the pump waist 364.

Cavities 330, 331 and 332 Overlap In Raman Cell 336

The laser design provides the pump cavity 330, the Stokes cavity 331 and the second Stokes cavity 332 which overlap inside the Raman cell 336. The three wavelengths of the pump beam 243, the Stokes beam 244 and the second Stokes beam 246 are separated (FIG. 24) using the first Brewster dispersing prism 231 so that the Stokes cavity 331 and the second Stokes cavity 332 do not contain the pump laser rod 201. In addition, the anti-Stokes wavelengths are dumped out of the pump cavity 330 by the dispersing prism 231 before such anti-Stokes wavelengths can grow to sufficient amplitude to deplete the pump energy. This is done in Steps 408 and 409.

Step 408. Provide the first Brewster dispersing prism 231 in the pump cavity 330 between the Raman cell 336 and the laser rod 201. The Brewster prism 231 may also act as a window of the Raman cell 336.

Step 409. Provide the end mirror 206 in the pump cavity 330 to act at the wavelengths of the pump beam 243, the Stokes beam 244 and the second Stokes beam 246. The end mirror 206 (or a combination of a lens and an end mirror) refocuses the laser beams 243 and 244 back into the Raman cell 336, but transmits 80% at the wavelength of the second Stokes beam 246 to output the second Stokes beam 246 (or beam 47I) as shown by the arrow 252 (FIG. 24).

Stokes Cavity 331 and Stokes Cavity 332 Share Mirror 207

The laser cavities 330, 331 and 332 are arranged such that the Stokes cavity 331 and the second Stokes cavity 332 are recombined using additional Brewster prisms in the form of the second prism 232, the third prism 233, and the fourth prism 234. In this manner, both the Stokes cavities 331 and 332 use the same end mirror 207. This cavity design does not require adjustment as the laser wavelength is tuned. This is done in Steps 410–412.

Step 410. The additional Brewster prisms 232, 233 and 234 are provided as shown in FIG. 24. The second prism 232 is used to cancel the angular dispersion of the first prism 231, which is located in the pump cavity 330. The third prism 233 and the fourth prism 234 are arranged as a mirror image of the first prism 231 and the second prism 232 to place the Stokes beam 244 and the second Stokes beam 246 back on top of each other at the position 359 (FIG. 24).

Step 411. The focusing end mirror 207 for the Stokes cavity 331 and for the second Stokes cavity 332 is selected to be highly reflective at both the wavelengths of the Stokes beam 244 and the second Stokes beam 246. A coated silver mirror 207 works well over the entire tuning range.

Step 412. As shown in FIG. 28, provide a 1.523 micron HeNe laser 368 for aligning the Stokes path 258 with the pump path 257 (FIG.26) in the Raman cell 336. A HeNe beam 369 is lined up on top of the pump laser beam 243 which leaks out of the cavity 330 through the mirror 206. This alignment is accomplished using the mirrors 210 and 211. The HeNe beam 369 is directed into the Stokes cavity 331. Since the Stokes cavity 331 has no net dispersion, it can be aligned with any laser wavelength which is not clipped by the edge of the prism 232, or the prism 233 or the prism 234.

Folded Pump Laser Cavity 330

Referring to FIG. 24, the pump laser cavity 330 is of folded design using the first Brewster dispersing prism 231 and the fifth Brewster dispersing prism 235, which prisms are identical. The first prism 231 separates the pump beam 243 from the Stokes beam 244 and from the second Stokes beam 246. The fifth prism 235 compensates for both the angular and lateral displacement of the pump beam 243 caused by the first Brewster prism 231 as the wavelength is tuned. The pump cavity 330 is arranged such that the parallel pump beam segments 344 and 346 remain unchanged as the wavelength is tuned. The pump path 257 between the first prism 231 and the fifth prism 235 is connected by the two mirrors 205 and 204 held by the mirror holder 348 (FIG. 25). This arrangement also allows wavelength tuning using a single angular mechanical adjustment of the holder 348 about the axis 349. This is done in Steps 413 and 414.

Step 413. The pump beam segments 344 and 346 are arranged parallel to each other (FIG. 26). In particular, the first dispersing prism 231 is placed in the beam segment 346 containing the Raman cell 336, and the fifth prism 235 is placed in the beam segment 344. These Brewster prisms 231 and 235 are placed identically in the respective two pump beam segments 346 and 344 and along a perpendicular line joining the two segments. The prisms 231 and 235 deflect the pump beam 243 to form the horizontal pump beam paths 347 (FIG. 26) in planes which are perpendicular to a plane containing both segments 344 and 346.

Step 414. Use the two 45 degree mirrors 204 and 205 (FIGS. 24 & 26) to reflect the light in the two deflected paths 347 to complete the formation of the folded pump cavity 330. With the holder 348 providing a common support for the mirrors 204 and 205, rotation of the holder 348 results in simultaneous rotation of the two mirrors 204 and 205 for tuning the wavelength of the pump beam 243.

Pump Subcavity 333

The partially reflecting mirror 203 is placed between the laser rod 201 and the fifth prism 235. The mirror 203 lowers the lasing threshold and also prevents the rapid turn on of the Raman shifting process from abruptly shutting off the pump laser oscillation. The mirror 203 forms the short pump subcavity 333 inside the main pump laser cavity 330. This is done by Steps 415–417.

Step 415. Provide the flat mirror 203 which is partially reflecting on one side and anti-reflection coated on the other side. The mirror 203 has sufficient wedge to prevent etalon effects inside the coated mirror 203.

Step 416. In order to form the stable short pump subcavity 333, make the back mirror 202 of the pump sub cavity 333 slightly concave.

Step 417. A Pockels cell (FIG. 24) may be placed outside the short pump subcavity 333. In this case, the partially reflecting mirror 203 is of low enough reflectivity to prevent lasing in the cavity 333. Although placing the Pockels cell inside the pump subcavity 333 increases the lasing threshold, much more flexibility in the reflectivity of the mirror 203 results.

Optical Path Lengths of Cavities 330, 331 and 332

The pump cavity 330, the Stokes cavity 331 and the second Stokes cavity 332 must have approximately the same optical path length (matched to within the pump laser coherence length) to improve multi-longitudinal mode Raman conversion efficiency. This is done in Steps 418, 419 and 420. The difference in optical path length between the first Stokes cavity 331 and the second Stokes cavity 332 is very small even though the respective beams 244 and 246 take different paths through the prisms 231 through 234. The optical path lengths are nearly matched because the Stokes and the second Stokes beams 244 and 246 respectively pass through differing amounts of high index material in the prisms 231 through 234.

Step 418. Select the location of the high reflective Stokes cavity mirror 207 so that the Stokes cavity 331 is nearly the same length as the pump cavity 330.

Step 419. Select the radius of curvature of the mirror 207 to match the curvature of the respective first and second Stokes beams 244 and 246. This is done because an incorrect curvature will result in moving the location of the beam waist 366 (FIG. 24) away from the location of the pump waist 364.

Phase Matching

For efficient operation, the second Stokes four-wave mixing process is phase matched over the length of the Raman cell by using a secondary gas which has an absorption band at a wavelength longer than the wavelength of the second Stokes beam 246. Carbon dioxide ($CO_2$) and ammonia ($NH_3$) have been identified as appropriate index matching gases for the 2 to 5 micron band. This is done by Steps 420 through 423.

Step 420. Identify a secondary gas having an absorption band at a wavelength longer than that of the second Stokes beam 246 of interest.

Step 421. Determine the index of refraction of the gas at the wavelength of the pump beam 243 and of the second Stokes beam 246.

Figure 41:
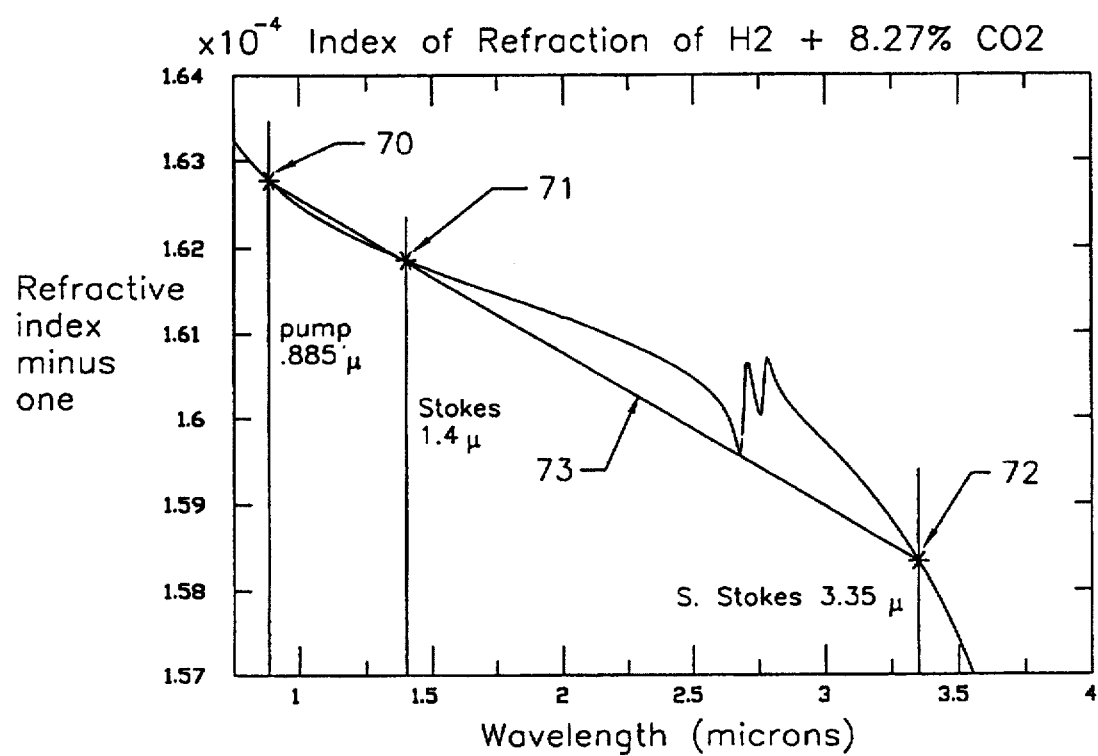
FIG. 41 is a graph of index of refraction versus wavelength, showing a straight line relationship between the index of refraction at respective wavelengths of a pump beam, a Stokes beam and a second Stokes beam in the operation of the laser system provided with the intracavity feature.

Step 422. Calculate the quantity of the secondary gas that must be added to the active gas in the Raman cell 336 so that the resulting index of refraction at the respective wavelengths of the pump beam 243, the Stokes beam 244 and the second Stokes beam 246 lies along a straight line when plotted versus wavelength. An example of the resulting index of refraction at a specific set of pump 370, Stokes 371, and second Stokes 372 wavelengths is shown in FIG. 41 along with the straight line fit 373. For this example 8.27% of $CO_2$ is added to the hydrogen Raman medium.

Step 423. Add the calculated quantity of the secondary gas to the active gas in the Raman cell 336.

Diode Laser Injection Seeding

In another embodiment of the laser system, the pump cavity 330 is injection seeded using the seed beam 351 from the diode laser 350. The face of the prism 235 closest to the laser rod 201 is used so that the pump beam segment 344 does not change as the seed wavelength is changed. This is done in Steps 424–427.

Step 424. Mode match the output of the diode laser 350 to the pump cavity 330 and couple such output into the cavity 330 via an s-polarized reflection off the Brewster prism 235.

Step 425. Guide the seed beam 351 to double pass the Pockels cell so that such beam 351, in general, becomes elliptically polarized. The s-polarized component is lost after double passing the first and fifth Brewster prisms 231 and 235 respectively. The p-polarized component makes one round trip in the pump cavity 330 before being partially rotated by the Q switch 341. At lasing threshold, the round trip loss in the cavity 333 is equal to the round trip gain. At this time, the recirculating seed light 351 will have a larger intensity than the input seed beam if the mode is properly matched.

Step 426. Use the optical isolator 356 (FIG. 24) to prevent the high power pump laser beam 243 from feeding back into the diode laser 350.

Step 427. Use the optical fiber 352 to spatially filter the seed beam 351 and to couple the seed beam 351 from the diode laser 350 into the pump cavity 330.

Dual Output Pulse Generation

In another embodiment of the present invention, injection seeding at two temporally closely spaced wavelengths (as described in respect to FIG. 41) is used to produce the beam 471 having pairs of output mid IR pulses. Such beam 471 is useful for differential absorption measurements. One pulse has a wavelength corresponding to an absorption line of interest and the other pulse of the pair has a nearby wavelength located off the absorption line. This is done in Steps 428 and 429.

Step 428. Use two separate seed diodes 350. The wavelengths of the laser diodes 350 are closely spaced because the two dispersing prisms 231 and 235 in the pump cavity 330 limit the lasing bandwidth to about 1 cm$^{-1}$.

Step 429. Combine the diode laser beams 351 at either a beam splitter or the fiber splice 354 before entering the pump cavity 330. Light from one exit port of the beam splitter (or fiber splice 354) is used for seeding and light from the other exit port is used for wavelength measurement. On alternate laser pulses of the beam 246 alternate ones of the laser diodes 350 are turned off.

Step 430. A second approach is to use one diode laser 350 and modulate its wavelength at one half the pulse rate frequency. This causes a wavelength shift for every other pulse.

It is to be understood that the scope of the present invention is to be defined by the appended claims and not limited by the fore-going description, which describes the presently preferred ways in which the present invention may be devised and still come within the scope of the present invention.

What is claimed is:

1. In an output laser beam generator apparatus, said apparatus comprising a tunable pump laser cavity which operates to generate an initial laser beam, and a Raman device; said Raman device being responsive to said initial laser beam and double Raman shifting the wavelength of said initial laser beam to generate first and second beams at respective first and second Stokes wavelengths, said second beam being said output laser beam, the improvement comprising:

said Raman device being located inside said tunable laser cavity;

a first Stokes cavity comprising said Raman device and a first optical system effective on said first beam at said first Stokes wavelength to return said first beam to said Raman device along a first path; and a second Stokes cavity comprising said Raman device and said optical system effective on said second beam at said second Stokes wavelength to return said second beam to said Raman device along a second path.

2. In an apparatus according to claim 1, the improvement further comprising:

said pump laser cavity having a first subcavity, said first subcavity being defined by a first concave mirror having a high reflectivity at the wavelength of said initial laser beam and a second flat mirror that is partially reflective at said wavelength of said initial laser beam.

3. In an apparatus according to claim 2, the improvement further comprising:

said pump laser cavity having an oscillator rod therein; and said second flat mirror being between said Raman device and said oscillator rod to prevent said Raman shifting from turning off said initial laser beam.

4. In an apparatus according to claim 3, the improvement further comprising:

said oscillator rod being made from Cr:LiSAF to provide said initial laser beam for said double Raman shifting to provide said output signal having a wavelength of from 2 to 5 microns; and said high reflectivity of said first concave mirror being about 85 percent.

5. In an apparatus according to claim 1, the improvement further comprising:

said Raman device having one end provided with a Brewster prism designed to transmit and direct said initial beam, said first beam and said second beam into separate paths;

said separate path of said initial beam being in said pump laser cavity and said separate path of both said first and second beams being out of said pump laser cavity.

6. In an apparatus according to claim 1, wherein said initial beam has a pump wavelength and said Raman device shifts said initial beam wavelength to said first Stokes wavelength, wherein said first Stokes wavelength is different from said initial beam wavelength, the further improvement comprising:

said pump laser cavity having a tunable oscillator rod and a Brewster prism between said Raman device and said rod, said prism being designed to direct said first Stokes beam out of said pump laser cavity so that only said initial beam is directed onto said rod.

7. In an apparatus according to claim 1, wherein said initial beam has a pump wavelength and said Raman device shifts said initial beam wavelength to said first Stokes wavelength of said first Stokes beam and said second Stokes wavelength of said second Stokes beam, wherein said first and second Stokes wavelengths are different from said initial beam wavelength, the further improvement comprising:

said pump laser cavity having a tunable oscillator rod and a Brewster prism between said Raman device and said rod, said prism being designed to direct said first and second Stokes beams out of said pump laser cavity so that only said initial beam is directed onto said rod.

8. In an apparatus according to claim 1, the improvement further comprising:
   said pump laser cavity comprising a lens system to focus said initial laser beam and form an initial beam waist at a given location in said Raman device;
   said Raman device having one end provided with a prism designed to transmit said initial beam, said first beam and said second beam; said prism directing said beams into separate paths to said optical system;
   said optical system focusing said first beam to a beam waist near said given location within said Raman device; and
   said optical system focusing said second beam to a beam waist near said given location within said Raman device.

9. In an apparatus according to claim 1, wherein each of said first beam and said second beam is within a separate respective first Stokes and second Stokes cavity, said apparatus further comprising:
   said optical system further comprising a first prism for separating said first and second beams into separate paths so that said first and second paths are apart, and a single mirror located at a common end of said first and second Stokes cavities;
   said optical system further comprising a plurality of prisms between said Raman device and said single mirror, said plurality of prisms being effective to combine said first and second paths after said first prism and before said single mirror;
   said first prism separating said initial pump beam from both of said first and second beams so that said tunable pump laser cavity is provided with a portion separate from said first and second Stokes cavities; and
   a second optical system in said separate portion of said pump laser cavity to tune said pump laser cavity without moving said single mirror.

10. In an apparatus according to claim 12, the improvement further comprising:
    said single mirror being positioned in said first and second Stokes cavities at a location such that the optical pathlength of each of said first and second Stokes cavities is substantially the same as the optical pathlength of said pump laser cavity.

11. In an apparatus according to claim 1, wherein said pump beam, said first Stokes beam, and said second Stokes beam propagate within Raman medium in said Raman device, said Raman device having a given length, wherein there is a bulk gas refractive index at the wavelength of each of said pump pulse, said first Stokes beam, and said second Stokes beam; wherein there is relative phase matching between said beams, the improvement further comprising:
    said medium in said Raman device being hydrogen and small amounts of at least one phase-matching gas having an absorption resonance band below the wavelength of said second Stokes beam to provide said bulk gas refractive index at the wavelength of said second Stokes beam having a straight line relationship with respect to said bulk gas refractive index at the wavelengths of both said pump beam and said first Stokes beam.

12. In an apparatus according to claim 1, said improvement further comprising:
    said optical system comprising a prism combining said first beam in said first path with said second beam in said second path to direct said first, second and initial beams to said Raman device along the same path and to separate said initial, first and second beams coming from said Raman device;
    a diode injection seeder to supply an s-polarized laser seed beam;
    a second optical system coupling said seed beam to said pump laser cavity after said prism has separated said beams coming from said Raman device; and
    a Pockels cell for converting a portion of said seed beam into p-polarized laser light.

13. In an apparatus according to claim 12, said output laser beam including a first output laser pulse followed by a second output laser pulse, further comprising:
    said seeder having a plurality of output wavelengths, said seeder operating to sequentially supply said seed beam at one of said wavelengths and at another of said wavelengths so that said pump laser cavity is sequentially tuned to one then the other of said wavelengths and said first and second output laser pulses are at different wavelengths.

14. In an apparatus according to claim 1, wherein said output laser beam is in the 2 to 5 micron range, said improvement further comprising:
    said tunable pump laser cavity having a portion provided with an oscillator rod fabricated from Cr:LiSAF;
    said optical system comprising a prism combining said first beam in said first path with said second beam in said second path to direct said first, second and initial beams to said Raman device along the same path and to separate said initial, first and second beams coming from said Raman device, said optical system directing said separated initial beam to said Cr:LiSAF rod;
    a diode injection seeder to supply a laser seed beam having a selected wavelength; and
    a second optical system coupling said seed beam to said rod in said portion of said pump laser cavity so that said initial laser beam is at said selected wavelength;
    said Raman device shifting said selected wavelength to cause said first beam to have a value within the range of 1.1 to 1.56 microns.

15. An output laser pulse generator apparatus, said output laser pulse having any wavelength within a range of 2 to 5 microns, said apparatus comprising:
    a pump laser cavity comprising an oscillator rod to generate a pump beam along a pump beam axis extending in a first plane and having a portion out of said first plane in a second plane parallel to said first plane;
    a Raman device in said pump laser cavity and in said second plane along said portion of said pump beam axis in said second plane; and
    an optics system in said pump beam axis in said first and second planes, said system designed to detect said pump beam along said portion of said pump beam axis in said second plane, said system comprising a first prism in said first plane and a second prism in said second plane.

16. Apparatus according to claim 15, further comprising:
    said optics system further comprising a first mirror in said first plane for deflecting said pump beam from said first plane to said second plane, said system further comprising a second mirror in said second plane for deflecting said pump beam from said first mirror to said portion of said pump beam axis in said second plane.

17. Apparatus according to claim 16, further comprising:
    a holder carrying both of said first and second mirrors for rotation on a second axis perpendicular to said first and second planes to permit tuning of said rod without moving said pump beam axis in either said rod or said Raman device.

18. In an output laser beam generator apparatus, said apparatus comprising a tunable laser cavity comprising an oscillator rod made of tunable laser material which operates to generate an initial laser beam, said laser cavity further comprising a Raman device coupled to said rod to double Raman shift the wavelength of said initial laser beam and generate a first beam and said output laser beam at respective first and second Stokes wavelengths, said output laser beam being in a range of from 2 to 5 microns; the improvement comprising:

said Raman device being located inside said tunable laser cavity;

a first Stokes cavity comprising said Raman device and a first optical system, said first optical system returning said first beam at said first Stokes wavelength to said Raman device along a first path;

a second Stokes cavity comprising said Raman device and said optical system, said first optical system returning said second beam at said second Stokes wavelength to said Raman device along a second path; and a pumping system coupled to said oscillator rod to pump said tunable laser material, said system comprising either one or more diode lasers or one or more flashlamps;

said double Raman shifting being performed by said Raman device in response to pumping by either of said one or more diode lasers or said one or more flashlamps.

19. A method of generating an output laser beam using a tunable pump laser cavity that generates an initial laser beam, and a Raman device; said Raman device being responsive to said initial laser beam and double Raman shifting the wavelength of said initial laser beam to generate first and second beams at respective first and second Stokes wavelengths, said second beam being said output laser beam, said method comprising the steps of:

locating said Raman device inside said tunable pump laser cavity to generate said first beam and said second beam;

returning said first beam to said Raman device along a first path in a first Stokes cavity comprising said Raman device and a first optical system effective at said first Stokes wavelength; and returning said second beam to said Raman device along a second path in a second Stokes cavity comprising said Raman device and said optical system effective at said second Stokes wavelength.

20. The method according to claim 19, further comprising:

dividing said pump laser cavity into subcavities by forming a first subcavity define by a first concave mirror having a high reflectivity at the wavelength of said initial laser beam and a second flat mirror that is partially reflective at said wavelength of said initial laser beam.

21. The method according to claim 20, further comprising:

providing said pump laser cavity with an oscillator rod therein; and positioning said second flat mirror between said Raman device and said oscillator rod to prevent said Raman shifting from turning off said initial laser beam.

22. The method according to claim 21, further comprising:

providing said oscillator made from Cr:LiSAF material to generate said initial laser beam for said double Raman shifting; and selecting said high reflectivity of said first concave mirror to be about 85 percent.

23. The method according to claim 19, further comprising: transmitting said initial beam, said first beam and said second beam from said Raman device and directing all of said beams into separate paths; and said directing being effective to direct said separate path of said initial beam in said pump laser cavity and to direct said separate path of both said first and second beams out of said pump laser cavity.

24. The method according to claim 19, further comprising:

focusing said initial laser beam to form an initial beam waist at a given location in said Raman device;

separating the paths of said initial beam, said first beam and said second beam between said Raman device and said optical system;

focusing said separated first beam to a beam waist near said given location within said Raman device; and focusing said separated second beam to a beam waist near said given location within said Raman device.

25. The method according to claim 19, wherein each of said first beam and said second beam is within a separate respective first Stokes and second Stokes cavity, said method further comprising:

directing said first beam and said second beam from said Raman device through said optical system to separate said first and second beams into separate paths so that said first and second paths are apart;

combining said first and second paths of said respective first beam and said second beam from said separate paths into a common path; and reflecting said first beam and said second beam in said common path off a single mirror located at a common end of said first and second Stokes cavities;

said separating of said initial pump beam from both of said first and second beams providing said tunable pump laser cavity with a portion separate from said first and second Stokes cavities; and tuning said separate portion of said pump laser cavity without moving said single mirror.

26. The method according to claim 19, further comprising:

combining said first beam in said first path with said second beam in said second path to direct said first, second and initial beams to said Raman device along the same path;

separating said initial beam, said first beam and said second beam after they are generated by said Raman device;

supplying an s-polarized laser seed beam;

coupling said seed beam to said pump laser cavity after said separation of said beams generated by said Raman device; and converting a portion of said seed beam into p-polarized laser light.

27. The method according to claim 26, wherein said output laser beam includes a first output laser pulse followed by a second output laser pulse, further comprising:

said supplying step sequentially supplying said seed beam at one wavelength and at a different wavelength so that said pump laser cavity is sequentially tuned to said one then said different wavelength and said first and second output laser pulses are at different wavelengths.

28. A method of generating an output laser pulse having any wavelength within a range of 2 to 5 microns, said method comprising the steps of:

defining a pump laser cavity having a pump beam axis extending in a first plane and having a portion out of said plane in a second plane parallel to said first plane;

providing an oscillator rod to generate a pump beam along said pump beam axis in said first plane;

providing a Raman device in said pump laser cavity and in said second plane along said portion of said pump beam axis in said second plane; and deflecting said pump beam from said first plane to coincide with said portion of said pump beam axis in said second plane.

29. The method according to claim 28, further comprising:

said deflecting being performed by a first mirror in said first plane deflecting said pump beam from said first plane to said second plane and by a second mirror in said second plane deflecting said pump beam from said first mirror to said portion of said pump beam axis in said second plane.

30. The method according to claim 29, further comprising:

mounting both of said first and second mirrors for rotation on a second axis perpendicular to said first and second planes to permit tuning of said rod without moving said pump beam axis in either said rod or said Raman device.

31. In an output laser pulse generator apparatus, said apparatus comprising an oscillator laser cavity comprising an oscillator rod made of tunable laser material that generates an initial laser beam, said cavity further comprising a Raman device coupled to said rod to double Raman shift the wavelength of said initial laser beam into a range of from two to five microns to form said output laser pulse, said Raman device being responsive to said initial laser beam to generate first and second beams at respective first and second Stokes wavelengths, said output laser beam being at said second Stokes wavelength, the improvement comprising:

a first Stokes cavity comprising said Raman device and a first optical system effective at said first Stokes wavelength to return said first beam to said Raman device along a first path;

a second Stokes cavity comprising said Raman device and said first optical system effective at said second Stokes wavelength to return said first beam to said Raman device along a second path; and said oscillator laser cavity further comprising a lens system effective to focus said initial beam and form an initial beam waist at a given location within said Raman device.

32. In an apparatus according to claim 31, the improvement further comprising:

said Raman device having one end provided with a prism designed to transmit said initial beam, said first beam and said second beam; said prism directing said beams into separate paths to said optical system;

said optical system focusing said first beam to a beam waist near said given location within said Raman device; and said optical system focusing said second beam to a beam waist near said given location within said Raman device.

33. In an apparatus according to claim 31, wherein said pump beam, said first Stokes beam, and said second Stokes beam propagate within Raman medium in said Raman device, said Raman device having a given length, wherein there is a bulk gas refractive index at the wavelength of each of said pump pulse, said first Stokes beam, and said second Stokes beam; wherein there is relative phase matching between said beams, the improvement further comprising:

said medium in said Raman device being hydrogen and small amounts of at least one phase-matching gas having an absorption resonance band below the wavelength of said second Stokes beam to provide said bulk gas refractive index at the wavelength of said second Stokes beam having a straight line relationship with respect to said bulk gas refractive index at the wavelengths of both said pump beam and said first Stokes beam.

34. In an output laser pulse generator apparatus, said output laser pulse having any wavelength within a range of 2 to 5 microns, said apparatus comprising a pump cavity providing a pump beam to a Raman device; the improvement in said apparatus comprising:

said Raman device being located in a first plane spaced from a second plane that is parallel to said first plane in an orthogonal axis system having x,y, and z axes, said Raman device having a first x axis within said first plane, said first plane containing a first y axis perpendicular to said x axis, said second plane having a second x axis parallel to said first x axis and a second y axis parallel to said first y axis;

an oscillator rod of said pump cavity being positioned in said second plane to generate said pump beam along said second x axis;

a pair of prisms, a first one of said prisms being mounted in said first plane to reposition said pump beam from said first y axis to said first x axis and from said first x axis to said first y axis, a second one of said prisms being mounted in said second plane to reposition said pump beam from said second y axis to said second x axis and from said second x axis to said second y axis;

a first mirror positioned to direct said beam propagating in said first y axis along a z axis toward said second plane; and a second mirror positioned to direct said beam propagating in said z axis along said second y axis toward said second prism.

35. In an apparatus according to claim 34, the further improvement comprising:

a holder connected to both of said first and second mirrors so that said Z axis is an axis of rotation of both of said mirrors, said holder being rotatable around said Z axis to enable said first mirror to receive various wavelength beams from said first prism and direct all of said beams onto said second mirror for direction onto said second prism.

36. In an apparatus according to claim 34, wherein said pump beam has a pump wavelength and said Raman device shifts said pump beam wavelength to a Stokes wavelength of a Stokes beam, wherein said Stokes wavelength is different from said pump beam wavelength, the further improvement comprising:

said first prism being designed to direct said Stokes beam in said first plane from said first x axis to a first path out of alignment with said second y axis so that said Stokes beam does not intersect said first mirror.

37. In an apparatus according to claim 36, wherein said Raman device further shifts said Stokes beam wavelength to a second Stokes wavelength of a second Stokes beam, wherein each of said Stokes wavelengths is different from said pump beam wavelength, the further improvement comprising:

said first prism being designed to direct said second Stokes beam in said first plane from said first x axis to a second path out of alignment with said second y axis so that said second Stokes beam does not intersect said first mirror.

38. In an apparatus according to claim 37, the further improvement comprising:

a first Stokes cavity for propagating said first Stokes beam in said first path and returning said first Stokes beam to said Raman device;

a second Stokes cavity for propagating said second Stokes beam in said second path and returning said second Stokes beam to said Raman device;

each of said first and second Stokes cavities comprising the same common mirror and common third, fourth and fifth prisms which direct said first and second Stokes beams in separate paths from said first prism into a common path toward said common mirror; and said common mirror reflecting each of said first and second Stokes beams back onto said fifth prism for direction through said fourth, third, second and first prisms and return into said Raman device.

39. In an output laser beam generator apparatus, said apparatus comprising a pump laser cavity comprising an oscillator rod made of tunable laser material that generates an initial laser beam, said cavity further comprising a Raman device coupled to said rod to double Raman shift the wavelength of said initial laser beam into a wavelength range of from 2 to 5 microns to form said output laser beam, said Raman device being responsive to said initial laser beam to generate a first Stokes beam at a first Stokes wavelength, the improvement comprising:

a dispersing prism between said rod and said Raman device, said prism dispersing said initial laser beam from said first Stokes beam.

40. In an apparatus according to claim 39, wherein anti-Stokes radiation is generated in said pump laser cavity, the improvement further comprising:

said dispersing prism also dispersing said anti-Stokes radiation out of said cavity.

41. In an apparatus according to claim 39, said Raman device having a first window for transmitting said output laser beam and having a second window, the improvement further comprising:

said dispersing prism being positioned in said pump laser cavity adjacent to said second window and outside of said Raman device.

42. In an apparatus according to claim 39, said Raman device having a first window for transmitting said output laser beam and a second window for receiving said initial laser beam, the improvement further comprising:

said dispersing prism forming said second window of said Raman device.

43. In an apparatus according to claim 39, said Raman device having a first window for transmitting said output laser beam and a second window for receiving said initial laser beam, the improvement further comprising:

said first window being a mirror which is reflective at said wavelengths of said initial laser beam and said first Stokes beam to reflect said beams into said Raman device toward said second window;

said dispersing prism forming said second window of said Raman device and dispersing said initial beam by an amount that is different from the amount by which said prism disperses said first Stokes beam so that said first Stokes beam is deflected out of said cavity.

44. In an apparatus according to claim 39, said Raman device having a first window for transmitting said output laser beam and a second window for receiving said initial laser beam, said first Stokes beam and a second Stokes beam, the improvement further comprising:

said dispersing prism dispersing said second Stokes beam from said initial laser beam and said first Stokes beam;

a first stokes cavity comprising said Raman device and an optical system for directing said dispersed first Stokes beam along a first Stokes cavity path;

a second Stokes cavity comprising said Raman device and said optical system for directing said dispersed second Stokes beam along a second Stokes cavity path;

said optical system comprising a second prism positioned to receive said dispersed first Stokes beam and said dispersed second Stokes beam from said dispersing prism and cancelling angular dispersion of said first and second Stokes beams caused by said dispersing prism.

45. In an apparatus according to claim 44, wherein said first and second Stokes cavity paths are maintained separate by said second prism, the improvement further comprising:

said optical system further comprising a pair of prisms positioned in a mirror image of said dispersing prism and said second prism for joining said first Stokes cavity path and said second Stokes cavity path to a common path, and a mirror positioned in said common path, said mirror designed to reflect each said first and second Stokes beams back along said common path through said optical system into said Raman device.

46. In an apparatus according to claim 45, the improvement further comprising:

said mirror being positioned in said common path at a location such that the optical pathlength of said first Stokes cavity is substantially the same as the optical pathlength of said pump laser cavity.

47. In an apparatus according to claim 45, the improvement further comprising:

said mirror having a curvature matching the radius of curvature of said first Stokes beam and said second Stokes beam.

48. In an apparatus according to claim 39, wherein said initial beam propagates along a pump beam axis in said Raman device and leaks out of said Raman device along an extension of said axis, and wherein said Raman device shifts said initial laser beam to generate a first Stokes beam that propagates in said Raman device into a Stokes cavity, the improvement comprising:

a HeNe laser generating a HeNe laser beam;

a mirror system positioned to render said HeNe laser beam coaxial with said initial laser beam for propagation into said Stokes cavity to facilitate alignment of said initial laser beam with said Stokes beam.

49. In an output laser beam generator apparatus, said apparatus comprising a pump laser cavity comprising an oscillator rod made of tunable laser material that generates an initial laser beam and a Raman device coupled to said rod to double Raman shift the wavelength of said initial laser beam into a range of from 2 to 5 microns to form said output laser beam, the improvement comprising:

said pump laser cavity being separated into subcavities;

a first of said subcavities being defined by a first concave mirror having a high reflectivity at the wavelength of said pump beam and a second flat mirror that is partially reflective at said wavelength of said pump beam, said first subcavity being a stable resonator and containing said oscillator rod.

\* \* \* \* \*